United States Patent [19]

Poublan et al.

[11] 4,104,718

[45] Aug. 1, 1978

[54] SYSTEM FOR PROTECTING SHARED FILES IN A MULTIPROGRAMMED COMPUTER

[75] Inventors: Alain Poublan, Paris, France; Charles Bachman, Lexington; Jacques Bouvard, Wellesley, both of Mass.

[73] Assignee: Compagnie Honeywell Bull (Societe Anonyme), Paris, France

[21] Appl. No.: 533,038

[22] Filed: Dec. 16, 1974

[51] Int. Cl.² .................... G06F 9/19; G06F 7/10; G06F 3/00
[52] U.S. Cl. ................................................. 364/200
[58] Field of Search .................. 340/172.5; 445/1; 364/200 MS File, 900 MS File

[56] References Cited

U.S. PATENT DOCUMENTS

| | | | |
|---|---|---|---|
| 3,573,736 | 4/1971 | Schlaeppi | 364/200 |
| 3,618,045 | 11/1971 | Campbell et al. | 364/200 |
| 3,665,421 | 5/1972 | Rehhausser et al. | 364/200 |
| 3,670,310 | 6/1972 | Bharwani et al. | 340/172.5 |
| 3,702,462 | 11/1972 | England | 364/200 |
| 3,771,146 | 11/1973 | Cotton et al. | 340/172.5 |
| 3,787,813 | 1/1974 | Cole et al. | 340/172.5 |
| 3,812,471 | 5/1974 | Finnin | 364/200 |
| 3,821,708 | 6/1974 | Sokoloff | 340/172.5 |
| 3,849,765 | 11/1974 | Hamano | 364/900 |
| 3,905,023 | 9/1975 | Perpiglia | 364/200 |

Primary Examiner—Gareth D. Shaw
Assistant Examiner—Jan E. Rhoads
Attorney, Agent, or Firm—Cameron, Kerkam, Sutton, Stowell & Stowell

[57] ABSTRACT

An arrangement for sharing file information among plural processes in a multiprogrammed computing system. Source program file declarations are compiled into file control structures which are placed in skeletal segments, the segments forming units of potential sharing between active processes. Those segments which contain file control structures are placed in either the address space of (1) all processes, (2) related processes, or (3) a single process, depending upon the declared sharing level of the file. Job control language (JCL) commmands are expanded into JCL file control structures and merged with the source language structures to form a file request control structure. This request may be compared against a catalog of existing external files, a check being made to insure that the account on whose behalf a computing job is requesting file assignment is authorized to obtain the requested access to the file. Further tests are then made to guarantee compatibility between the request and the current status of the file.

10 Claims, 49 Drawing Figures

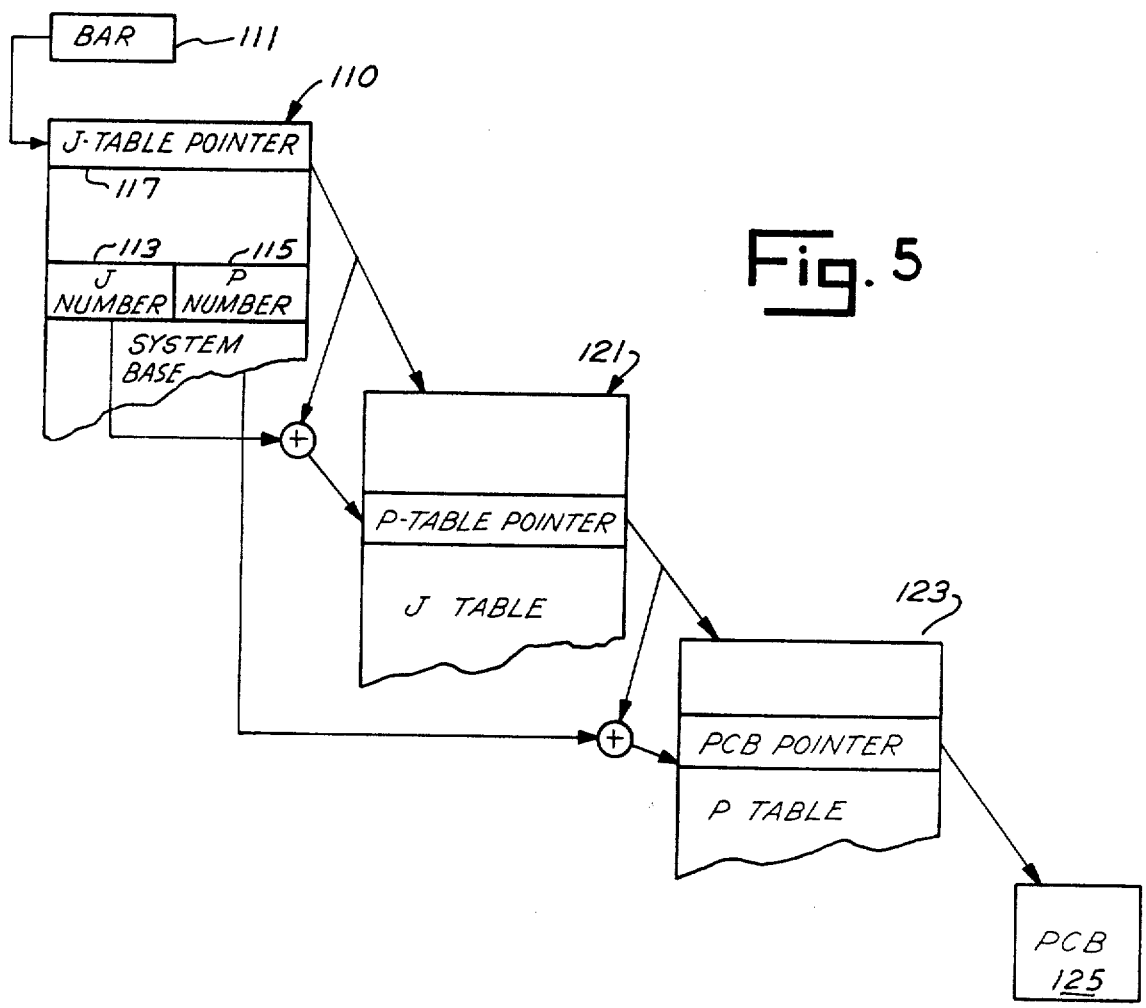
Fig. 5
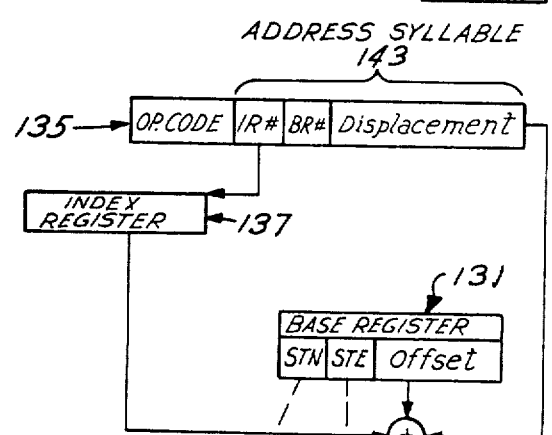
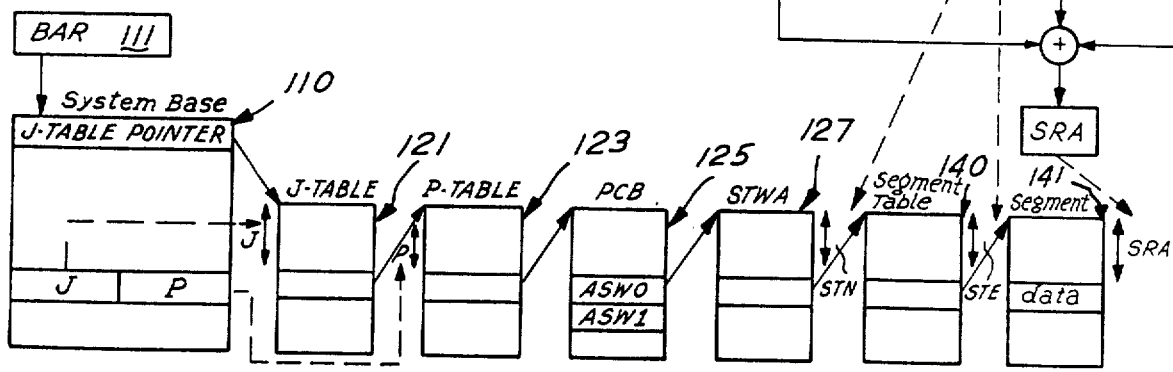
Fig. 6

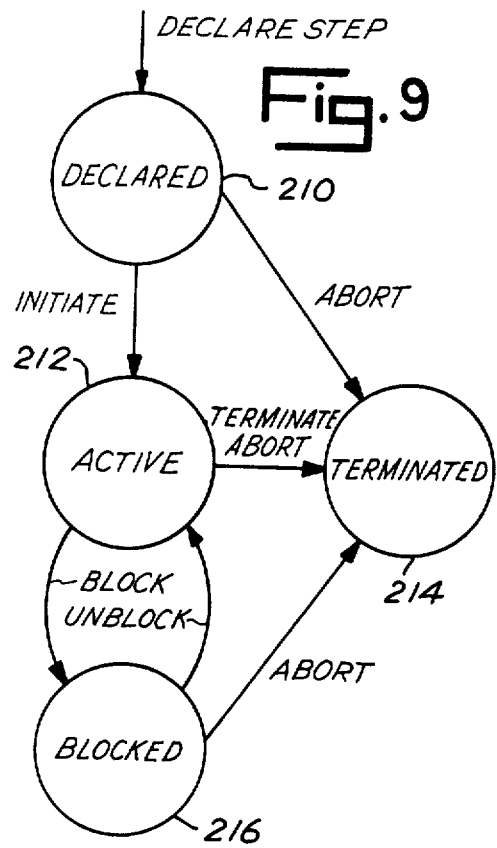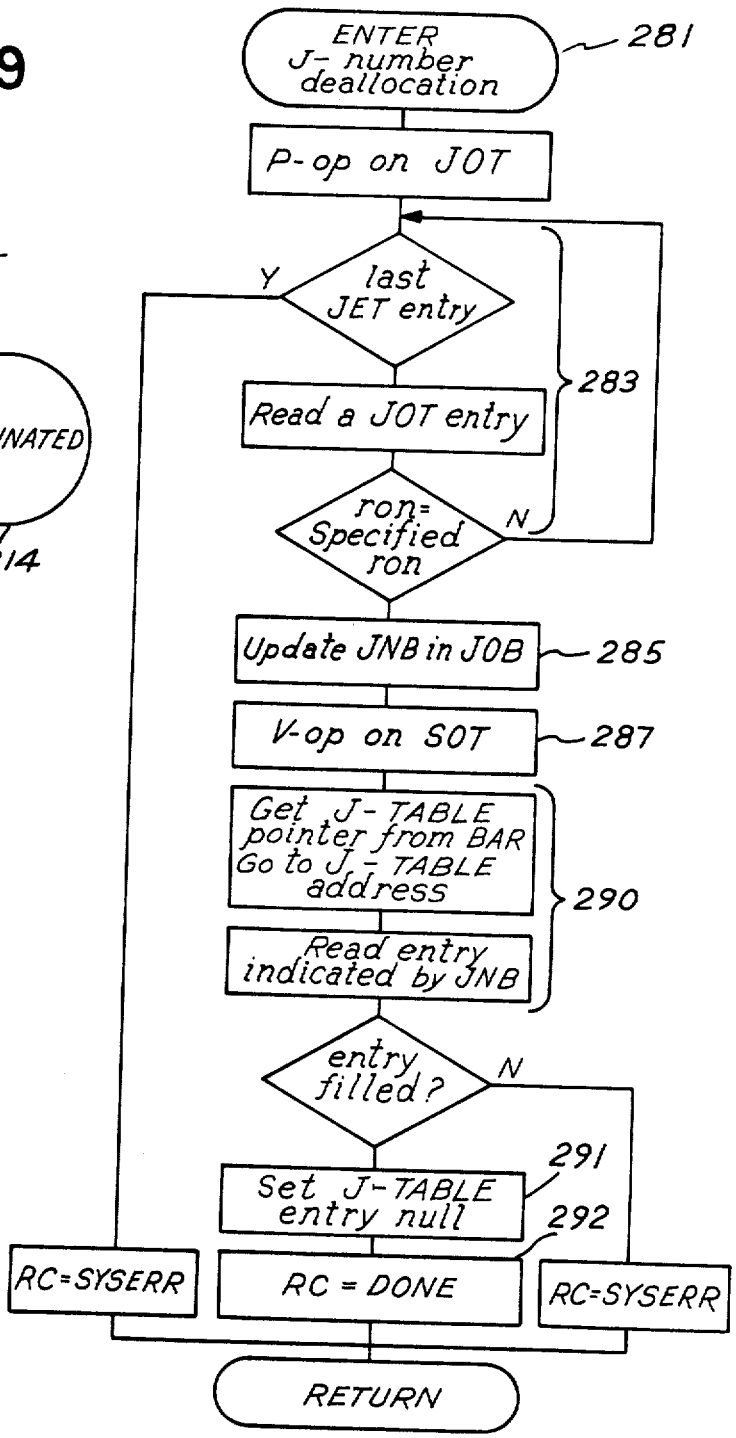

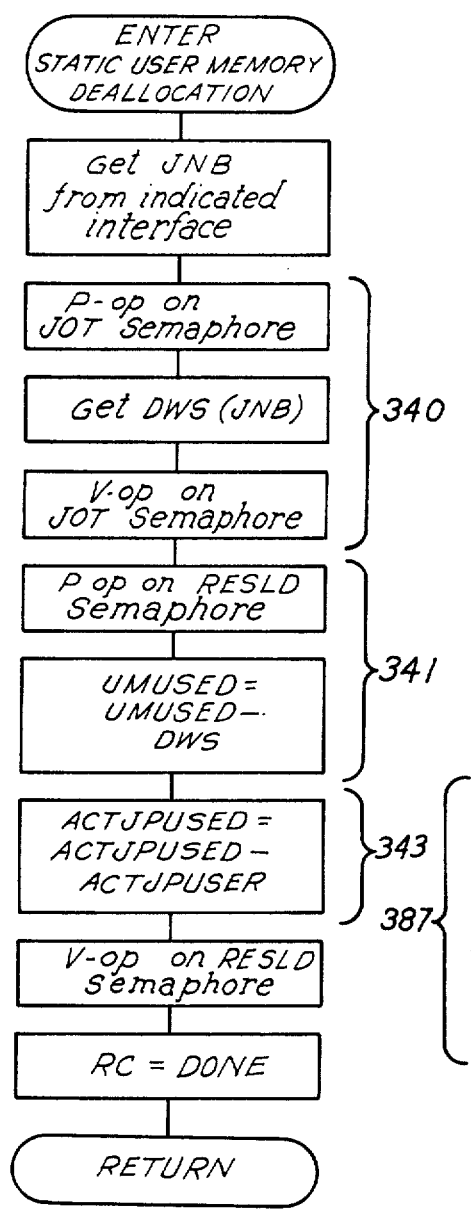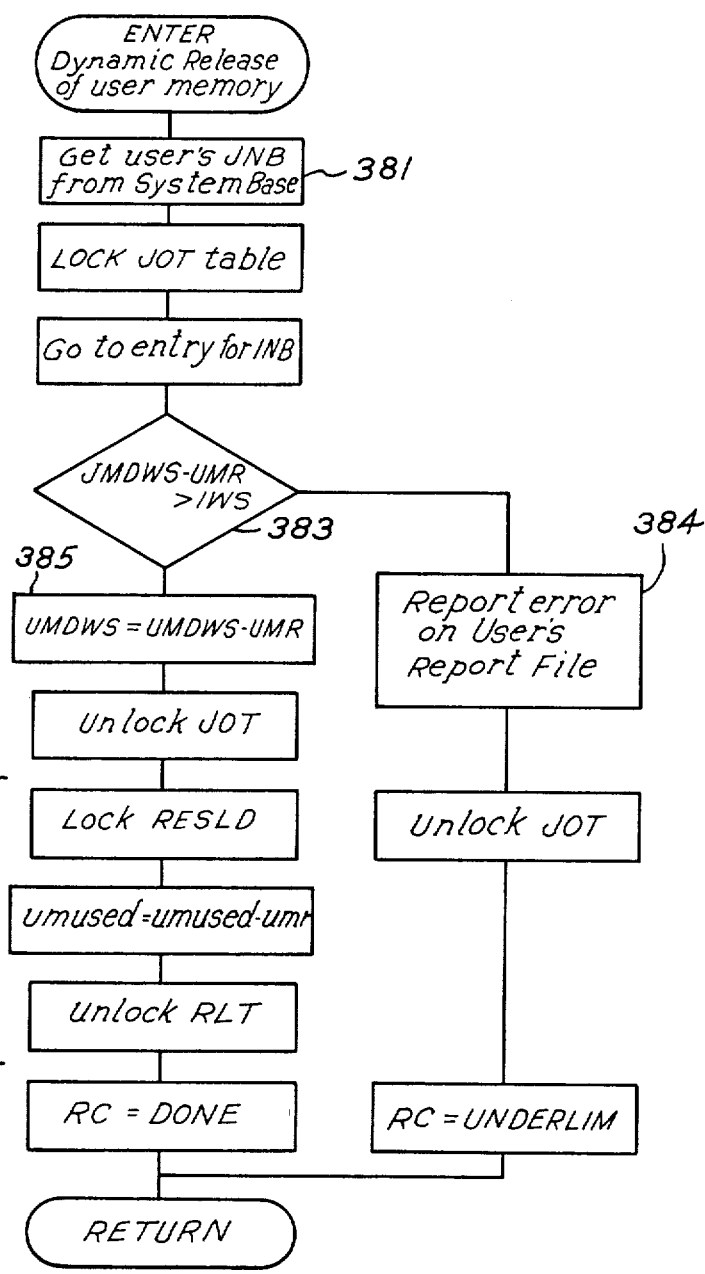

Fig. 21

```
DCL 1 STEPINF,
        3 ACCOUNT CHAR (25), /* ACCOUNT NUMBER */
        3 JNB BIT (8), /* J-NUMBER OF THE PROCESS GROUP */
        3 SCN CHAR (6), /* STEP OCCURRENCE NUMBER */
        3 JCFXUCA PTR, /* POINTER TO THE UCA OF THE JCFX */
        3 SYSREPUCA PTR ; /* POINTER TO THE UCA OF THE
                               SYSTEM REPORT */
```

Fig. 22

```
DCL 1 RESOUT BASED (RESOURCE),
        3 OWNER CHAR (14), /* OWNER OF THE VOLUME */
        3 LABEL CHAR (1), /* LABEL TYPE */
        3 REQIND BIT (4), /* REQUIREMENT MODE */
        3 DEFER BIT (1), /* DEFER OPTION */
        3 ALLREQ BIT (1), /* SPACE ALLOCATION IS REQUESTED */
        3 NUMBVOL FIXED BIN (7), /* NUMBER OF VOLUMES */
        3 VOLID (NUMBVOL),
            5 DEVCLASS CHAR (3), /* DEVICE TYPE AND SUBTYPE */
            5 VOLNAME CHAR (6), /* VOLUME SERIAL NUMBER */
            5 DEVNAME CHAR (2) ; /* EXTERNAL DEVICE NAME */
```

Fig. 24

```
DCL 1 SL,
    2 SLID, /* SL HEADER */
        3 FILECODE CHAR (8), /* FILE CODE */
        3 ASCOFFSET FIXED BIN (15), /* ASSIGN PARAMETER */
        3 DEVOFFSET FIXED BIN (15), /* DEVICE PARAMETER */
        3 ALLOCOFFSET FIXED BIN (15), /* ALLOCATA PARAMETER */
        3 FDOFFSET FIXED BIN (15), /* FILEDEF PARAMETER */
        3 DEFAULT BIT (1), /* SEE (1) */
        3 DEFNAME BIT (1), /* SEE (2) */
    2 ASSIGN, /* ASSIGN PARAMETERS, LIKE FOR CL */
    2 DEVICE, /* DEVICE PARAMETERS, LIKE FOR CL */
    2 ALLOCATE, /* ALLOCATE PARAMETERS, LIKE FOR CL */
    2 FILEDEF ; /* FILEDEF PARAMETERS, LIKE FOR CL */
```

Fig.25

```
2 ASSIGN, /* $ASSIGN STATEMENT EXPANSION */
    3 FILENAME CHAR (44), /* EXTERNAL FILE NAME */
    3 SHR, /* SHARABILITY LEVEL */
        5 XP BIT (1), /* 1 = EXCLUSIVE TO A PROCESS */
        5 XS BIT (1), /* 1 = EXCLUSIVE TO THE PROCESS GROUP */
        5 SRO BIT (1), /* 1 = READ ONLY */
        5 SXW BIT (1), /* 1 = EXCLUSIVE WRITE */
        5 SNX BIT (1), /* 1 = TOTAL SHARING */
    3 PROCMODE BIT (10), /* PROCESSING MODE */
    3 BEFORE BIT (1), /* 1 = BEFORE JOURNAL REQUESTED */
    3 PASS BIT (2), /* FLAGS FOR PASSING THE FILE */
    3 DELETE BIT (2), /* FLAGS FOR DELETION */
    3 BACKWARD BIT (1), /* 1 = PROCESSING IS BACKWARD */
    3 RECOVERY BIT (4), /* 1 = ASSIGNED FOR RECOVERY */
    3 UNCAT BIT (1), /* 0 = CATALOGED, 1 = UNCATALOGED */
    3 CATAL BIT (1), /* 0 = DO NOT CATALOG, 1 = CATALOG */
    3 DEFER BIT (1), /* 0 = DO NOT DEFER ROUTING, 1 = DEFER */
    3 NBEXT FIXED BIN (15), /* MAXIMUM POSSIBLE # OF EXTENTS */
    3 FIRSTVOL FIXED BIN (15), /* FIRST VOLUME INDICATOR */
    3 LASTVOL FIXED BIN (15) ; /* LAST VOLUME INDICATOR */
```

Fig. 26

```
2 DEVICE, /* $DEVICE EXPANSION */
    3 REQUEST BIT (7), /* REQUEST OF A VOLUME OR A DEVICE */
    3 REQMODE BIT (3), /* REQUIREMENT MODE */
    3 DEFER BIT (1), /* THE VOLUME MOUNTING CAN BE DEFERRED */
    3 SHARE BIT (1), /* THE MEDIA CAN BE SHARED */
    3 MULTIFIL BIT (1), /* THE TAPE IS MULTIFILE */
    3 PASS BIT (1), /* THE MEDIA MUST BE PASSED TO ANOTHER
                       STEP OF THE JOB */
    3 LABELTYP CHAR (1), /* LABEL TYPE */
    3 OWNER CHAR (14), /* OWNER OF THE VOLUME */
    3 FILSQNB FIXED BIN (7), /* FILE SEQUENCE NUMBER OF THE
                               FILE ON A MULTIFILE TAPE */
    3 CHARACT CHAR (10), /* CHARACTERISTICS OF THE DEVICE */
    3 NUMBMD FIXED BIN (7), /* NUMBER OF MEDIA */
    3 MDLIST,
        5 DEVCLASS CHAR (3), /* DEVICE CLASS */
        5 VOLNAME CHAR (6), /* VOLUME SERIAL NUMBER */
        5 DEVNAME CHAR (2) ; /* EXTERNAL DEVICE NAME */
```

Fig.27

```
2 ALLOCATE, /* $ALLOCATE EXPANSION */
  3 LABEL CHAR (1), /* LABEL TYPE */
  3 UNAL BIT (4), /* UNIT OF ALLOCATION */
  3 ALLOCTYPE BIT (4), /* ALLOCATION TYPE */
  3 SPACDISP BIT (1), /* SPACE DISPOSITION CODE : RELEASE UNUSED SPACE
                        AFTER OUTPUT PROCESSING */
  3 MAXNBVOL FIXED BIN (15), /* MAXIMUM NUMBER OF VOLUMES */
  3 MAXNBEXT FIXED BIN (15), /* MAXIMUM NUMBER OF EXTENTS ALLOWED ON
                               EACH VOLUME */
  3 INCRSZ FIXED BIN (15), /* INCREMENT SIZE. MAY BE ZERO OF EXTENSION
                             IS NOT ALLOWED */
  3 MAXSZ FIXED BIN (15), /* MAXIMUM SIZE IN UNITS OF ALLOCATION */
  3 ALLSPASZ FIXED BIN (15); /* ALLOCATED SPACE SIZE IN UNITS OF
                               ALLOCATION */
```

Fig.28

```
2 FILEDEF, /* $FILEDEF EXPANSION */
  3 FILORG BIT (8), /* SPECIFIES THE FILE ORGANIZATION AS FOLLOWS:
      1.......  INDEXED SEQUENTIAL FILE (COEXISTENCE)
      .1......  PHYSICAL SEQUENTIAL FILE
      ..1.....  DIRECT FILE
      ...1....  RANDOM FILE
      ....1...  QUEUED FILE
      .....1..  NPL INDEXED SEQUENTIAL FILE
      ..11....  INTEGRATED DATA BASE FILE
      ......1.  QUEUED (PARTITIONED) FILE
      .1..1...  LINKED SEQUENTIAL
      .......1  UNRELOCATABLE FILE WHICH CANNOT BE MOVED TO OTHER EXTENTS */
  3 RECFORM, /* RECORD DEFINITION */
    4 RECFORM BIT (2), /* RECORD FORMAT */
    4 TRKOFLOW BIT (1), /* 1 = TRACK OVERFLOW USED */
    4 BLOCKED BIT (1), /* 1 = RECORDS ARE BLOCKED */
    4 SPAN BIT (1), /* SPANNED RECORD */
    4 CONTROL BIT (2), /* CONTROL CHARACTER */
    4 KEY BIT (1), /* 1 = RECORDS ARE KEYED */
```

Fig.29

2 FILEDEF, /* $FILEDEF EXPANSION. */ (CONTINUED)

3 BLKSIZE FIXED BIN (15), /* BLOCK SIZE OR MAXIMUM BLOCK SIZE */

3 RECSIZE FIXED BIN (15), /* RECORD SIZE OR MAXIMUM RECORD SIZE, 0 FOR UNDEFINED FORMAT */

3 KEYSIZE FIXED BIN (15), /* RECORD KEY SIZE */

3 KEYLOC FIXED BIN (15), /* OFFSET OF THE KEY LOCATION WITHIN THE RECORD */

3 BLKFORM BIT (1), /* 0 = FIXED LENGTH BLOCKS, 1 = VARIABLE */

3 BLKSNIND BIT (1), /* 1 = A BLOCK SERIAL # MUST EXIST ON TAPE */

3 RELOC BIT (3), /* GIVES THE RELOCATABILITY INDICATOR */

3 EXPADATE BIT (24), /* EXPIRATION DATE */

3 POSIT BIT (3) ; /* VOLUME DISPOSITION CODE AT CLOSE TIME */

Fig. 30

| Requested Sharing level \ Cataloged Sharing level | X | S.RO | S.XW | S.NX |
|---|---|---|---|---|
| X | X | X | X | X |
| S.RO | X | S.RO | S.RO | S.RO |
| S.XW | X | S.RO | S.XW | S.XW |
| S.NX | X | S.RO | S.XW | S.NX |

Fig. 32

| requested \ current | | | with sharing control | | without sharing control | |
|---|---|---|---|---|---|---|
| | | | File level | Record level | Assignment status is S.RO | Assignment status is not S.RO |
| with sharing control | File level | Write | Y | N | N | N |
| | | Read | | | Y | N |
| | Record level | Write | N | Y | N | N |
| | | Read | | | Y | N |
| without sharing control | Write | | N | N | Y | N |
| | Read | | Y | Y | Y | Y |

Fig. 31

| Current sharing level / Concurrent access(es) → <br> Requested sharing level / Requested mode ↓ | X <br> 1 | S.RO <br> R=n, W=0 | S.XW <br> R=n, W=g (0≤g≤1) | S.NX <br> R=n, W=g | Assigned |
|---|---|---|---|---|---|
| X — Read and/or write | N | N | N | N | R=0, W=0 |
| S.RO — Read | N | Y (R=n+1) | g=0: S.RO (R=n+1) / g=1: N | g=0: S.RO (R=n+1) / g≠0: N | R=1 and/or W=1 x |
| S.RO — Read | N | Y (R=n+1) | Y (R=n+1) | g≤1: S.XW (R=n+1) / g>1: N | S.RO (R=1) |
| S.XW — Write | N | N | Y (R=n+1) | Y (R=n+1) | S.XW (R=1) |
| S.XW — Read | N | Y (R=n+1) | g=0: Y (W=1) / g=1: N | g=0: S.XW (W=1) / g≠0: N | S.XW (W=1) |
| S.NX — Read | N | N | g=0: Y (W=1) | Y (R=n+1) | S.NX (R=1) |
| S.NX — Write | N | N | N | Y (W=g+1) | S.NX (W=1) |

Fig. 33

| CURRENT REQUEST | | Independent (I) | | | | | Cooperative (C) | | | | | None |
|---|---|---|---|---|---|---|---|---|---|---|---|---|
| | | R | W | U | A | I/O | R | W | U | A | I/O | |
| Independent | R | Y | Y | Y | Y | Y | N | Y | N | Y | N | Y |
| | W | Y | N | Y | N | N | N | N | N | N | N | Y |
| | U | Y | Y | Y | Y | Y | N | Y | N | Y | N | Y |
| | A | Y | N | Y | N | N | N | N | N | N | N | Y |
| | I/O | Y | N | Y | N | N | N | N | N | N | N | Y |
| Cooperative | R | N | Y | N | Y | N | Y | Y | Y | Y | Y | Y |
| | W | Y | N | Y | N | N | Y | Y | Y | N | N | Y |
| | U | N | Y | N | Y | N | Y | Y | Y | Y | Y | Y |
| | A | Y | N | Y | N | N | Y | N | Y | Y | N | Y |
| | I/O | N | N | N | N | N | Y | N | Y | N | N | Y |

R : stands for read
W : stands for write
U : stands for update
A : stands for append
I/O : stands for Input/Output Y stands for yes
N stands for no

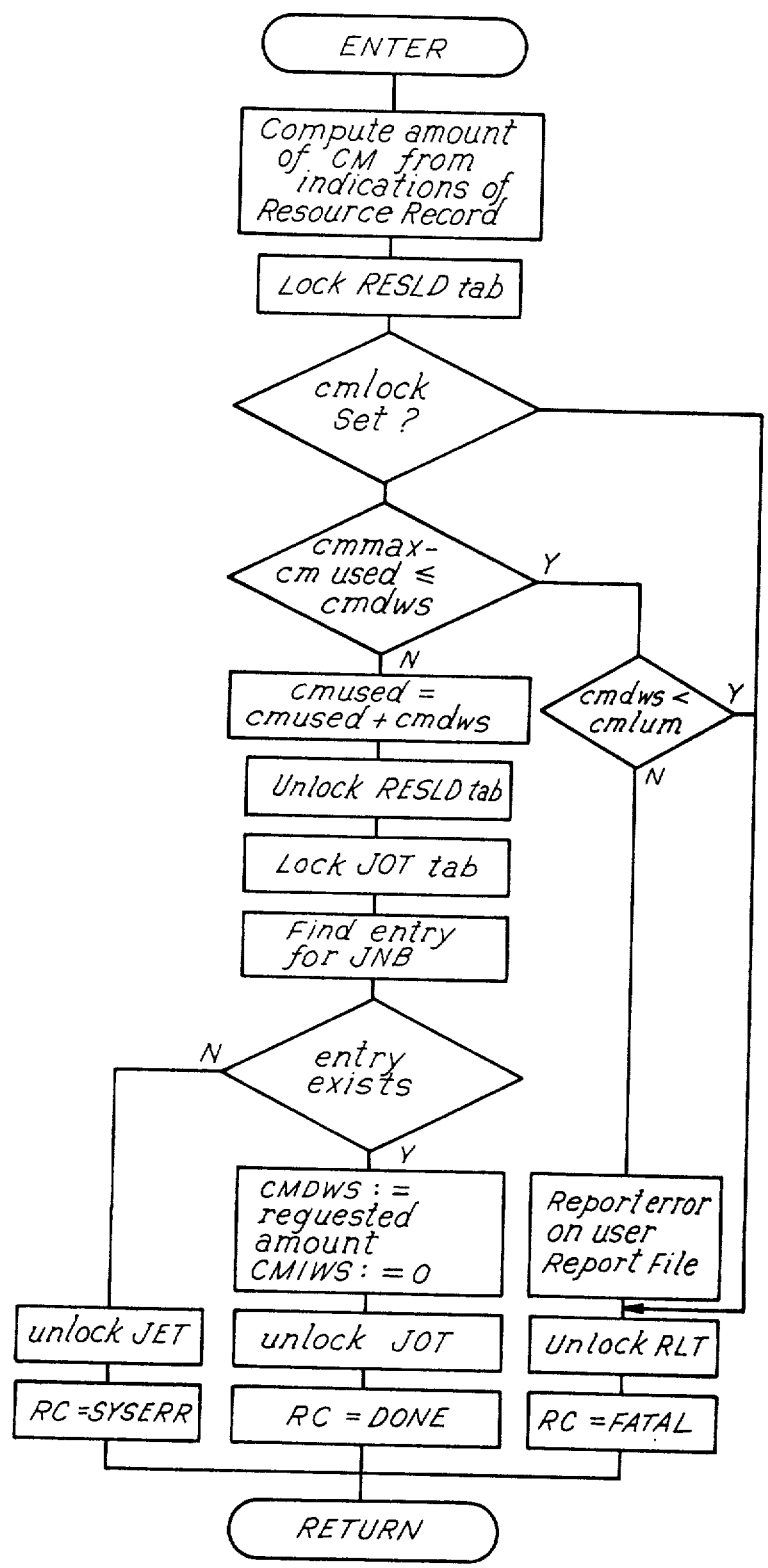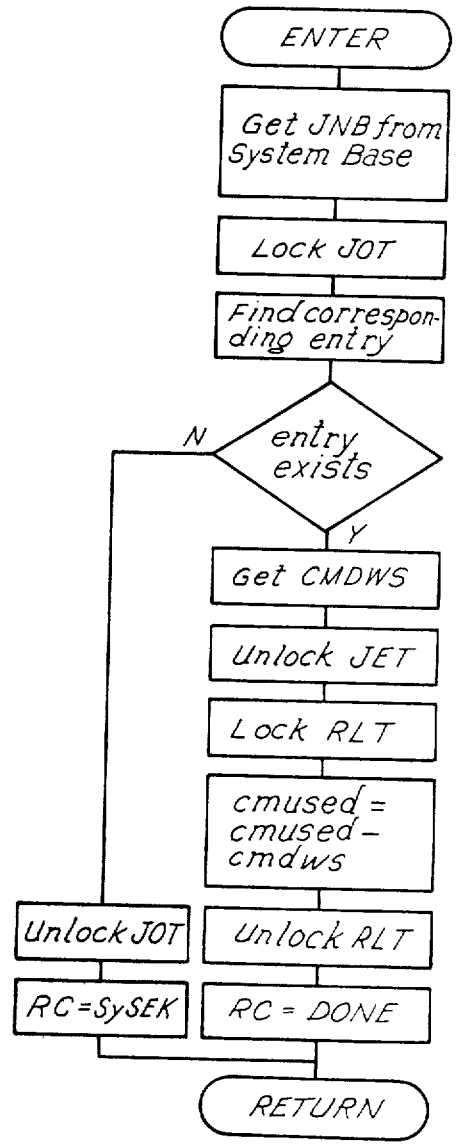

Fig. 39

```
3 SLFICB_ACC_SHAR_LEVEL, /* SHARING LEVEL */
  4 SLFICB_ACC_SHAR_FCB BIT (3), /* FCB SHARING LEVEL
                    1xx : PROCESS
                    x1x : PROCESS GROUP
                    xx1 : SYSTEM */
  4 SLFICB_ACC_SHAR_FILE BIT (3), /* FDB (FILE) SHARING
                    LEVEL
                    1xx : PROCESS
                    x1x : PROCESS GROUP
                    xx1 : SYSTEM */
  4 SLFICB_ACC_SHAR_BUFFER BIT (1); /* IF '1' THEN BUFFERS
                    ARE SHARED AT FDB SHARING LEVEL; IF
                    '0' THEN BUFFERS ARE SHARED AT FCB
                    SHARING LEVEL */
```

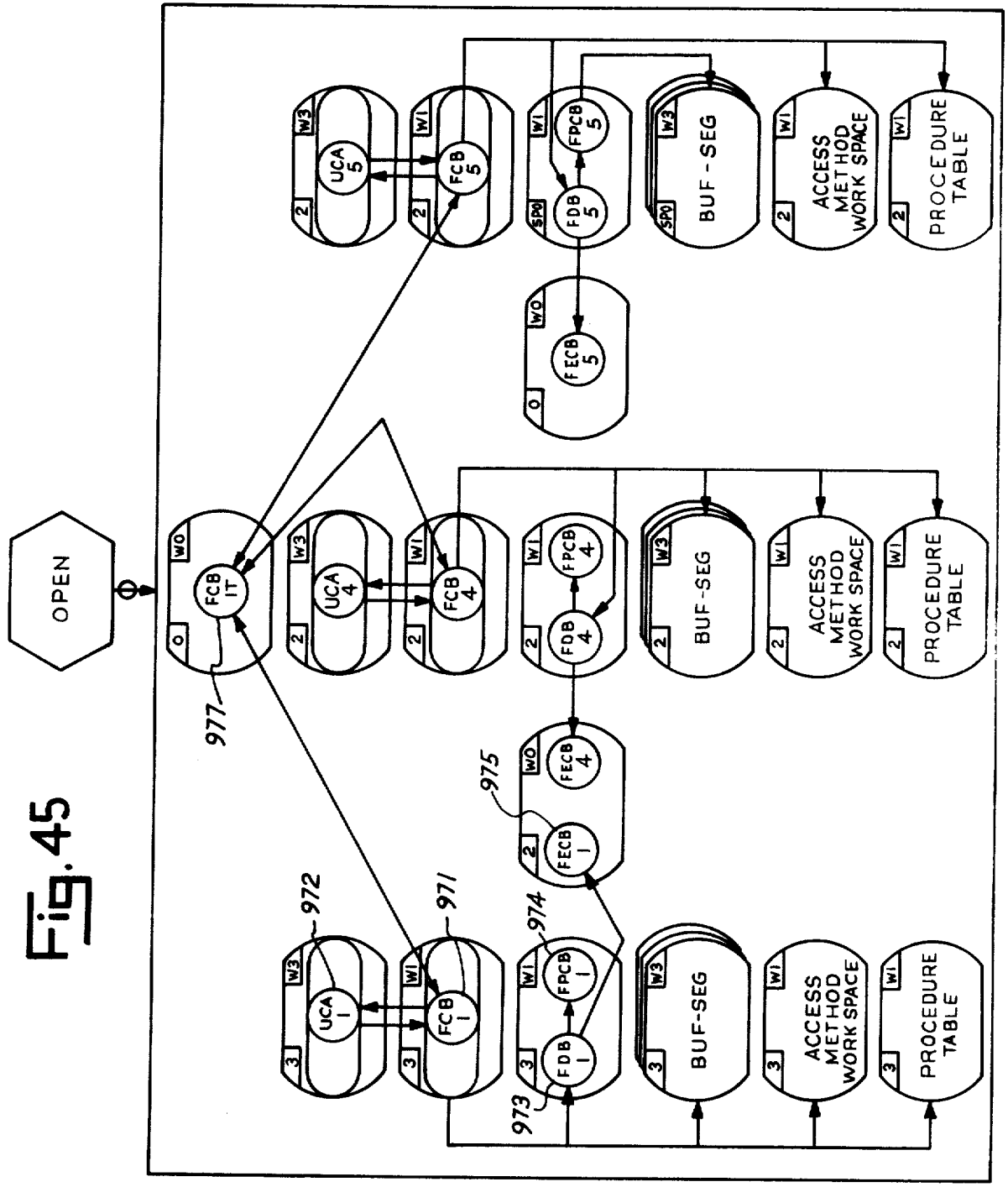

Fig.46A

```
DCL 1 FCB,
    2 FCB_TYPE CHAR (4), /* TYPE OF THE STRUCTURE MUST BE 'FCB' */
    2 FCB_HEADER,
        3 FCB_FDB_PTR PTR, /* POINTER TO THE FDB */
        3 FCB_ACCM_PTR PTR, /* POINTER TO ACCESS METHOD SECTION OF
                              THE FCB */
        3 FCB_BASIC_WORKAREA PTR, /* POINTS TO A SEGMENT TO BE USED
                                     TO BUILD CHANNEL PROGRAMS AND STORE
                                     INFORMATION ABOUT THEM */
        3 FCB_BPCT_PTR PTR, /* POINTER TO BUFFER POOL CONTROL TABLE
                              OF THE FCB */
        3 FCB_SUBFPCB_PTR PTR, /* USED IN CASE OF SHARING */
        3 FCB_IFN_STRING CHAR (8), /* INTERNAL FILE NAME */
        3 FCB_FILE_INDEX CHAR (8), /* FILE INDEX */
        3 FCB_STATUS,
            4 FCB_OPEN1_FLAG BIT (1), /* IF '1' THEN OPEN1 IS COMPLETED */
            4 FCB_OPEN2_FLAG BIT (1), /* IF '1' THEN OPEN2 IS COMPLETED */
            4 FCB_PGFCD_LOCK_FLAG BIT (1),
            4 FCB_PGFD_LOCK_FLAG BIT (1),
            4 FCB_KNOT_LOCK_FLAG BIT (1),
            4 FCB_FICB_LOCK_FLAG BIT (1),
            4 FCB_FDB_LOCK_FLAG BIT (1),
            4 FCB_DEDCB_LOCK_FLAG BIT (1),
            4 FCB_COOPERATIVE_FLAG BIT (1);
        3 FCB_NUMBER_OF_BUFFERS FIXED BIN (15); /* NUMBER OF BUFFERS
                                                   PER FILE OR SUBFILE PROVIDED BY THE
                                                   USER AT COMPILING TIME */
```

Fig.46B

```
2 FCB_COMMON_PROCEDURES,
  3 FCB_OPEN_FILE_PROC PTR, /* POINTER TO ENTRY POINT OF ACCESS
                                METHOD OPEN PROCEDURE */
  3 FCB_CLOSE_FILE_PROC PTR, /* ACCESS METHOD CLOSE */
  3 FCB_GET_PROC PTR, /* ENTRY VARIABLE */
  3 FCB_PUT_PROC PTR, /* ENTRY VARIABLE */
  3 FCB_PROCESSING_MODE,
    4 FCB_INPUT BIT (1),
    4 FCB_OUTPUT BIT (1),
    4 FCB_UPDATE BIT (1),
    4 FCB_IO BIT (1),
    4 FCB_APPEND BIT (1);
  3 FCBIT_INDEX FIXED BIN (15); /* INDEX OF THE ENTRY IN THE
                                   FCBIT WHICH CONTAINS THE ADDRESS OF
                                   THE FCB AND JP NUMBER */
```

Fig.46C

```
2 FCB_STANDARD_ACCESS,  /* STANDARD ACCESS SECTION */
    3 FCB_SHARING,  /* SHARING LEVEL OF THE FCB */
        4 FCB_PROCESS_SHG BIT (1),  /* PROCESS LEVEL OF SHARING */
        4 FCB_GROUP_SHG BIT (1),  /* PROCESS GROUP LEVEL */
        4 FCB_SYSTEM_SHG BIT (1);  /* SYSTEM LEVEL */
    3 FCB_FILE_SHARING,  /* SHARING LEVEL OF THE FILE */
        4 FCB_FILE_PROCESS_SHG BIT (1),  /* PROCESS LEVEL */
        4 FCB_FILE_GROUP_SHG BIT (1),  /* PROCESS GROUP LEVEL */
        4 FCB_FILE_SYSTEM_SHG BIT (1);  /* SYSTEM LEVEL */
    3 FCB_SHARING_CONTROL,  /* LEVEL WHERE THE SHARING CONTROL IS
                                PERFORMED */
        4 FCB_NO_SHARING_CTL BIT (1),  /* NO SHARING */
        4 FCB_FILE_SHARING_CTL BIT (1),  /* FILE LEVEL SHARING
                                            CONTROL */
        4 FCB_RECORD_SHARING_CTL BIT (1);  /* RECORD LEVEL
                                              SHARING CONTROL */
    3 FCB_LOCK INF,
        4 FCB_LOCK BIT (2),  /* 00 UNLOCKED
                                01 LOCKED INPUT
                                10 LOCKED OUTPUT */
        4 FCB_LOCK_TYPE BIT (1);  /* 0 AUTOMATIC 1 MANUAL */
    3 FCB_REFERENCE_MODE,
        4 FCB_MOVE_MODE BIT (1),  /* MOVE MODE */
        4 FCB_LOCATE_MODE BIT (1),  /* LOCATE MODE */
        4 FCB_SUBSTITUTE_MODE BIT (1);  /* SUBSTITUTE MODE */
```

SYSTEM FOR PROTECTING SHARED FILES IN A MULTIPROGRAMMED COMPUTER

RELATED APPLICATIONS

Reference is made to the following co-pending applications, each assigned to the assignee of this invention:
(1) "SEGMENTED ADDRESS DEVELOPMENT," Ser. No. 470,430, filed Sept. 3, 1974;
(2) "ARRANGEMENT FOR ALLOCATING REQUESTED SPACE IN MAIN MEMORY OF A COMPUTER," Ser. No. 529,254, filed Dec. 2, 1974;
(3) "PROCESS MANAGEMENT SYSTEM FOR A DATA PROCESSOR," Ser. No. 529,012, filed Dec. 2, 1974;
(4) "PROCESS MANAGEMENT INSTRUCTIONS FOR A CENTRAL PROCESSOR," Ser. No. 529,253, filed Dec. 2, 1974; and
(5) "PROTECTION OF DATA IN AN INFORMATION MULTIPROCESSING SYSTEM BY IMPLEMENTING A CONCEPT OF RINGS TO REPRESENT THE DIFFERENT LEVELS PRIVILEGES AMONG PROCESSES," Ser. No. 528,953, filed Dec. 2, 1974.

FIELD OF THE INVENTION

This invention relates to electronic data processing systems and, more particularly, to arrangements for protecting the integrity and privacy of shared files in a multiprogrammed computing system.

BACKGROUND OF THE INVENTION

Conventional computing facilities normally include a central processing unit, a random-access main memory, and an assortment of peripheral devices such as magnetic tape and disc secondary storage devices, card readers and punches, line printers, and communication terminals. The instructions and data utilized by a given data processing operation are often obtained from files stored on secondary storage volumes (tape reels, disc packs, card decks, etc.) and the library of files, like the hardware devices themselves, accordingly represents a valuable system resource.

In order to efficiently utilize the resources of a given computing facility, arrangements have been devised for automatically scheduling tasks which represent the system's workload and for allocating the system resources necessary to carry out these tasks. Such a job management system normally operates under the general control of the system operator who issues directives to the system in an interpretable job control language [see, for example, *OS Job Control Language* by Shelley & Cashman (Anaheim Publishing Co. — 1972)].

One important function of such a job management system is the assignment of specified files to job steps at the time they are loaded for individual execution. This permits general purpose programs to be written which are capable of manipulating a variety of files of the same general class, the particular file being specified by job control language directives at the time the job step is loaded. Thus, for example, a source language payroll program may operate upon a file relating to one company at one time and the same program may manipulate another company's payroll records at a later time. By the same token, it may be desirable to utilize a single file during the execution of different programs, and files may thus be thought of as shared resources.

While it is desirable to make the sharing of files as easy as possible, the ability to share files raises the possibility that they may be inadvertently or maliciously destroyed by an unauthorized user. In a computing facility shared by many users, it is essential that the privacy, security and integrity of each user's file be preserved. Unauthorized access to files must therefore be made not merely difficult — it must be made practically impossible.

In multiprogrammed computing systems in which many processes are concurrently active within the system on behalf of different users, an indirect addressing mechanism called "segmented addressing" has proven to be a valuable technique for isolating the address space in memory accessible to each process. One such system is described in *The Multics System: An Examination of its Structure* by E. I. Organic (The MIT Press — 1972).

Briefly, in segmented addressing systems, all instructions and data relating to a given process are placed in variable sized blocks (called "segments") and the beginning address (called the "base address") of each segment is placed in a directory (called a "segment table"). The base addresses of a set of segment tables may then be located in a more comprehensive directory. This ordered set of directories is created in main memory at the time the instructions and data relating to a given process is being loaded into memory and the directories are then updated from time to time as necessary when segments are created, deleted, modified, or moved.

Instructions making up a procedure then specify the location of operands by means of a logical address which identifies the number of a segment table and the number of an entry in that segment which contains the base address of the target segment. The logical address also specifies the offset (displacement) which is to be added to this base address to locate the desired operand. Because each process is able to address main memory locations only through its own directory tables, it is thus incapable of addressing information contained in segments created for another process.

In the Multics System, noted earlier, the segment directory structure is extended to embrace not only active segments stored in the system's virtual memory but to collections of records on secondary storage devices (normally called "data sets" or "files," but treated as segments in Multics). Thus, a procedure may directly address a record on secondary storage by means of a logical address and, in response, system procedures will automatically transfer the segment containing the record addressed from secondary storage into virtual memory.

Unlike the Multics segment management system in which segments on secondary storage are directly addressable by the executing procedure, more conventional "file management" systems manipulate information on secondary storage by dealing with files and buffers. The programmer furnishes a description of the needed file (which may be supplemented by a job control language directive at the time a specific file is assigned when the procedure is loaded by the system operator) to form a file control information structure. System procedures (called "access methods") are then employed to bring the needed records from secondary storage into a buffer area in main memory. A more detailed description of a widely used file management system appears in *Data Structure and Management* by Ivan Flores (Prentice-Hall 1972).

SUMMARY OF THE INVENTION

In the present apparatus, files and buffers are manipulated through the use of "file control structures" in which information which describes the file and its use is organized in a predetermined format. These file control structures are stored in memory and are available to system management procedures, even though the contents of the file itself may be unavailable (e.g., on an unmounted media volume, such as a tape reel stored in a tape library).

Typically, the file control structures relating to a particular file originate, in germinal form, by the writing of a "file declaration" (FD) statement at the beginning of a source language program for a procedure. Such a file declaration identifies a file to be used in the procedure by means of an "internal file name" (ifn), and further describes the attributes of the file and the manner in which the file is to be used. In the present arrangement, the source language programmer is given the ability to specify (among other things): (1) the degree to which files, buffers, and file control structures are to be shared (if at all) among those related processes which make up a given computing job, or among other jobs; (2) the "processing mode" in which the file is to be used (e.g., whether the file is to be written, read, updated, added to, etc.); (3) whether or not the file will be shared synchronously by cooperating processes which will share current record addresses; and (4) whether or not "sharing control" procedures will be employed at the time the file is being accessed to lock and unlock the file with respect to other processes.

During compilation, file declaration statements are expanded into source language file control structures in skeletal segments forming, with other information about the procedure, a "compilation unit." References between related compilation units are later resolved, during linking and editing, to form a machine-executable "load module."

At the time a given computing job is launched, information contained in job control language statements, particularly "assign" statements, are expanded into control language file control structures and merged with the source language control structures in the load module to form executable file control structures. These structures represent both a description of the file and a request for permission to use the file in a stated manner. If the file requested already exists and has been cataloged, tests are made to insure that the account on whose behalf a given job is being launched is identified in the catalog as an account which is authorized to use the file as requested.

In the present arrangement, before a given job step can become active, all of the files (and other resources) required by the job step in order to complete its run must be found to be available. The failure to obtain the allocation of any needed resource will prevent the job from becoming active.

In order to receive the assignment of a requested file, the file request must be compatible, not only with the sharing permissions granted by the file creator, but also with the manner in which the file is currently being used by other job steps which are active and to which the file has already been assigned.

The requesting file control structure thus identifies the requested file, specifies the rules which are to govern the sharing of the file while the requesting job step is active, and specifies the requested use to be made of the file. Separate file control structures specify the rules currently governing the sharing of the requested file and further describe the use currently being made of the file by other active job steps.

The request control structure is then compared with current-status control structure. Access to the file by the requesting job step is denied when the requested use would violate one of the current rules, or when the current condition of use would violate one of the requested rules.

If assignment is granted, the current status file control structure is updated, the previous current rules being replaced by requested rules to the extent that the requested rules are more restrictive, and the current use being updated to reflect the additional use granted to the requesting job step.

In accordance with the invention, the file protection techniques outlined above cooperate advantageously with a segmented addressing mechanism for isolating the address spaces of different processes and groups of processes, with a ring protection mechanism for preventing access to privileged information from less privileged processes, and with access method procedures which facilitate the handling of voluminous data by means of files and buffers, yielding an overall system in which permissible file-sharing is encouraged while unauthorized file access is made practically impossible.

BRIEF DESCRIPTION OF THE DRAWINGS

A more detailed understanding of the organization and operation of the present invention may be obtained by referring to the following description which is presented in connection with the attached drawings in which:

FIG. 5 is a diagram which depicts an arrangement for locating a process control block through a process of indirect address development, beginning with the boundary address;

FIG. 6 is a diagram showing an arrangement for developing the absolute address of data specified by an instruction;

FIG. 9 is a flowchart depicting the transitions of a job step between the declared, active, blocked and terminated states;

FIG. 11 is a flowchart showing the steps undertaken to de-allocate a J-number upon process group termination;

FIG. 13 is a flowchart showing the sequence of steps involved in the de-allocation of resources at the second allocation level;

FIG. 15 is a flowchart indicating the manner in which user memory is dynamically released;

FIGS. 21 through 29 of the drawings are information structure definitions expressed as data declarations in standard PL/1 programming language;

FIGS. 30-33 are decision tables which illustrate the manner in which files are controllably shared between process groups;

FIG. 34 is a flowchart illustrating the steps used to allocate control memory space;

FIG. 35 is a flowchart illustrating the manner in which control memory space is de-allocated at the time of process group termination;

FIG. 39 shows the information structure definition expressed in PL/1 programming language of the sharability parameters section of SLFICB;

FIG. 45 shows the organization of the execution-time control structures created by execution of file OPEN procedures;

FIGS. 46A-C are data declaration statements defining that portion of the control structure FCB relevant to file sharing.

DETAILED DESCRIPTION

Introduction

Figure 1:
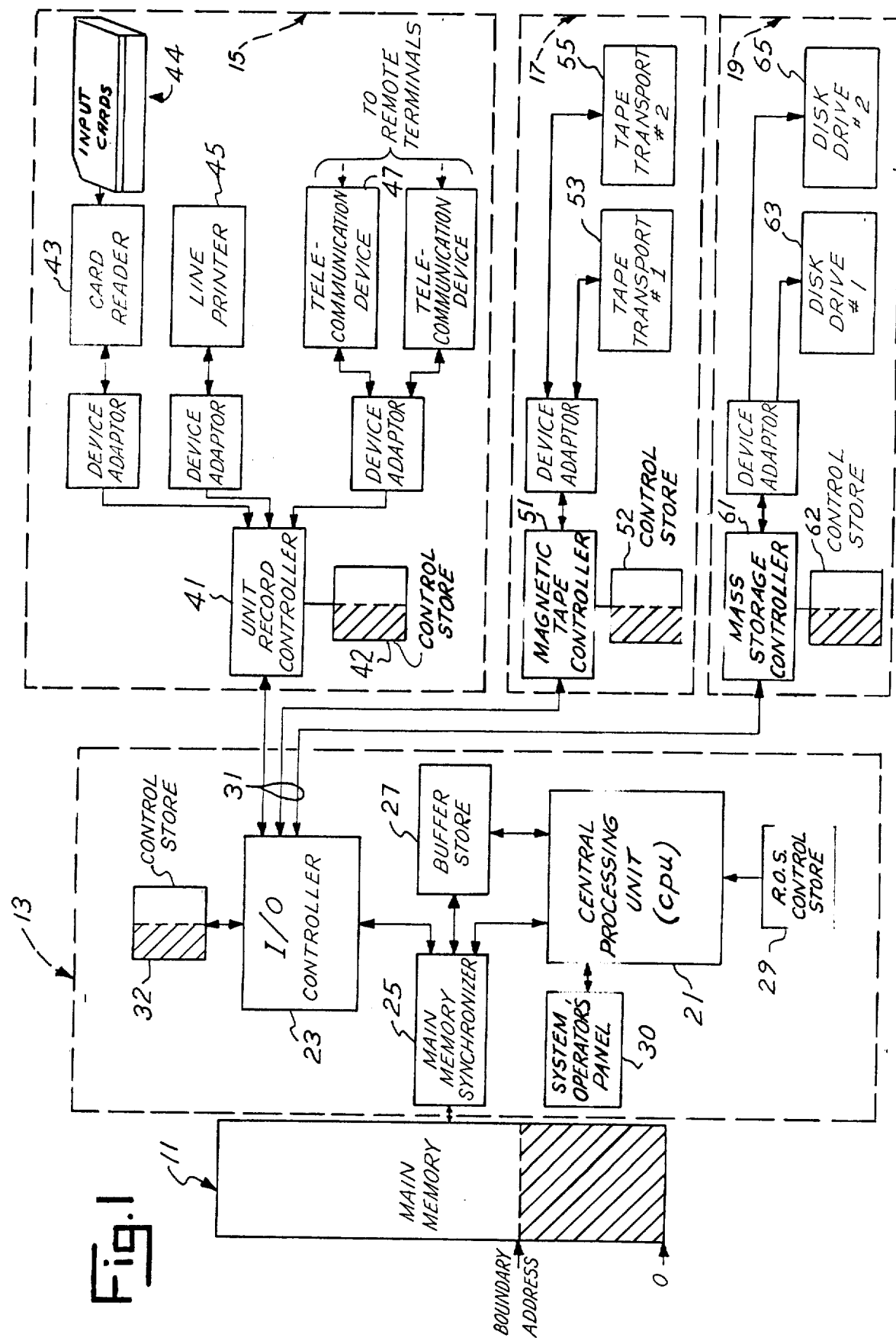
FIG. 1 is a block diagram of an illustrative data processing system of the class in which the principles of the present invention may be employed to advantage.

The instrumentalities for managing the execution of multiple tasks in a multiprogrammed computing system, and for controllably sharing resources (including files) among these tasks, are necessarily complex. In the description which follows, the general organization of a computing system of the type in which the principles of the present invention may be applied to advantage is discussed under the topic headings:

Processor Subsystem;
Peripheral Subsystem;
Input and Output — Generally;
Channel Programs;
IOC Operation; and
System Organization.

Thereafter, a preferred arrangement for manipulating active processes within the system, for managing the virtual memory address space available to these processes, and for transferring control over CPU operation from one process to another, is described under the topic headings;

Process Control Block;
Memory Segmentation;
Process Address Space;
Virtual Memory;
Process Management and Synchronization;
Process States;
Process Dispatching;
Process Synchronization; and
Main Memory Mapping.

Next, attention is turned to the system as viewed by the users who create the stream of job steps which constitute the system's workload under the topic headings:

Classification of User Procedures and Processes;
Starting the First User's Job; and
Step Occurrences — Generally.

The arrangement provided for allocating system resources in order to prevent deadlocks is next described under the topic headings:

Resource Management — Generally;
Resource Allocation Queues — Generally;
Resource Classes — Generally;
J-number Allocation — Details;
User Memory Allocation — Details; and
Backing Store Allocation — Details.

Assigning files to job steps involves special procedures which cooperate in the overall scheme for protecting the integrity of shared files. File assignment, and the related topics of device, volume space, and control memory space assignment, are described under the topic headings:

File Assignment — Details;
Device Allocation — Details;
Media Mounting;
Volume Space Allocation — Details; and
Control Memory Allocation — Details.

The discussion of the resource allocation strategy employed in the present arrangement is completed with a description of:

Process Group Loading Ability — Details; and
Resource Allocation Queues — Details.

The specification then continues with a discussion of the manner in which file control information structures are created, developed, and used in cooperation with the system's segmented addressing mechanism to encourage file sharing while protecting files against unauthorized use. This discussion is presented under the topic headings:

Protection of Shared Information Through Classification of Segment Tables;
File Control Structures — Generally;
Reference to a File;
Process Group Level Control Structures;
Building File Control Structures During Process Group Initiation;
Process and Process Group Loading;
File Open; and
File Control Block Index Table (FCBIT).

The specification concludes with a description of a file protection mechanism called "sharing control" which operates in conjunction with standard "access method" procedures at execution time to provide an additional safeguard to insure file integrity. This concluding discussion is presented under the topic headings called:

Access Methods — Generally
Sharing Control
Protection of Shared Files — An Overview

Processor Subsystem

A data processing system of the type intended for medium- to large-scale business and scientific use is shown in the block diagram of FIG. 1 to illustrate, by way of example, one application of the principles of the present invention.

The computing system shown in FIG. 1 is composed of several coordinated hardware subsystems. These subsystems are: a main memory storage subsystem 11, a processor subsystem 13, and three peripheral subsystems 15, 17 and 19.

The processor subsystem 13 contains a central processing unit (CPU) 21 and an input-output controller (IOC) 23. CPU 21 performs the basic processing operations for the system while the IOC 23 controls all information exchanges between the storage subsystem 11 and peripheral subsystems 15, 17 and 19.

The processor subsystem 13 further includes a main memory synchronizer 25 and a buffer store 27. The main memory synchronizer 25 resolves conflicts for the use of main memory among the CPU 21, the buffer store 27, and the IOC 23. Conflicts are resolved on a priority basis: the IOC has the highest priority followed by memory writes (from the CPU 21) and then memory reads into the buffer store 27. The buffer store 27 is a small, high-speed buffer memory that reproduces selected regions of main memory and interfaces with the CPU 21 to decrease average memory access time. During each memory read, both the buffer store 27 and main memory 11 are accessed. If the information to be fetched is already in the buffer store 27, the attempt to read main memory 11 is terminated and the needed information is fetched instead from the buffer store. Otherwise the main memory 11 is read. Every time memory 11 is read, the CPU 21 fetches the entire "page" (32 bytes) containing the desired information. This page remains in the buffer store 21 for a time to meet future references to further information within the page. Since operation of the buffer store 27 is invisible to the system user, the program controlling the computer at any given moment cannot determine whether the information it is processing has been fetched from the buffer store 27 or from main memory 11.

The detailed operations taking place within the CPU 21 are controlled to a significant extent (but, as will be seen, not completely) by microprograms stored within a "read-only storage" (ROS) control memory unit 29. A control store unit of this type is described in U.S. Pat. No. 3,634,883 issued on Jan. 11, 1972 to Leonard L. Kreidermacher, and a detailed, general discussion of microprogramming control techniques is presented in *Microprogramming: Principles and Practices* by Samir S. Husson, Prentice Hall, Inc. (1970).

Control store memories are commonly made up of solid-state, read-only devices capable of very rapid cycle times, each memory location in the control store being operative to control a cycle or subcycle within the CPU 21. As each control store memory location is read, its contents are decoded to condition other functional units within the CPU 21. The control store 29 associated with CPU 21 contains microprograms (firmware) which, as will be seen, assist in the initialization of the system, decode the standard CPU instruction set, and may further provide optional scientific instructions, test routines, emulation packages, or special purpose features which extend the capabilities of the processor subsystem.

Some of the firmware for controlling the operation of the processor subsystem 13 is written into a zone of physical addresses in the main memory 11 (shown by the shaded area in FIG. 1), beginning at physical address "zero" and extending to a "boundary address." This additional set of microcode, stored in this "hardware area" of main memory 11 at the time of system initialization, is unique to the particular system installation and contains information related to the type and status of the particular hardware devices employed, the configuration of the system, and special firmware options selected for that installation. Further control of the processor subsystem may be effected manually through hardware-visible switches and pushbuttons located on the system operator's panel (SOP) 30.

The IOC 23 of the processor subsystem provides a data path between any peripheral subsystem and the storage subsystem. This path communicates "channel commands" to the peripheral subsystems and controls the resulting data transfers. IOC 23 interfaces with the peripheral subsystems via the "physical" IO channel 31. Directly associated with the IOC 23 is a read-write control store 32 capable of receiving, at the time of system initialization, installation-dependent control firmware (as illustrated by the shaded area in block 23). In addition, the control store 32 stores installation-dependent microcode (which may be in read-only storage as illustrated by the unshaded area of the IOC control store block 32). Alternatively (or additionally), control microcode for the IOC 23 may be stored in the hardware area of main memory 11.

PERIPHERAL SUBSYSTEMS

Each of the peripheral subsystems 15, 17 and 19 includes a peripheral control unit, a stand-alone microprogrammed processor that relieves the load on the processor subsystem 13 by controlling IO devices during IO operations. The peripheral control units do this by executing instructions contained in channel programs stored in main memory 11. These channel programs control the arithmetic, logical, transfer, shift and branch operations performed in the peripheral subsystems.

For example, in peripheral subsystem 15, the control unit employed is a unit record controller (URC) 41 which can control several low-to-medium speed unit record devices, such as card equipment, paper-tape equipment, telecommunication devices and system consoles. In the example shown in FIG. 1, URC 41 controls a card reader 43, a line printer 45, and a pair of telecommunication devices 47. In peripheral subsystem 17, the peripheral control unit takes the form of a magnetic tape controller 51 which operates a pair of tape transports 53 and 55. The peripheral control unit in subsystem 19 is a mass storage controller 61 shown connected to operate a pair of disc drive units 63 and 65.

Device adapters (DA) mediate between each peripheral control unit and the devices it controls and contain the dedicated logic necessary to implement communication with a particular type of device. Depending on the type, a DA controls one or several devices.

The major functions performed by each peripheral control unit are:

(1) the transformation of instructions from the processor subsystem into a series of commands acceptable to the appropriate peripheral device;

(2) packing and unpacking data in the form needed by the processor subsystem or the appropriate peripheral device;

(3) keeping the processor subsystem informed of the status of the peripheral subsystem and of the devices under its control;

(4) independently initiating and processing error and recovery procedures; and (5) allowing on-line diagnosis of a given peripheral device without disturbing the operation of other devices.

The peripheral control units resolve conflicts for main memory between devices attached to them, while the IOC resolves conflicts between different peripheral control units.

As illustrated in FIG. 1, the peripheral control units 41, 51 and 61 are connected to receive microinstructions from control stores 42, 52 and 62, respectively, each of which may include both read-write and read-only storage sections. The read-write control storage associated with at least selected peripheral control units allows installation-dependent microcode to be loaded at the time of system initialization to render each peripheral subsystem compatible with the remainder of the subsystem.

INPUT AND OUTPUT

The architecture of the system depicted in FIG. 1 is based on the simultaneous operation of the processor subsystem and one or more of the peripheral subsystems 15, 17 and 19. Each of the peripheral control units 41, 51 and 61 is capable of executing a limited instruction repertoire distinct from that of the CPU 21. A set of instructions which performs a peripheral operation is called a channel program. Channel programs reside in main memory and are accessible by both the processor and peripheral subsystems. Specific processor instructions are used to create a channel program, while the execution of the channel program is directed by the IOC 23 and a peripheral control unit. Once execution of a CPU instruction initiating a channel program is complete, that program is executed by the IOC and a peripheral control unit and the CPU 21 is free for other operations.

There is one physical channel 31 for each peripheral control unit connected to the IOC 23. It is, however, possible to multiplex several operations over one channel. This gives rise to the concept of a logical channel, which is a logically defined communications path between main memory 11 and a single peripheral device. Logical channels share a physical channel. Physical channels are associated with peripheral subsystems while logical channels are associated with devices (although several logical channels may be associated with a single device).

Figure 2:
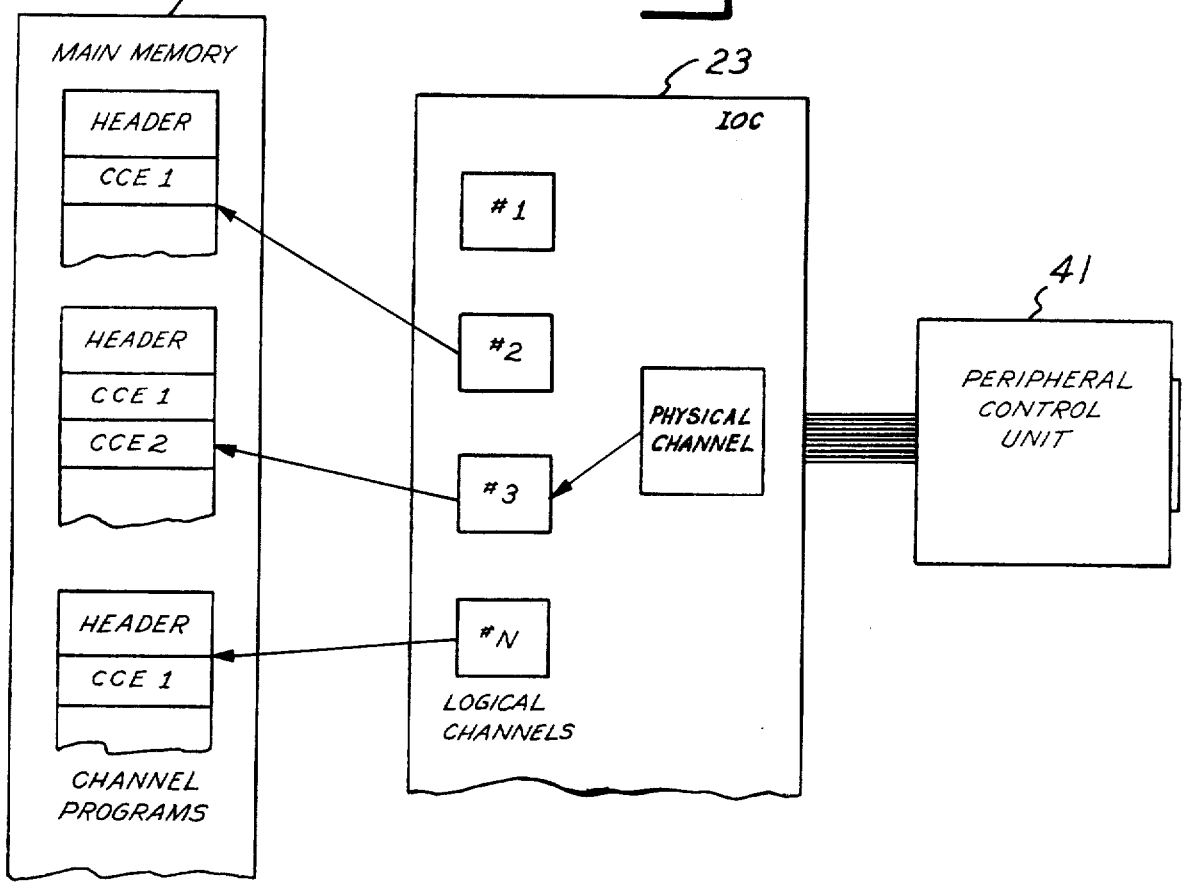
FIG. 2 is a block diagram illustrating logical channel multiplexing.

When a logical channel's program is being executed, the channel is said to be active. In the example of FIG. 2, logical channel 1 is idle; channels 2 and 3 are concurrently active. Channel 2 does not have control of the physical channel at the moment, channel 3 does have control. Channel N, while not idle, is not yet active, but is connected and will become active when the peripheral control unit begins executing its associated channel program.

CHANNEL PROGRAMS

Figure 3:
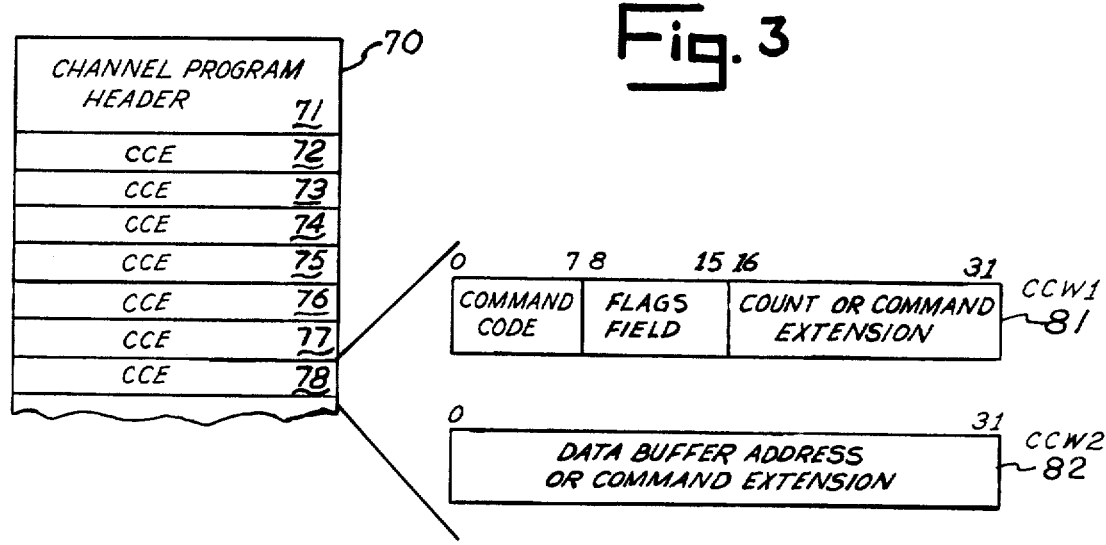
FIG. 3 is a diagram depicting the format of a channel program.

As shown in FIG. 3, a channel program 70 consists of a header 71 followed by a sequence of peripheral control unit instructions. These instructions, called channel command entries (CCE's), are indicated at 72-78 in FIG. 3. The header 70 contains control, status, and address information related to the channel program. A CCE contains a command code, flags, count information, branching information, and buffer addresses and sometimes command extension fields (device-specific command information). Each CCE is two words long: for example, CCE 78 is composed of the channel command words 81 and 82, referred to as CCW1 and CCW2, respectively. FIG. 3 illustrates the structure of a channel program and the generalized format of a CCE.

INPUT-OUTPUT OPERATION

CPU instructions are provided to deal with IO operations. In a typical instruction set, one initiates IO operations, one terminates IO operations, one causes IO operations to resume after they have been temporarily suspended, and one enables the physical channel interface. Other instructions interrogate peripheral tables, or make entries in them, in order to determine or change the status of IO devices and channels. The tables vary in format and may be located either in main memory 11 below the address in the BAR, or in control store 29 as seen in FIG. 1.

One of the IO related CPU instructions, here called "CONNECT", is discussed below to provide a simple example of an IO operation as carried out in the computing system here being discussed.

When a procedure which has control of the CPU 21 needs to perform an IO operation, a CONNECT instruction is executed as part of the procedure to initiate the IO operation on a particular device.

Figure 4:
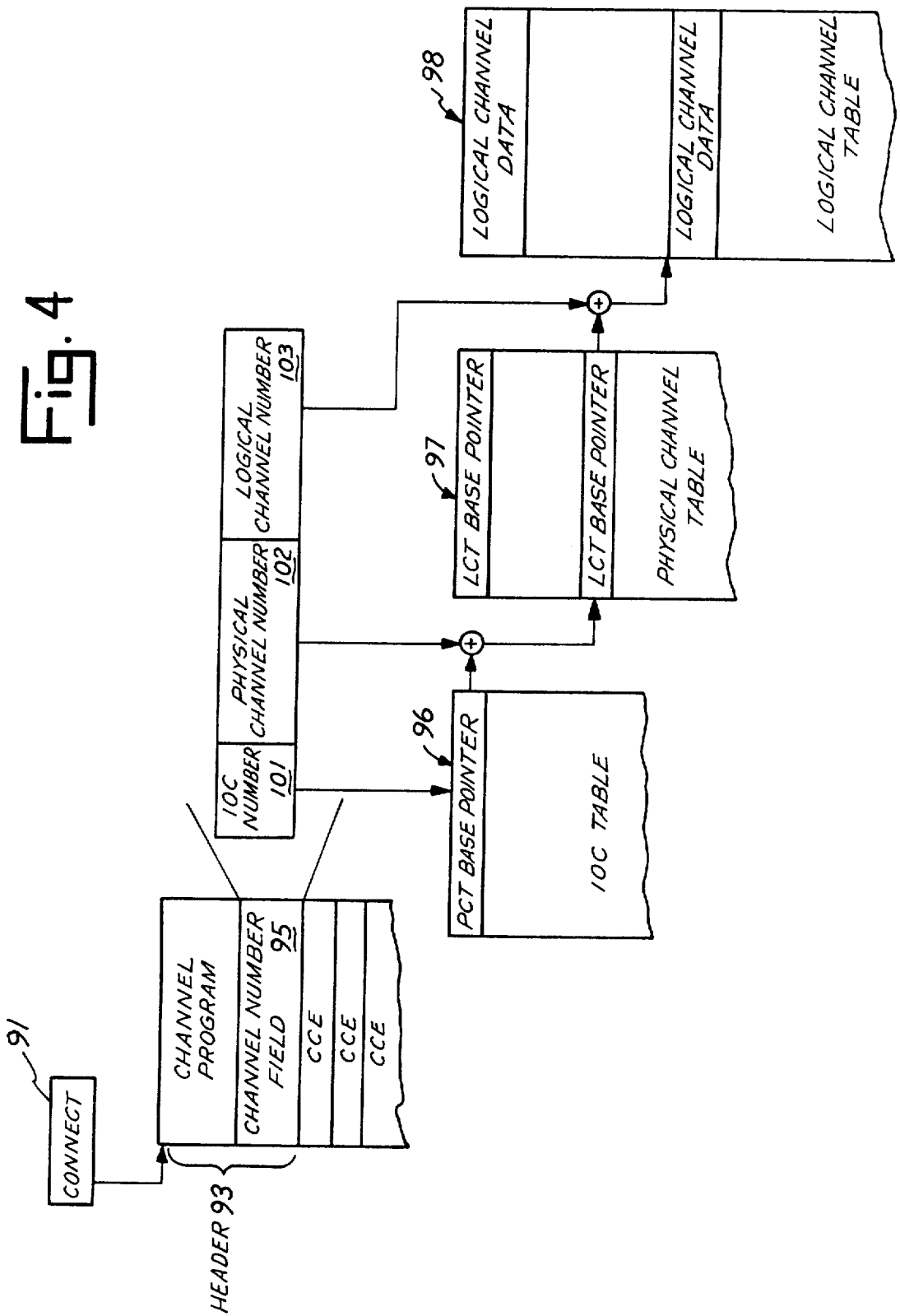
FIG. 4 is a diagram illustrating the manner in which peripheral tables are consulted to yield physical and logical channel data.

As dipicted in FIG. 4, the CONNECT instruction 91 specifies the location of the channel program header 93 associated with the IO operation. Within the header 93 there is a channel number field 95 which refers to three peripheral tables: IOC table 96, physical channel table (PCT) 97, and logical channel table (LCT) 98.

An IOC table 96 is identified by the IOC number 101 of the channel number field (in systems using more than one IOC). The IOC table 96 contains information about the IOC 23 (seen in FIG. 1) and includes a pointer to the base of PCT 97. PCT 97 contains information about each of the physical channels 31 attached to the IOC 23. The PCT address is indexed by the physical channel number 102 in the channel number field to point to channel-specific information. Included in this information is the address of the associated LCT 98. LCT 98 contains information on each of the logical channels assigned to the requested physical channel. The location of the base address of the LCT, indexed by the logical channel number 103 in the channel number field, contains the address in the logical channel data concerning the device controlled by that logical channel.

After accessing the device-specific information in an LCT, the CPU 21 determines if the device is available. If it is available, the address of the channel program for the device is inserted into the LCT entry associated with the device. An entry is then made in an IOC initiation queue associated with the physical channel. At this point the CPU 21 is free of the IO operation and can preceed to the next CPU instruction.

IOC OPERATION

The IOC 23 shown in FIG. 1 scans the initiation queue and signals the appropriate peripheral control unit that a channel program is awaiting execution. The peripheral control unit in turn notifies the IOC 23 when it is ready to process the channel program. When the control unit is ready, the IOC 23 sends it the logical channel number and the first CCE. The peripheral control unit is now in control of the channel program, which it sequences through by requesting CCE's from IOC 23.

Successful execution of a CONNECT instruction thus means that the CPU 21 has examined the peripheral tables, determined that the peripheral resources required for a given IO operation are available, and caused the IOC 23 to queue the operation for execution. In other words, the CPU 21 has requested the IO operation, the peripheral subsystem responsible has indicated the operation is possible, and the IOC 23 will begin the operation as soon as possible. The CPU 21 can now go on to other operations while the IOC 23 and the selected peripheral control unit perform the requested IO operation via the channel program.

SYSTEM ORGANIZATION

Systems of the type shown in FIG. 1 are normally controlled by an operating system, an extensive set of procedures which provides for efficient handling of hardware, data, and programmed resources in a multiprogramming environment. All program execution, peripheral accesses, memory accesses, and operational actions required to perform a user's computations are controlled by the operating system.

Work to be performed by the operating system may be defined externally by a series of job steps via a job control language. A job step is a unit of work to which hardware resources are allocated. Typically, a job step consists of several tasks. A task is the smallest unit of user defined work consisting of a stream of instructions executed without parallelism.

The user-visible concepts of task and job step are represented within the system as a process and process group, respectively. A "process" is here defined as a sequence of instructions undergoing asynchronous execution by the CPU. Several processes can be active and sharing resources, but only one process is actually running at any one instant. A "process group" is that related set of processes necessary to perform one job step.

PROCESS CONTROL BLOCK

One of the primary functions of the operating system is to direct the transfer of control from one process to another. Because processes can relinquish control of the CPU 21 at various points during their execution, a storage area in main memory 11 is made available to a process to save CPU status. This status information is used by the operating system to precondition the CPU 21 before a process returns to a "running" state.

The storage area containing this status information for a given process is here called a process control block (PCB). The data contained in a PCB include the addresses of memory area (address space) assigned to the process, the contents of all pertinent registers, and the state of the process. Thus, a PCB serves as a temporary storage area for information necessary to start or restart a process without any information loss. Each PCB can be addressed via a set of tables which, as will be seen, are loaded during system initialization and modified during system operation.

As dipicted in FIG. 5, an area of main memory 110 (referred to as the system base) is developed by firmware and is accessible via the boundary address register (BAR) 111 which, as noted earlier, can be read but not altered by the operating system or user programs. The system base 110 contains a number of system attributes, including a job step number (J) 113 and a process group number (P) 115 which jointly identify the currently running process. Another attribute in the system base is a pointer 117 containing the absolute address of the base of a hardward defined data structure known as the J-table, shown at 121. This table contain an entry for every job step present in the system. Each entry in the J-table points to an associated table (e.g., P-table 123 seen in FIG. 5) which is also a hardware defined data structure. This table defines each process group, and contains a P-table entry for every process in the process group. Each P-table entry points to a PCB (e.g., PCB 125 seen in FIG. 5).

As seen in FIG. 5, the J-table pointer indexed by the J-number provides access to a J-table entry. This entry contains a P-table pointer which, when indexed by the P-number, provides access to a selected P-table entry. The P-table entry contains a pointer to the PCB of the current running process. Thus the operating system can access the active PCB using the contents of the BAR and can access any other PCB given its associated J, P name.

MEMORY SEGMENTATION

In a multiprocess environment, there may be many processes in memory at any given time. These processes vary in size and demand for memory which causes a memory allocation problem solved through the dynamic allocation of memory space. Due to the random nature of memory requirements, memory is allocated in variable size segments and the memory allocation can be restructured during process run time. Thus a process may be allocated a number of noncontiguous memory segments. This memory allocation method is called segmentation.

Segmentation presents an additional problem in that memory addresses have to be modified whenever part or all of a process is relocated. To alleviate this problem, in the present system, addresses used by a process are "logical" rather than absolute main memory addresses. These logical addresses are used to develop (but are independent of) absolute addresses.

Segmentation also allows each process to access its own or related memory segments via a system of directories. By accessing these directories, a process can obtain the absolute address of a segment. These directories are contained in main memory and are maintained by the operating system.

PROCESS ADDRESS SPACE

The addresses of information needed by a given process are developed by a sequence of directory retrievals, beginning with the absolute address contained in the boundary address register (BAR) 111, through the system base 110, the J and P tables 121 and 123, to yield the absolute address of that process' PCB, as shown in FIG. 6. The PCB 125 for the process contains two address space words ASW0 and ASW1, each pointing to a segment table word array (e.g., STWA 127). The operating system updates the contents of the ASW's whenever the associated STAW's are relocated. Working down the chain of pointers and decoding the segment descriptor is a firmware function and thus, once initiated, is not visible even to the operating system.

As shown in FIG. 6, the address of needed data is calculated by firmware using the contents of a base register 131, a displacement value specified in the operand field (address syllable) of an instruction 135 and optionally the contents of an index register 137 also specified in the instruction. A segment address thus consists of a segment table number (STN), a segment table entry (STE) and a segment relative address (SRA) as shown in FIG. 6.

The quantity STN from base register 131 defines an entry in segment table word array 127 which points to a segment table 140. The quantity STE defines an entry in segment table 140 which is a segment descriptor which points to a specific segment 141. The SRA combines quantities from the instruction 135, the index register 137, and the base register 131, and specifies the relative location within the designated segment.

Addressing is a two step operation. First the address syllable in the user's instruction (indicated at 143 in FIG. 6) is a logical address and is used by firmware to develop the "effective" address (STN, STE, SRA). Then this effective address is used to develop an absolute memory address. Effective address development provides addressing flexibility while absolute address development provides for maximum memory utilization by the hardware and the operating system. An effective address is developed from the contents of the address syllable and the contents of the base register specified by the address syllable. This information provides the segment number (STN plus STE) and the SRA. An absolute address is developed using the segment number to access a segment descriptor and the SRA to access data within the segment described. Further details and variations on this method of segmented address development are described in U.S. patent application Ser. No. 470.430.

It should be noted from the above explanation that the effective main memory address can be referenced to the absolute main memory address only by accessing the segment tables. However, because of the number of memory accesses that must be made to obtain the base address of the memory segment (contained in the segment descriptor), an associative memory is contained in the CPU. The associative memory stores the most recently used segment descriptors along with their segment numbers. During absolute address development, the segment number in the effective address is compared to the segment numbers in the associative memory. If an equal comparison is found, the segment descriptor in the associative memory is used for the address computation. (Thus, main memory cycles are saved during the address development.) If an equal comparison is not found, the segment descriptor is fetched from memory in the normal manner and stored in the associative memory, along with its segment number, for future reference.

VIRTUAL MEMORY

Segmentation makes possible the definition of an exceedingly large address space as being available for processes, greatly in excess of the capacity of main memory: therefore, secondary storage is used in conjunction with main memory. The operating system creates the illusion that the system has a much larger main memory than is really available. This concept is called virtual memory.

At any given time, a defined segment may or may not be physically in main memory. The contents of a segment descriptor indicates whether or not the associated segment is in main memory. The hardware detects any attempt by a process to access a segment not in main memory and notifies the operating system. The operating system causes the desired segment to be loaded into main memory from secondary storage. Then the operating system places the segment's memory address in the segment descriptor which is the only place where the absolute address of a segment can be found. This operation is invisible to the process and thus it is not aware that the segment was not in main memory or that it may have to be relocated in main memory. The details of a preferred arrangement for providing a virtual memory environment are disclosed in the above-identified U.S. patent application Ser. No. 470,430.

PROCESS MANAGEMENT AND SYNCHRONIZATION

The system shown generally in FIG. 1 provides for multiprocessing operations which are controlled by the operating system which creates and deletes processes within the system and provides for synchronization among processes. The multiplexing of processes on the CPU 21 is carried out under hardware/firmware control.

Processes are normally started and stopped at the initiation and termination of I/O operations, during related job handling, and at other times for purposes deemed necessary by the operating system. Therefore, a communications system is necessary to efficiently start and stop related processes and to pass information between them, preferably by means of internal messages passed via "semaphores" which provide a communications link among the processes.

PROCESS STATES

A process can be in one of four basic states at any time; running, ready, waiting or suspended. The hardware recognizes these four possible process states and executes various firmware procedures to effect process dispatching, state changes, and to maintain data structures based on a process' state. Each PCB contains a state field which defines the current state of its associated process.

Figure 7:
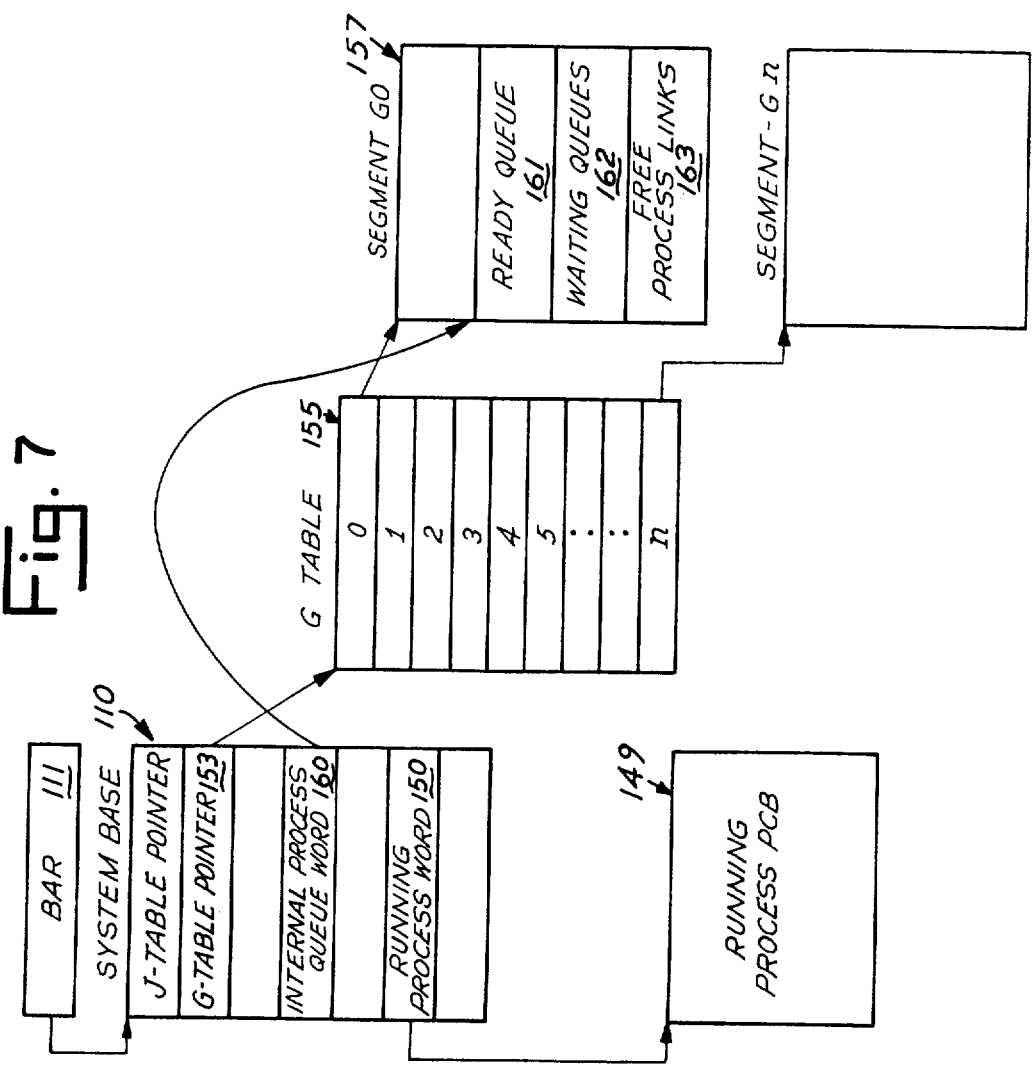
FIG. 7 is a diagram illustrating the information structures pointed to from the system base located adjacent the boundary address.

A process is in the "running" state when it has control of the CPU 21. This state involves supplying the CPU with an address space (segment tables) and a starting address pointed to by the process' PCB. The CPU 21 then executes instructions in the procedures segments of the process. The process name [logical address (J, P)] of the PCB 149 for the currently running process is retained in the running process word 150 within the system base 110, as shown in FIG. 7.

The "ready" state is equivalent to running except that the process does not have control of the CPU. A process in the ready state is in contention for the CPU with other ready processes and the running process.

A process is in the "waiting" state when it cannot continue until a specific event occurs such as a message via a semaphore. A waiting process is not in contention for the CPU but it may be in contention with other waiting processes for the required event.

A "suspended" process is a process which has been stopped for a time by software and may be resumed later. The decision to stop and resume the process is external to the process. Thus, a suspended process is not active and therefore cannot receive notification of event occurrences and cannot utilize the CPU.

PROCESS DISPATCHING

Processes move from one state to another voluntarily by action of the process while running or involuntarily by the actions of other processes. CPU firmware controls the transition of processes between states, using a set of queues to manipulate processes which are in the ready or waiting states.

A ready or waiting process is represented by a PCB and a special queue entry called a "process link". Each process link specifies the process name (J, P), the process priority and a pointer to the next process link in the queue.

A hardware device similar to the J-table, known as the G-table (indicated generally at 155 in FIG. 7), contains pointers to general, system wide segments. The first element, G0, of the G-table 150 points to a segment 157 containing the dispatcher queues. A pointer 159 to the G-table is found in the system base 110. Also in the system base 110 is an entry called the internal process queue word (IPQW) 160 which identifies the head of the ready queue, zone 161 with G0 segment 157.

Thus, all ready processes can be examined by consulting the ready queue. When the currently running process changes states, the dispatcher moves the process link at the head of the ready queue and uses the J, P name to access the PCB which defines the new running process.

Since more than one process may be awaiting the same event, a queue of waiting processes exists for each event (as indicated at 162 in FIG. 7). Waiting processes are also strung together via "free process links" residing at 163 in the G0 segment. A pointer to the head of a wait queue exists in a semaphore. A number of events exist for which a process may wait; therefore, there are a number of wait queues each of which has an associated semaphore.

Further details concerning this preferred approach to the management of processes in a multiprocessing system are described in the above-identified U.S. patent application Ser. No. 529,254.

PROCESS SYNCHRONIZATION

Process synchronization is required to coordinate the activities of two processes working on the same task. The synchronization is preferably achieved using semaphores which are data structures residing in the address space of communicating processes. A semaphore is used to signal event occurrence and to handle queues of messages. An event in this context is anything observed by a process which may be of interest to some other process. The event may be the completion of an asynchronous operation or the availability of a resource.

A process uses two semaphore operations to signal an event occurrence. One operation sends a signal to a semaphore; the other picks up a signal from a semaphore. (The sending operation is often called a V operation; the receiving operation is called a P operation.) The sending operation allows a process to send data or a signal that data are ready. The semaphore stores the signal until another process is ready to pick it up. Thus, the sending process is free to proceed, since it has sent the data. The receiving operation examines a specified semaphore and picks up the signal. If a signal is present, the receiving process continues executing. However, if there is no signal at the semaphore, the receiving process enters the wait state. The semaphore then serves as a pointer to the head of a wait queue. The process remains in the wait state queued at the semaphore until another process sends a signal to that particular semaphore. Thus, a semaphore can hold a signal until a process picks it up, or a semaphore can hold a process until a signal is sent to it.

Messages can also be passed from process to process. A message has the same present or not present quality as a signal plus additional information. Part of the information is supplied by hardware and part is supplied by the procedure of the process that sent the message. A message carries the process name of the sending process. Thus, many processes can send information through a single semaphore stamped with the sender's name.

A message semaphore may have a queue of messages waiting to be picked up by processes. As with signal semaphores, requirements for memory space increase and decrease thus presenting a memory management problem. Again, the problem is solved with a queue of free message links. These links reside in a known place in a segment that can easily be found when needed to supply or absorb message links.

Because semaphores and the queues built on them are shared by different processes, the total semaphore structure must be protected. This is accomplished by hardware and software conventions that restrict access to any segment containing semaphores. Thus, semaphores must be in semaphore descriptor segments, some of which may be G segments (if system communications is necessary). However, all G segments (except G0) must be semaphore descriptor segments.

Each semaphore descriptor contains a pointer to a semaphore. Semaphore addresses are developed via a semaphore descriptor, thus providing added protection for the semaphore. A semaphore segment can be addressed logically using a segment number and a relative location within the segment or directly using the G segment number and displacement from the beginning of that segment (G, D).

MAIN MEMORY MAPPING

Figure 8:
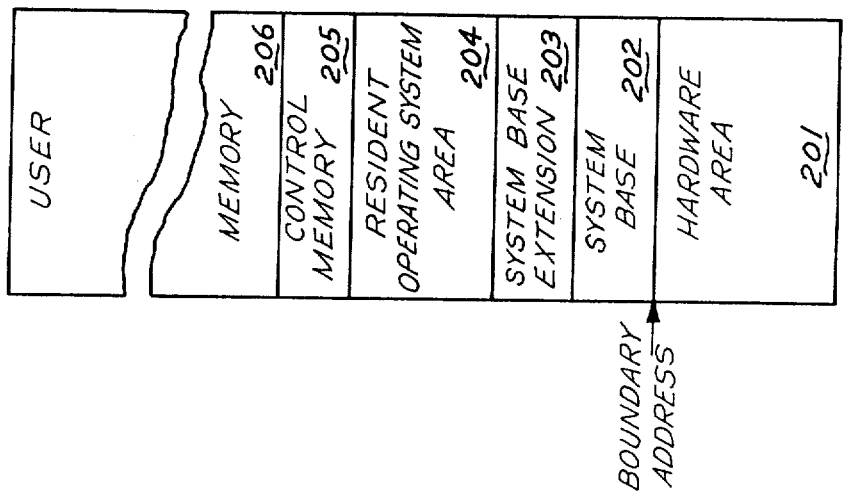
FIG. 8 is a diagram depicting the mapping of information structures into main memory during normal operation.

The mapping of information structures into predetermined physical addresses in main memory during normal operation is shown generally in FIG. 8 at 201. As noted earlier, the address space extending from physical address 0 to the boundary address is called the "hardware area" and is reserved for hardware microprogramming information. This microprogramming information is loaded into main memory at the time of system initialization, is utilized by the process or subsystem to provide executive hardware functions, and is "invisible" both to the user and to the operating system.

The hardware area 201 is protected against alteration due to user and operating system procedures in two ways: (1) absolutization and (2) exception trapping. At the completion of the design of the detailed hardware microprogramming, the number of addresses required for the hardware area in main memory is counted so that, when this area is stored in main memory beginning at physical address 0, the number of the next available address can be determined. This "boundary address" has a value which is written into the hardware area 201 by the system designer at a predetermined location (e.g., physical address 20). During the process of "initializing" the computer system, therefore, a hardware access to this predetermined physical location may be made and the boundary address stored in the dedicated boundary address register (BAR). The hardware area is then said to be stored "below BAR" (that is, at addresses less than the BAR value), while the operating system and user software is stored "above BAR".

The segmented addressing approach is then used to advantage to isolate the hardware area from other procedures. As the operating system and user segments are loaded, the segment tables giving the base addresses of the segments are completed by memory management procedures which allocate space only above the boundary address. Since references to memory are made through the segment tables, it thus becomes impossible for either operating system or user processes to access or modify the contents of the information below the boundary address.

At the completion of the initialization process, the system is in a state in which is can do user work. In general, the operating system is loaded, the I/O devices have been recognized and made operative, and the memory resources available for user work have been calculated, the result being stored in addressable information structures. More specifically, the state of the system in this quiescent state (awaiting an operator key-in from the control console to initiate a system process) can be described in terms of (1) the contents of main memory, (2) the files in secondary storage that are open and accessible, (3) the operating system functions which are available, and (4) the states of specific devices which permit a user to inject a processing command.

The information structures mapped into physical main memory at this time may be considered to reside in the six distinct areas 201-206 as shown in FIG. 8. The hardware area 201 (already discussed) resides from physical location 0 to the boundary address. Next, the "system base" 202 resides at the address space beginning at BAR. Information stored within the system base has a predetermined format and is directly addressable by the operating system. Further, information structures (indirectly addressable through pointers from the system base) occupy the area 203, these structures including G and J tables as well as logical device and physical service tables. The address space 203, together with the system base 202, make up what is called the "extended system base".

Next (in order of increasing physical addresses) is the resident operating system memory area 204 which retains resident operating system segments (both procedure and data); permanent operating system process control structures, and virtual memory management tables. The information structures in the resident memory area 204 are locked into main memory for one or more of the following reasons: (1) they are used with great frequency; (2) they handle machine errors or exceptions; or (3) they handle transfers between a mass storage device and main memory to provide a virtual memory environment.

The control memory zone 205 contain information structures used by the operating system in carrying out its supervisory operations (e.g., PCB's), whereas the user's procedures and data are generally loaded into zone 206. The user's buffers, not being swappable, are placed in the control memory zone 205.

The top of main memory, zone 207, is reserved for the System Resource and Status Table, a site dependent information structure loaded in main memory (as part of the initilization file) before the information in zones 202-206 is loaded.

CLASSIFICATION OF USER PROCEDURES AND PROCESSES

To this point, the general description of the overall processing system has been hardware oriented. The discussion began with an explanation of the physical hardware and concluded with an explanation of the information structures visible to that hardware as they are mapped into physical memory locations. At this point, it is useful to pause and consider the system from the standpoint of the user, primarily with a view toward defining certain terms and gaining a better understanding of the user's needs.

The user prepares his problem for machine solution in stages, and these stages can perhaps best be distinguished by defining the following terms: procedure, program, compilation unit, and link(load) module.

A *procedure* is a set of instructions, constants and control statements originally written by a programmer in, and conforming to the rules of, a programming language. Though originally written in a "source" state, a procedure may thereafter exist in other states, examples of which are the expanded source, compiled, and linked, (or loaded) states. In the latter of these states, a procedure conforms to the rules of the operating system in its format, syntax and appearance.

A *program* contains at least a main "procedure", may contain other procedures, and further contains identification information such as the programmer's name, the source language used, the compiler used, and so on. A program can therefore be thought of as a collection of procedures written in a specific language, plus additional information which identifies the specific collection and controls the use of the collection of procedures.

A *compilation unit* is an information structure created by a compiler by operating upon a source (or expanded source) program. This information structure exists in a standard format compatible with the operating system and contains a translation of the source statements in terms of hardware instructions, data representations, and control information compatible with the operating system. A compilation unit may be organized into what are called "tentative segments"; that is, the compiler makes packaging decisions on how to divide the code, constants and control information into segments. Such "tentative segments" are still incomplete, however, because they do not yet have the final segment numbers assigned and, in some cases, are only skeletal. Compilation units may be gathered into "libraries".

A *link module* (or *load module*) is an information structure, also in standard format created by operating system processes operating upon compilation units. A link module differs from a compilation unit in that its segments do have firmly assigned segment numbers and it may contain additional segments from other compilation units. Importantly, the link module includes control structures (a particularly important one being a segment called the "process group control segment" PGCS) which are almost completely developed. The major outstanding task before the procedures contained in a link module can be executed is the completion of the resolution of addresses involving entities in the nucleus of the operating system. This remaining task is carried out at the time the module is loaded into virtual memory to create a *process group*.

The existence of information structures such as link modules, compilation units, procedures, etc., should be distinguished from the execution of data processing operations using those structures. The actual accomplishment of data processing work is divisible into jobs, job steps, and processes.

A *job* is a major unit of work. It is defined as a collection of one or more job steps which are related from the user's standpoint for some logical reasons. For example, a user may wish a group of job steps gathered together for the purpose of accounting and reporting. In other situations, the execution of some job steps may depend upon the prior execution of other such steps, or some files must be passed from one job step to another without allowing the possibility of a third step not belonging to the job to "steal" and modify the file in between. From the system's viewpoint, therefore, a job is a schedulable work unit in which scheduling is based upon parameters primarily related to the user's needs.

A (job) *step* is a minor unit of work and is the entity to which resources (backing store, secondary storage, devices, files, main memory, etc.) are granted. When a step is to be executed by the system, a load module name is identified, together with a list of the resources required. In other words, a step is a request to execute a load module in a given resource environment in order to accomplish work.

When the system receives a request for a step execution, the request being framed in a standardized "job control language" (JCL), the operating system than undertakes the task of first allocating resources to the request as those resources become available and finally initializing the information structures required for execution, before passing control to the initial procedure within the step. Before control is passed, however, all of the segments in the load module are loaded into "virtual memory" (that is, are either in main memory or the associated swapping device) and some of these segments may have been updated for one of a variety of reasons. Also, before actual execution begins, a step control structure is built in a secondary system file for infrequently accessed and possibly voluminous information which is not needed in virtual memory. The combination of the load module loaded in virtual memory and updated, and this step control structure placed in a secondary storage file, is called a *process group*.

A *process* is the controlled execution of instructions without concurrency. Stated more precisely, a process is a locus of control within an instruction sequence, an abstract entity moving through the instruction of a procedure as the procedure is executed by a processor. The attributes of a process in execution thus continually change with time.

In the computational system being discussed here, the process may exist in one of seven states which are recognizable by system hardware. By the term "recognized", it is meant that the hardware will execute various instruction and firmware procedures to effect dispatching, state changes, and to maintain information structures which define the state the process is in. There are seven possible process states, and these are represented by a code field in the process control block (called PCB), a control structure in main memory. The seven states are:

(1) *running* — where the process is assigned to the central processor and the current state of the process is described in the process control hardware registers (see at 120 in FIG. 2). In the remaining states, the state of the process is described in its process control block;

(2) *ready* — where the process is in a "queue" awaiting assignment to the central processor;

(3) *waiting* — the process is in a queue awaiting a semaphore action (semaphores will be discussed later);

(4) *suspended while waiting* — the process, while in the waiting state, was expressly suspended by the operation of another process executing a SUSPEND instruction;

(5) suspended while ready — the process was suspended while in the ready state;

(6) *suspended after exception* — the process was suspended by hardware upon the detection of an exception condition (example exceptions will be discussed later); or (7) *suspended before initiation* (in which case the process has never run at all).

More than one process group can normally be loaded into virtual memory at the same time. When the running state of a given process is terminated for any reason (for example, due to the necessity of carrying out I/O processing before the process can be continued), the central processor may continue with a different process. The status of the process leaving the running state (as then portrayed in the central processor's process control registers) is recorded in that process's PCB while the PCB information on the new process is transferred to the process control registers of the central processor so that this second process can be "awakened" (at the point it left off when its running last ceased).

A preferred arrangement for scheduling and controlling process execution within the CPU is disclosed in the above-identified U.S. patent application Ser. No. 529,012, entitled "Process Management System for a Data Processor," filed Dec. 2, 1974.

Shifting from one process to another implies substantial process management overhead. For example, the process control registers in the CPU must be emptied into a PCB and replaced by the contents of the next process's PCB before continuing. It is thus advantageous to implement operating system functions as a set of segments which are made part of the address space of the processes that need them (rather than attaching them to a unique system process). Where the operating system segments are within the address space of the process requesting service, communications between the user process and the system process are greatly simplified. Such operating system procedures are said to be "distributed." An operating system function is "distributed" if it is performed by executing system procedures under the user's process; that is, if the system procedures are pointed to from the user's PCB. Functions are "non-distributed" if they are performed by executing system procedures under a system process. it is the shareable quality of segments which allows the placement of operating system information structures within the address space of the user process.

In order to more fully appreciate the manner in which such a system of directories is mapped into main memory by the operating system, it is useful to consider, by way of example, the manner in which a program written by a user may be transformed into a machine-executable procedure loaded in main memory.

A programmer often writes his desired routine in the form of a "source code listing" (often expressed in a high-level language such as FORTRAN, COBOL, PL/1, etc.). The programmer-written code listing is then "compiled" or "assembled" (that is, operated on by a program called a "compiler" or "assembler", respectively) into a still unexecutable machine-code listing called a "compilation unit" (CU). These compilation units correspond to one (or more) of the procedures as originally written by the programmer.

After compiling a source program, and before loading the object form of that program into the machine for execution, it is necessary to connect related CU's and resolve the references among them in order to form a single unit called a "load module" which may then be stored for future use or (more often) prepared for its immediate use in main memory, during which time operating system routines resolve further references between the LM and the system to produce the "process group," the executable entity (i.e., the source program in its ultimate state).

At the time an LM is loaded into main memory, a system of directories (see FIG. 6) used in developing the absolute addresses of any data item or instruction to be referred to during execution is developed by the operating system. A logical address (J, P) is assigned to each process being loaded and the J-table 121 and P-table 122 are updated with the absolute address pointers locating the address space allocated (at the time the process is loaded in virtual memory) to that process' PCB 125. Space is then allocated successively to the segment table word arrays 127, the segment tables 140, and the segments 141, the absolute base address of each of these structures being placed each time in the table immediately above in the directory hierarchy. Using these directory tables, as seen in FIG. 6, the absolute address of any item to be fetched from memory is developed automatically from the absolute segment base address already stored in the segment table 140. Should a segment be moved in main memory, only its base address in the segment table need be changed. Placing a segment in a new physical main memory location requires no change to either the address syllable 143 or the effective address (STN, STE, SRA) of an item within that segment.

STARTING THE FIRST USER'S JOB

After the computing system is first loaded with those operating system records necessary for operation as described earlier, the system is idling with all system processes in a "wait" state. It is then necessary for the operator to request the launching of the first user's load module by means of a JCL directive interpretable by the operating system.

Normally, in a large scale system, before the first user load module can be read on an appropriate peripheral device, it may be necessary to first load special-purpose, non-resident operating system procedures which will assist in the loading and initialization of the user's job. For example, it might be necessary to first load one or more non-resident system process groups which are one-step system jobs and which also exist in the form of load modules in the library. The methods by which the operating system loads these system job steps are essentially the same as those used for user jobs (described in more detail later).

The decision to launch a given load module having been made, the operating system constructs the channel commands necessary to load the LM and executes housekeeping procedures to update and initiate LM information structures to create an executable process group (PG).

When this has been done, the PG will be identified by an assigned J-number which identifies the J-table entry pointing to the PG's address space (see FIGS. 5 and 6 discussed earlier). In addition, G-segment semaphores will show the PG within a linked set of process queues waiting on future events. Moreover, the logical and physical device tables will have been updated to show the channel programs active on that peripheral subsystem used to load the LM. Also at this time, those resident operating system segments (see area 204 in FIG. 8) containing the process group occurrence control table (PGOCT) and the job occurrence table (JOT) will have been updated to show the PG. Control memory area 205 will contain the PG's process control segment while the user memory area 206 will contain the PG's procedure and data segments.

A "job occurrence" (a single execution of a named job) is a candidate for scheduling. The operating system automatically retrieves the information defining the job occurence and inserts the candidate item into the appropriate scheduling work queue (depending on parameters such as maximum run time, class, the number of jobs active at the time, etc.). The job is assigned a "run occurrence number" (RON).

Upon making a "go" decision for a given job occurrence, the operating system then builds a preliminary "executable job control file" (JCFX) for the job. JCFX is an updated, initialized version of the original "source job control file" (JCFS) and includes information derived both from the programmer's source language statements in the LM and from JCL commands by which the operator controls the execution of the job.

It should be noted that, even though the job has been "scheduled," system resources (files, main memory, backing store memory, peripheral devices, etc.) have not yet been allocated to the job. Scheduling and resource allocation are closely connected concepts, and are distinguished here as follows: an entity is "scheduled" when the decision is made to start to allocate resources to that entity. A resource is said to be "allocated" to a customer when it cannot be used by another customer without authorization (a sharing permission).

In addition, the terms "allocation" and "assignment" may be distinguished as follows: The word "assignment" is here used to designate the relation between a symbolic name (private to a source program) and an external object, such as the device, a media volume, a file, etc. Some objects (e.g., volumes) may be assignable but not allocatable. In other cases (e.g., files) assignment and allocation may occur simultaneously.

It should be noted that scheduling in the present system involves a consideration of the availability of resources before those resources are actually committed. Until the operating system schedules a job, no resources are committed to it. As will be described in more detail, after a job is scheduled for execution, resources are assigned to the individual steps making up that job in a predetermined sequence. Those resources available within the system are grouped into classes, each class being a collection of resources of the same general type. According to an important feature of the present arrangement, a customer (i.e., a job or step) never waits for specific resources, but waits for an entire class. If all of the required resources within a given class are not available at the time of the request, any resources temporarily allocated to that job step are de-allocated and the job step is held in the relevant waiting queue to have its resource requests submitted at a later time.

Certain abnormalities may cause the allocation phase of the job initiation sequence to be aborted. These include illegal attempts to access files unavailable to the user, or stated job step resorce requirements exceeding the total capability of the system.

If the allocation of resources is successful, procedures are then instituted to actually load the user's job step LM into memory and to resolve references to system information structures. The main process of the now executable process group may then be started and the currently active system process returned to an enqueued waiting state.

STEP OCCURRENCES — GENERALLY

As noted earlier, a (job) step is a discrete subdivision of a job as seen by the user; internally, it is represented by a process group; it is the principle "customer" to which resources are allocated; and it is processed as a distinct entity. Information concerning the step is contained in a "step description," a series of JCL statements supplied to the system by the operator. A single execution of a step is termed a "step occurrence."

As shown in FIG. 9 of the drawings, a step occurrence may exist in one of four possible states: declared, active, blocked, and terminated. A step occurrence is said to be in the "declared" state 210 when the step-descriptive information, as stated by the system user in control language declarations, has been associated with a named step occurrence and made internally visible to the system. The declared state 210 may be entered statically (by means of an appropriate set of JCL commands) or dynamically (when a running process declares or "spawns" a step). The execution of the spawned step may take place at the end of the job (that is, after the last step of the job is executed), immediately after the execution of the spawning step, or the execution of the spawning step may be blocked until the completion of the execution of the spawned step.

A step occurrence is in the "active" state 212 when the resources required by the step occurrence (also as declared by the user) have been successfully allocated to the step and when the initial task within the step occurrence has been successfully initiated. A step occurrence is in the "terminated" state 214 when all of the individual task occurrences within the step occurrence have been terminated, and when all resources allocated earlier to the step have been either released or passed to the next step occurrence(s). Termination may occur normally (when any task in the step is aborted before it is allowed to execute to completion).

In the "blocked" state 216, execution of the step occurrence is suspended to await the occurrence of an event (e.g., the receipt of a message, the completion of the execution of a spawned step, etc.). Substates of the blocked state may be distinguished by the degree to which resources originally allocated to the step occurrence are released.

As will be described in more detail later, a step occurrence moves from the declared state 210 to the active state 212 by the action of instrumentalities which provide the following sequence of functions: (1) a J-number is allocated to the step occurrence; (2) a check is made to determine if sufficient main memory space is available to receive the step's "working set" (a user's declaration of that address space requirement considered necessary for the efficient execution of the step); (3) a check is made to determine if sufficient backing store address space is available to receive the step; (4) a check is made to determine if the files needed by the step are available and have appropriate access characteristics; (5) an attempt is made to allocate the devices required by the step; (6) a check is made to insure that the volumes required by the step occurrence are mounted on the appropriate devices; (7) the availability of vacant address space needed by the step for additional storage is checked; (8) the availability of control memory is checked; and, (9) finally, the concerned load module (or part of it) is loaded into virtual memory.

A step occurrence may be de-activated (but not terminated) by being temporarily placed in the blocked state 216 shown in FIG. 9. In the blocked state 216, resources previously allocated to the step occurrence are partially or totally released in a manner specified by the user at the time of step occurrence declaration. To guarantee fast response time for a process group used to provide a real-time conversational operating capability, main memory space, devices, and volumes may continue to be allocated when that process group is blocked. Alternatively, the user may specify that a process group requiring a less rapid response may, upon entering the blocked state, release the main memory space allocated to the segments belonging to the address spaces of processes in that process group, as well as the control structures of its processes stored in control memory (area 205 as shown in FIG. 8), yet retain backing store space (i.e., retain virtual memory).

Before any step occurrence is placed in a blocked state, any critical system resources (e.g., system tables) which have been "locked" by that step occurrence must be "unlocked." For example, the system's virtual memory management tables are continually being updated by processes in execution as segments are dynamically swapped in and out of main memory. Each time such a system table is modified, access to that table by other processes may be temporarily prevented (by means of a locking flag or semaphore) until the updating is complete. Should a step occurrence be blocked at a time when it has locked critical system resources, those system resources would continue to be unavailable to active processes. For this reason, blocking is to be deferred until all resources are unlocked.

A step occurrence may return to the active state 212 from the blocked state 216 by re-allocating those resources which were released at the time the step occurrence was blocked. After the step occurrence is unblocked, the execution of the step is resumed at the point where it left off at blocking time.

A step occurrence may be terminated while it is in either the declared, active or blocked states. Normal termination takes place when the step occurrence completes its tasks normally and normal termination accordingly involves a transition from the active state 212 to the terminated state 214 at the conclusion of the step occurrence. Abnormal termination of the step occurrence may be caused either "internally" (by an abnormality occurring during the execution of the step occurrence) or "externally" (by the occurrence of an event outside the step occurrence itself). The abnormal completion of the execution of a step occurrence is called "step occurrence aborting."

In the case of normal termination, the operating system insures that all I/O operations have been terminated, that the system tables used by the step occurrence are unlocked, that the files earlier allocated to the step occurrence have been closed, released or deleted (unless they have been consigned for the duration of entire job and are to be passed to another step occurrence), that no operator answer has been requested and is still pending, and that all of the individual task occurrences within the step occurrence have been terminated. Once it has been insured that the step occurrence is in condition for termination, those resources still allocated are released or passed to the next step(s) to be processed, operating system information structures are updated to show the termination of the particular step, and the next step to be processed is determined and made active.

The operating system provides a flexible method of managing the execution of steps by allowing the user to "declare events" and to then block the currently active step occurrence until the first occurrence of the declared event. The declaration of an event merely involves supplying a description of the named event to the operating system. Typical events which may be defined are: the passing of a specified elapsed time, the occurrence of a specified time of day, the arrival of a message from a specified source at a predetermined "mailbox" location, the allocation of a specified resource, etc., or a Boolean combination of such events. Once an event is declared, the issuance of a macroinstruction (here called "ON-EVENT") informs the system that henceforth the step occurrence issuing the instruction is interested in, and wishes to be notified of, the occurrence of the declared event. In this way the step occurrence issuing the ON-EVENT instruction may be blocked until the first occurrence of the declared event when it resumes its active state. Flexibility may be further increased by use of a macroinstruction (here called "OFF-EVENT"), which is used to inform the operating system that the issuing step occurrence is no longer interested in (i.e., wants to be notified of) the occurrence of the stated event.

RESOURCE MANAGEMENT — GENERALLY

The present apparatus allocates "resources" to "customers" when asked to do so by a "requestor." A "resource" is an object within the system, which may be a file, a device, a terminal, space on a disc volume, main memory or control memory address space, and so on. A "customer" is a user of resources and, in the present arrangement, may be either a job or a (job) step. A "requestor" is a procedure which calls upon the resource management instrumentality for the allocation of resources. A requestor may be a system procedure working on behalf of the user or a procedure of the user itself.

According to a principle feature of the present apparatus, resources are allocated in classes. A "resource class" may include several different resources of the same general type. Moreover, the resources are allocated to a customer in a predetermined class sequence. In the present arrangement, the specific resource classes, listed in the sequence of allocation, are:

| Class | Contents |
|---|---|
| 1 | J-numbers |
| 2 | User memory space and active process numbers |
| 3 | Backing store space and potential process numbers |
| 4 | Files |
| 5 | Devices |
| 6 | Volume mounting checking (not a "resource") |
| 7 | Volume space |
| 8 | Control memory space |
| 9 | Process group loading ability |

In order to allocate resources to customers, the present arrangement makes use of four principle permanent data structures. These are:

(1) the Job Control Structure file (JCS) which includes:
   (a) the Consigned File Table (CFT),
   (b) the Assign File Table (AFT),
   (c) the Resource Record (RES);
(2) the Resource Load Table (RESLD);
(3) the Job Occurrence Table (JOT);
(4) the File Identification Control Block (FICB).

The general organization of these data structures, as well as the manner in which they are employed and updated during resource management, will be discussed in more detail below.

RESOURCE ALLOCATION QUEUES — GENERALLY

In the present arrangement, two queues are established for each of the resource classes, one queue for "normal" customers and the other for "urgent" customers. Both queues are managed on a priority basis. The customer's priority is the priority of the job as given in the Job Occurrence Table (JOT). However, in order to prevent a customer with a low priority from waiting too long for a given class of resources, the customer's priority may be increased under certain conditions. Moreover, the unsuccessful allocation attempts relative to each customer are counted and, when the count exceeds a predetermined value, the step is automatically declared to be "urgent" for this class of resource: that is, the customer is transferred from the "normal" queue to the "urgent" queue.

Queues are implemented as list structures, each consisting of a series of linked storage cells, each cell containing information concerning a single customer. The collection of cells is contained in a common pool shared by all of the queues, the maximum number of cells being equal to the maximum number of steps which might be enqueued at any given time, a quantity defined at the time of system generation.

It is an important objective of the present arrangement to prevent deadlocks between jobs or steps during resource allocation. Unless appropriate precautions are taken, deadlocks can occur when two customers each need a resource allocated to the other. The two processes would accordingly be locked in a "deadly embrace" with neither being capable of continuing.

The general method of allocating resources in the present arrangement is by "static" allocation: that is, the resource needs of a customer in each allocation class have to be satisfied altogether and, if the needed resources are not available, the customer is enqueued. It is permissible, in the present arrangement, to allocate resources dyanmically, but if the requested resource is not available, the requestor is aborted in order to prevent deadlocks. No enqueuing of requestors due to unsatisfied dynamic resource requests are permitted.

According to an important feature of the present apparatus, the allocation of resources is accomplished class by class so that the customer advances from one allocation level to the next only if all of the requested resources within that class are available. The customer passes through these allocation levels in a predetermined order and, within each level, resources are allocated on an "all or nothing" basis. Therefore, a customer can be queued at each allocation level and, if enqueued, the customer (in general) loses all of the resources allocated within that class, but keeps the resources allocated at preceding levels.

According to a further feature of the present allocation scheme, customers may be allocated resources in one of three possible modes: normal, urgent and pre-emptive.

In the normal mode, if allocation is successful at a given level, allocation at the next level is immediately attempted. If allocation at a given level fails, however, all of the resources at that level already allocated to the customer are releasd (i.e., the resource allocation level gets back to that state existing at the end of the preceding level) and the customer is put into a queue waiting at this allocation level.

In the urgent mode, allocation proceeds in the same way, except that, when allocation at a given resource level does not succeed, the allocatable resources in that class are not totally released, but are instead marked "reserved." Reserved resources cannot be allocated to "normal" customers so long as "urgent" customers requesting those resources exit. Among themselves, when conflicting requests occur, urgent customers are treated in the same way as normal customers; that is, on an "all or nothing" basis. Customers waiting in the urgent mode for resources do not prevent normal customers from succeeding at the same allocation level since resources not marked as being "reserved" remain available.

In the pre-emptive mode, allocation is performed synchronously unless the request is not credible (e.g., a request for resources exceeding the total available in the system). This means that resources are always allocated to a pre-emptive customer who never waits, unless such a request cannot be satisfied because the needed resources were previously allocated to another pre-emptive customer, in which case the pre-emptive customer is queued (in the urgent queue — or in the normal queue if no urgent allocation mode exists for this kind of resource) and the customer is assigned the maximum priority.

To provide still further flexibility, resources within selected classes can be requested according to two demand types: imperative and conditional. A customer issuing an imperative demand indicates that it cannot work without the requested resource; therefore, in the case of static allocation, if the resource is not available, the customer is enqueued and all of the resources of that class are deallocated. In the case of dynamic allocation, the customer is aborted (unless it is a system process). A "conditional" demand for resources means that the customer can work without the resources. Therefore, if the resource is not available, the customer proceeds with execution without the resource being allocated.

As noted earlier, full dynamic allocation is restricted to system users because, in system processes, deadlocks may be prevented in other ways, such as through the use of semaphore process synchronization techniques. When a resource request made by a system customer cannot be satisfied, that customer is enqueued at that resource level and is notified when the resource request has been satisfied (through a semaphore or a "mailbox" address specified by the system customer at the time of the resource call).

RESOURCE CLASSES — GENERALLY

Before continuing the discussion of the manner in which resources are allocated to jobs and steps, it is useful to briefly describe what the various resource classes include. The descriptions which follow are presented in the same order that these resource classes are allocated to customers.

RESOURCE LEVEL 1: J-NUMBERS

The availability of J-numbers or "job slots" is limited both by the size of the J-table and by the number of customer-defining cells in the allocation queue. To allocate a J-number means that a free entry is found within the J-table and flagged as being allocated. Eventually, this J-table entry will be filled with information concerning the size and absolute address of a P-table [see FIG. 5 of the drawings]. J-numbers are allocated to job steps only during process group initiation (PGI) and are de-allocated at the time of process group termination (PGT). In the present arrangement, job steps are allocated J-numbers in either the normal or urgent modes, but not the pre-emptive mode.

RESOURCE LEVEL 2: USER MEMORY AND ACTIVE PROCESS NUMBER

User memory (shown at 206 in FIG. 8 of the drawings) is that zone of main memory address space which contains the user's relocatable procedure and data segments which may be swapped to the backing store by virtual memory management procedures. The actual allocation of address space in user memory is completely dynamic and is performed by virtual memory management procedures, a preferred form of which are described in the above-identified U.S. patent application Ser. No. 529,253.

At this point, the instrumentalities for allocating resources simply make a rough reservation of user memory space in order to prevent memory overload. Space in swappable user memory is reserved to (job) steps only, and may occur at the time of either process group initiation (PGI), process group termination (PGT), process group state change (blocking or unblocking), or may occur dynamically. User memory is allocated in either the normal, urgent or pre-emptive modes.

The number of processes that are "active" at any given time [see FIG. 9 of the drawings] is closely related to the demands placed upon swappable user memory. The number of active processes is limited by the number of free process links which make up the waiting queues on the process level. Only a predetermined number of such free links are available within the $G_o$ segment [see FIG. 7 of the drawings]. Since user memory allocation and active process number allocation occur at the same level, if one resource is unavailable, the other is de-allocated and the customer placed in the appropriate waiting queue. Allocation at this second level may be accomplished in either the normal, urgent or pre-emptive mode and occurs at the time of process group initiation, termination or state change. While user memory can be allocated dynamically, active process numbers cannot.

RESOURCE LEVEL 3: BACKING STORE SPACE AND POTENTIAL PROCESS NUMBERS

The system's backing store is that portion of virtual memory which is provided by a mass storage device (normally a drum or disc file). As in the case of user memory, the actual allocation of physical address space on the backing store is dynamically performed by virtual memory management procedures. At the time of process group initiation, however, a rough reservation of backing store address space is made in order to prevent backing store overload. This reservation is made on behalf of steps only, occurs only at process group initiation (and is released only at process group termination) and no dynamic allocation is permitted. Backing store space may be allocated to customers in either the normal, urgent or pre-emptive modes.

Because of their close connection to the availability of backing store space, potential process numbers are assigned at this third allocation level as well. Potential processes include those in both the active or blocked state and their total number is limited by the size of system tables. Potential process numbers are allocated only at process group initiation (and de-allocated only at process group termination) and there is no dynamic allocation. Potential process numbers may be allocated to steps in either the normal or urgent modes.

RESOURCE LEVEL 4: FILES

Files may be allocated to either jobs or job steps in accordance with the existing "share permission" of each requested file. At the time a file is made known to the system, its creator declares whether or not the use of that file will be limited to a single job or step or will be shared. Access to a shared file may be limited to the ability to read from the file, the ability to write into (but not to read from) the file, or both capabilities may be granted.

Although files may be allocated to either jobs or to steps, the two kinds of allocation can be mixed only according to specific rules. In the present description, the term "consigned" is employed to indicate the allocation of a file to a job, while the term "assigned" is employed to indicate the allocation of a file to a step.

Deadlocks could occur when two jobs both attempt to obtain the assignment of a file which has already been consigned to the other job (and hence both would be enqueued to await an event which will never occur: i.e., deconsignment of the needed file). To prevent this, jobs are aborted if they contain a job step which attempts to obtain the assignment of a file already consigned to another job. Thus, to insure that a job which begins can finish, all files may be consigned to the job rather than assigned to an internal step.

RESOURSE LEVEL 5: DEVICES

A device is said to be allocated to a step when that step can use the device through file assignment. A device is normally requested by its class name and, at allocation time, only a number of devices of the class is allocated. The devices themselves are selected and effectively allocated when the user declares a need for a file. Devices are allocated in either the normal, urgent or pre-emptive modes to steps (not jobs). Devices may be allocated at process group initiation, during a process group state change, or may be allocated dynamically. Devices are de-allocated at process group termination, during a process group state change, or dynamically.

RESOURCE LEVEL 6: MEDIA MOUNTING

Technically speaking, "resources" are not allocated at level 6. Instead, the passage through level 6 merely entails a check to determine whether or not needed media volumes have been mounted by the operator on the appropriate devices so that processing will be able to proceed.

RESOURCE LEVEL 7: VOLUME SPACE

At level 7, address space on a particular disc volume (needed to create or extend files) is allocated. The allocation of such additional volume space is made on behalf of steps only, and is done either at process group initiation or dynamically. Volume space is de-allocated asynchronously when the need for such space has ended. Volume space is allocated only in the normal mode.

RESOURCE LEVEL 8: CONTROL MEMORY

Control memory [area 205 shown in FIG. 8) contains those unrelocatable (unswappable) segments. As in the case of swappable memory, the actual allocation of control memory address space is done dynamically at the process level by virtual memory management procedures. At this point, only a rough reservation of address space is made in order to prevent control memory overload. The allocation of control memory is reserved to steps and is done either at process group initiation or process group state change or dynamically. Control memory reservations are released at process group termination, during process group state changes, or dynamically. Allocation may take place in either the normal, urgent or pre-emptive modes.

RESOURCE LEVEL 9: PROCESS GROUP LOADING ABILITY

Even though the rough reservation made at allocation level 8 may indicate that control memory space is available, fragmentation of control memory may make it impossible to load control segments. If this occurs, the process group which cannot be loaded is enqueued until control memory space is released. Only a "normal" allocation queue is used at allocation level 9.

ALLOCATION LEVEL SEQUENCE — RATIONALE AND EXCEPTIONS

The nine allocation levels discussed above are organized into the order given for the following reasons:

Because the availability of a J-number is essential for the allocation of files and devices, and is necessary to assure adequate space within the allocation queues, J-numbers are allocated first.

In normal operation user memory is the most likely "bottleneck" which would prevent the entry of a step into the active state. For this reason, user memory allocation provides a good parameter for scheduling purposes and, together with the active process number, is allocated early. In this way, resources less likely to present allocation problems will not be prematurely allocated to steps for which user memory is unavailable.

The availability of backing store space is an excellent parameter of the ability to load steps into virtual memory and, like user memory, is a probable bottleneck.

The allocation of files yields both device requirements needed during device allocation and buffer requirements needed during control memory allocation and hence is carried out before either of those two levels.

The allocation of devices dictates the mounting of media and therefore must occur before media mounting checking (level 6) and has a corresponding bearing upon volume space allocation.

Control memory allocation requires information concerning buffer sizes given by the allocation of files and volume space.

At this point it should be noted that this allocation strategy implies that resources should be released in the reverse order when steps are blocked.

Two specific exceptions to the general allocation strategy outlined above are employed in the present arrangement. The first of these is added to improve the scheduling of steps and the second to prevent a deadlock problem which can arise due to the consignment of files to jobs.

Under the first exception, if the allocation fails at any of levels 3 to 8, inclusive, the amount of user memory previously allocated to the customer is immediately released, while the resources previously allocated at the other levels are retained. For example, if a given step has successfully received the allocation of resources up to level 7 only to find the requested volume space unvailable, the user memory space previously allocated at level 2 is released, but the step retains its allocation of a J-number, active process numbers, potential process numbers, backing store reservation, files, and devices. The customer is then enqueued to await the availability of volume space and, when the allocation is received, returns again to level 2 to await the availability of user memory. User memory is given this special treatment because it is a sufficiently critical resource that its reservation by a process group which cannot become active should not hold up other process groups which might otherwise become active.

The second exception arises because files, unlike other resources, may be consigned to jobs, as well as allocated to steps. When a job step requests a file which is not available because that file has been previously consigned to a job, the de-allocation of the files previously allocated to that step is not sufficient to prevent deadlocks. All of the other resources allocated to that step must be de-allocated as well. As a simple example, a given step may have been allocated the last available J-number, but cannot become active because a file consigned to another job is unavailable. The job to which the file was consigned may be unable to complete its processing, however, because steps within it may not have yet received J-numbers now found to be unavailable. For this reason, whenever an attempt is made to assign a file which has already been consigned to a different job, all resources previously allocated to the current customer are de-allocated and the step is enqueued to wait for file allocation. At the following attempt to satisfy the queued step, the allocation levels 1, 2 and 3 are performed again before resuming the allocation of files at level 4.

J-NUMBER ALLOCATION — DETAILS

After the decision has been reached to attempt to allocate resources to a job step, the first allocation level is entered and a J-table number assigned as follows:

As previously noted, the J-table is stored in main memory at an address given by the J-table pointer 110 shown in FIG. 5. The J-table pointer is the first word in the system base 110 and is pointed to by the address contained within the hardware boundary address register (BAR) 111. The contents of boundary address register 111 were earlier obtained from a predetermined physical address within the hardware area 201 during system initialization. J-table 121 in FIG. 5 contains a plurality (e.g., 255) of entries or "job slots" capable of storing P-table pointers. Each J-table entry is four bytes long. The first byte, called PTSZ, is the storage location for the size of P-table. The following three bytes, called PTPTR, stores a pointer to (the absolute address of) the beginning of a P-table. Initially, the J-table contains vacant entries for which PTSZ = and PTPTR = 0.

During J-number allocation, the J-table is scanned for a vacant entry and an entry is allocated by setting PTSZ to "1," leaving PTPTR = 0. It may be noted at this point that the entry is not "assigned" to a specific step, but merely that a job slot is allocated to the step in the sense that the number of vacant entries has been decremented by one. At the time a process group is actually loaded into virtual memory, the PTSZ and PTPTR values of the newly loaded P-table will be placed in one of the available allocated but unloaded entries.

At the time of process group termination, the J-table entry containing the P-table pointer for the terminated process group will be reset as a vacant entry (i.e., PTSZ = 0, PTPTR = 0).

Figure 10:
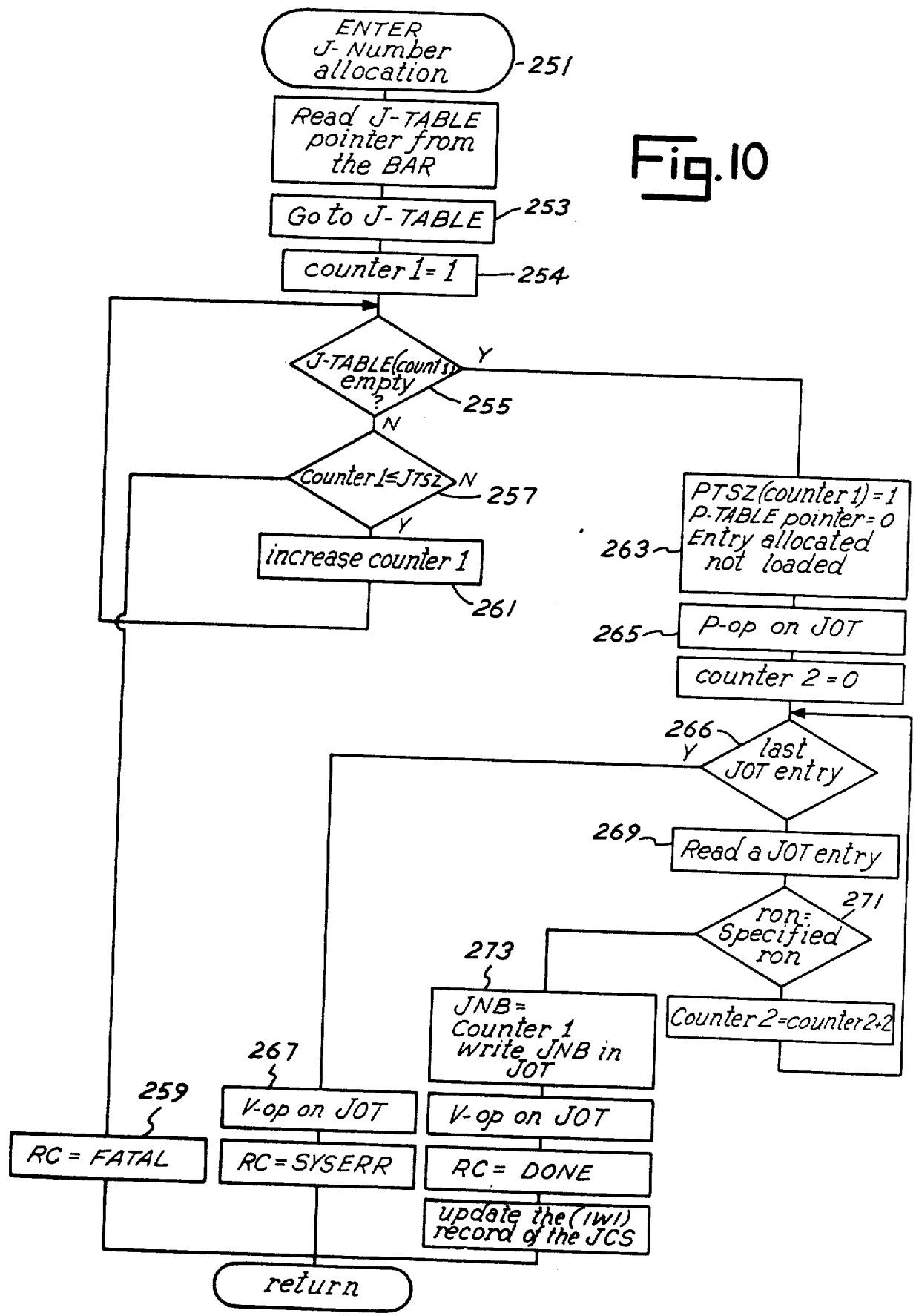
FIG. 10 is a flowchart showing the sequence of events taking place during the application of a J-table entry to a step.

The detailed sequence of events which takes place during the allocation of a J-table entry to a step occurrence is shown in FIG. 10 of the drawings. The J-number allocation sequence is entered at the entry point 251 whereupon the pointer from the boundary address register is employed to fetch the J-table as indicated at 253 in FIG. 10. An index counter (here called COUNTER1) is initialized to "1" at 254 and the contents of COUNTER1 together with the J-table pointer from BAR is used to access the first entry from the J-table. This entry is tested at 255 to determine whether or not its contents are vacant. If they are not, a test is made at 257 to determine whether or not the contents or COUNTER1 are less than or equal to the J-table size (JTSZ), a value stored with the J-table pointer at the address pointed to by BAR. If the contents of COUNTER1 exceed JTSZ, a return code (RC) is sent to the calling process indicating failure as shown at 259. If not, the value of COUNTER1 is incremented (as seen at 261) and the scanning of the J-table continues until a vacant entry is found. The first byte (PTSZ) of the first-found vacant J-table entry is then set to "1" and the P-table pointer (PTPTR) is set to "0," indicating that selected entry is allocated but not loaded, as indicated at 263.

A P-operation is then performed on the semaphore controlling access to the Job Occurrence Table (JOT) as indicated at 265. A second index counter, here called COUNTER2, is initialized to "0" to yield the first entry of the Job Occurrence Table. This entry (and each successive entry to be scanned) is then tested (at 266) to determine whether or not it is the last JOT entry. If it is, a V-operation is performed on the JOT semaphore as indicated at 267 and a system error return code is sent to the calling process. If the test performed at 266 indicates that the COUNTER2 is not pointing to the last job occurrence table entry, that entry is read as indicated at 269 and the run occurrence number (RON) contained in the entry is checked to determine if it is equal to the run occurrence number specified for the step occurrence for which J-number allocation is sought. If not, COUNTER2 is incremented to continue the scanning of the Job Occurrence Table for that entry corresponding to the appropriate run occurrence number. When the appropriate JOT entry has been located, an entry is created in the Job Occurrent Table Index in order to set the job number entry (JNB) in the index equal to the value residing in COUNTER1. The JNB is also written at this time into the Job Occurrence Table itself as indicated at 273. When this has been accomplished, a V-operation is performed on the JOT semaphore and a return code sent to the calling process indicating that J-number allocation has been successfully accomplished. Before returning to the calling process, however, a record (identified by the name CIWD) within the Job Control Structure (JCS) is updated to show a further J-number allocation.

J-NUMBER DE-ALLOCATION — DETAILS

The manner in which a J-number is de-allocated upon process group termination is shown in detail in the flowchart of FIG. 11 of the drawings. The J-number de-allocation sequence is entered at 281 with a P-operation on the Job Occurrence Table semaphore. The Job Occurrence Table is scanned as indicated at 283 until the entry corresponding to the run occurrence being terminated is found. When the JOT entry is located, the JNB entry in the job occurrence table is updated as shown at 285. A V-operation is then performed on the Job Occurrence Table semaphore at 287, making it available to other processes, and the J-table pointer is fetched from the Boundary Address Register (BAR) and combined with the J-number obtained from JOT in order to read the Job Table Entry indicated as shown at 290 in FIG. 11. If this entry is not filled, a system error is indicated and an appropriate return code is sent to the calling process. If the entry is filled, that J-table entry is set to a null value (PTSZ = 0, PTPTR = 0) and a return code indicating successful de-allocation of the J-number is returned to the calling process as indicated at 292 in FIG. 11.

USER MEMORY ALLOCATION — DETAILS

Figure 12:
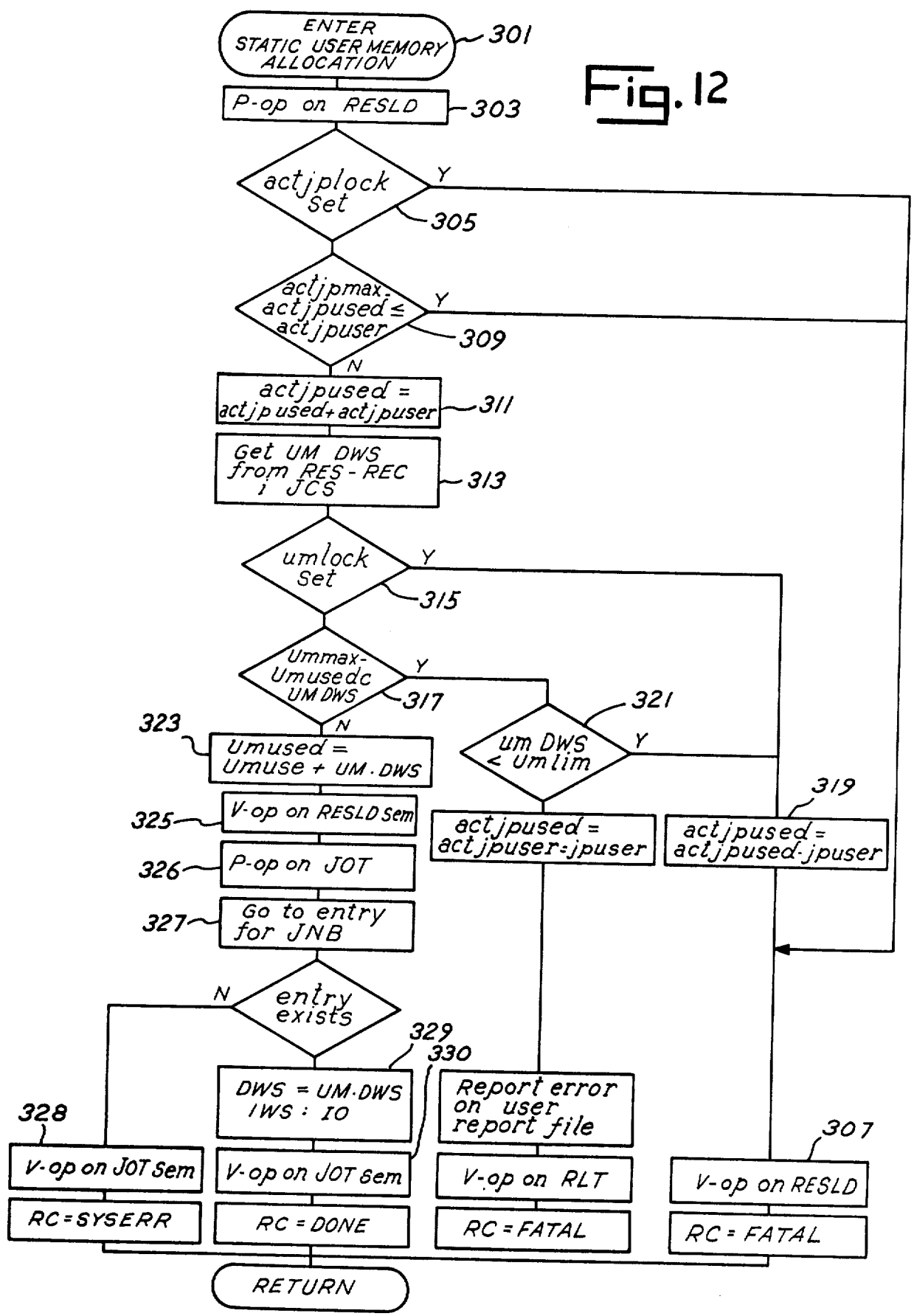
FIG. 12 is a flowchart showing the manner in which active process numbers and address space in swappable user memory are reserved to job steps.

The procedure involved in allocating an active process number and reserving address space is swappable user memory is shown in the flowchart of FIG. 12. This second allocation level is entered at 301 and a P-operation is performed on the Resource Load Table (RESLD) semaphore as indicated at 303. A test is then performed at 305 to determine whether or not the data fields containing information concerning the active process number status have been locked. If ACTJPLOCK = 1, a V-operation is performed on the RESLD semaphore (as indicated at 307) and a return code is sent to the calling process indicating that resources cannot be allocated at level 2.

If the information structure lock ACTJPLOCK has not been set to "1," a test is performed (at 309 in FIG. 12) to determine whether an active process number is available. Two counters (located in the Resource Load Table) are used for this purpose. The first of these counters, called ACTJPUSED, contains the present number of active processes, including system processes. This counter is initialized at the time of system generation and updated as user memory space is allocated and de-allocated. The second counter, here called ACTJPMAX, contains the maximum number of active processes available to the users, a quantity also defined at the time of system generation. ACTJPMAX is dictated by the number of free process links in the $G_o$ segment which is employed to enqueue active processes as those processes compete for access to the CPU. The number of processes within the job step seeking resources is a value, here called ACTJPUSER, developed during static linking and supplied by the requesting job step. Consequently, at step 309, a test is made to determine if ACTJPMAX − ACTJPUSED is less than or equal to ACTJPUSER. If it is, an insufficient number of active process numbers are available for allocation to the requesting job step, and consequently, a V-operation is performed on the RESLD semaphore at 307 and a return code sent to the requesting process indicating that the second level of allocation cannot be completed.

If an adequate number of active process numbers does exist, the quantity ACTJPUSED is updated by adding ACTJPUSER to it at step 311. Thereafter, UMDWS, the Declared Working Set (i.e., the number of user memory segments required by the requesting job step) is fetched from location RES REC in the Job Control Structure as indicated at 313. A test is then performed at 315 to determine if UMLOCK, the locking field for the user memory data within the Job Occurrence Table, has been set. If user memory data is locked, allocation of user memory cannot continue and ACTJPUSED is reset by decrementing it by the value ACTJPUSER as indicated at 317.

If the user memory data within the Job Occurrence Table is not locked, a test is made at 317 to determine if the Declared Working Set of the requesting job step (UMDWS) is less than the difference between the maximum available user memory space (UMMAX) and the present number of segments in use in user memory (UMUSED) [UMMAX and UMUSED are obtained from RESLD]. If the available space is less than the space requested, a test is made at 321 to determine if the requested value UMDWS is less than the upper limit of user memory space UMLIM, a value obtained from the Job Occurrence Table.

If the requested space does not exceed the maximum available in user memory, ACTJPUSED is merely reset to its original value, a V-operation is placed on the Resource Load Table semaphore at 307, and a return code is sent to the requesting process indicating that allocation at level 2 cannot be completed. If, however, the test performed at 321 indicates that the requested Declared Working Set exceeds the upper limit available in user memory, ACTJPUSED is reset and an error is reported on the user's report file, advising that the Declared Working Set for this (job) step exceeds the capabilities of the system.

If, at test 317, it is determined that adequate space does exist in user memory, the value UMUSED is incremented by UMDWS at 323, a V-operation is performed on the Resource Load Table (RESLD) semaphore at 325, and a P-operation is performed on the Job Occurrence Table semaphore at 326.

When the Job Occurrence Table becomes available, the entry in JOT containing the job number JNB for the requesting process is accessed at 327. If a JNB entry for the requesting process does not exist, the JOT semaphore is sent a V-operation at 328 and a system error return code is returned to the calling process. If the entry does exist, the Job Occurrence Table is updated to indicate that the Declared Working Set for that job is equal to the value of UMDWS (originally retrieved from locations RES REC in the Job Control Structure at step 313) and the Instantaneous Working Set (IWS) for that job number is initialized to "0." Thereafter, a V-operation unlocks the Job Occurrence Table and a successful return code is communicated to the calling process.

USER MEMORY DE-ALLOCATION — DETAILS

FIG. 13 of the drawings is a flowchart showing the sequence of steps involved in the de-allocation of resources at the second allocation level. The sequence is straightforward and involves employing the job number JNB, indentifying the job step whose resources are being de-allocated, to obtain the Declared Working Set value from the Job Occurrence Table at 340, decreasing UMUSED in the Resource Load Table by DWS at 341, and decreasing the value ACTJPUSED in RESLD by ACTJPUSER at 343. De-allocation is completed by a V-operation on the RESLD semaphore and a successful return code being sent to the calling process. In may be noted that static user memory de-allocation is always successful.

DYNAMIC USER MEMORY ALLOCATION — DETAILS

Figure 14:
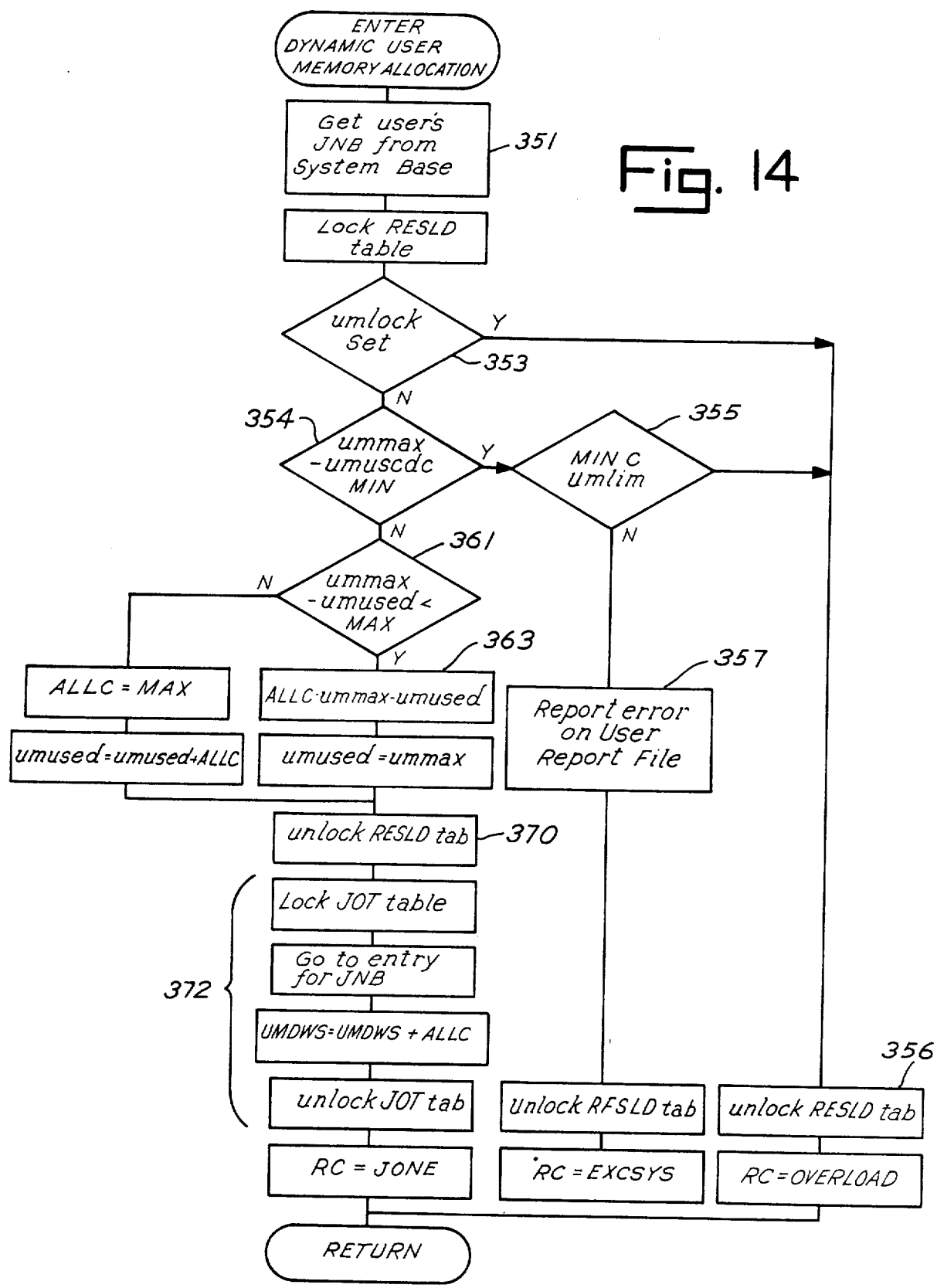
FIG. 14 shows the detailed sequence of events which takes place when user memory address space is reserved dynamically upon the request of a running process.

The flowchart of FIG. 14 shows the detailed sequence of events which take place when user memory address space is reserved dynamically upon the request of a running process. This instrumentality permits the customer to request additional space and to include within the request an indication of the maximum additional number of segments desired (MAX) and an indication of the minimum number of segments (MIN) which must be allocated in order for the running process to continue. Dynamic user memory allocation begins with a fetch of the job number JNB as indicated at 351. It may be noted that JNB is available from system bases [the running process word 150 indicated in FIG. 7] because the step occurrence, on whose behalf an additional memory allocation is sought, is necessarily the running process group.

Once JNB is obtained, the Resource Load Table RESLD is locked to prevent its access by other processes and the user memory data within RESLD is specifically tested at 353 to determine whether it has been locked. If it has been locked, the overall RESLD structure is immediately unlocked and an overload return code is sent to the calling process. If user memory data is available in RESLD, the quantities UMMAX and UMUSED are fetched and a test is made at 354 to determine if UMMAX — UMUSED is less than MIN.

If the available space is less than the minimum requested, a test is then made at 355 to determine whether or not the minimum space requested is less than the upper limit of user memory. If it is not, the fact that the minimum request exceeds the maximum available user memory space is reported to the user at 357. If the minimum does not exceed the upper limit, the RESLD table is unlocked at 356 and an overload return code sent to the calling process.

If, at test 354, it is determined that the available space exceeds the minimum requirement, a test is then made at 361 to determine if the available space exceeds the maximum requested. If it does, the storage location called ALLC is set equal to MAX and UMUSED in RESLD is incremented by ALLC before RESLD is unlocked. If, at test 361, it is determined that the available space is less than the maximum requested, ALLC is set equal to UMMAX — UMUSED at 363 and UMUSED in RESLD is set equal to UMMAX before RESLD is unlocked at 370.

With the Resource Load Table updated in this fashion, the Job Occurrence Table is then locked and the user memory Declared Working Set (UMDWS) for that job number JNB is updated by incrementing it by the value stored in ALLC as indicated at 372 in FIG. 14. Thereafter, a return is made to the calling process with a successful return code.

DYNAMIC RELEASE OF USER MEMORY — DETAILS

The present arrangement also provides a facility which allows the user to dynamically release allocated user memory address space by the inclusion of an instruction to that effect in the user's procedure. As in the case of dynamic allocation, dynamic release of user memory begins with an access of the running process job number from system base as indicated at 381. A test is thereafter made to determine whether or not decreasing the user memory Declared Working Set for the (job) step by the quantity UMR (the number of segments for which release is sought as stated in the calling process) will reduce the Declared Working Set UMDWS to a value less than the Instantaneous Working Set (as then present in the Job Occurrence Table). If it is determined at 383 that the request is excessive, this fact is reported on the user's report file at 384 and an under-limit return code is sent to the calling process after JOT is unlocked. If test 383 shows that UMDWS can be reduced by UMR without falling below IWS, UMDWS in RESLD is decremented by the value UMR at 385 and the Job Occurrence Table is then unlocked.

Thereafter, RESLD is updated by decrementing UMUSED by the value UMR as shown at 387 in FIG. 15, whereupon a successful return code is sent to the calling process.

Figure 16:
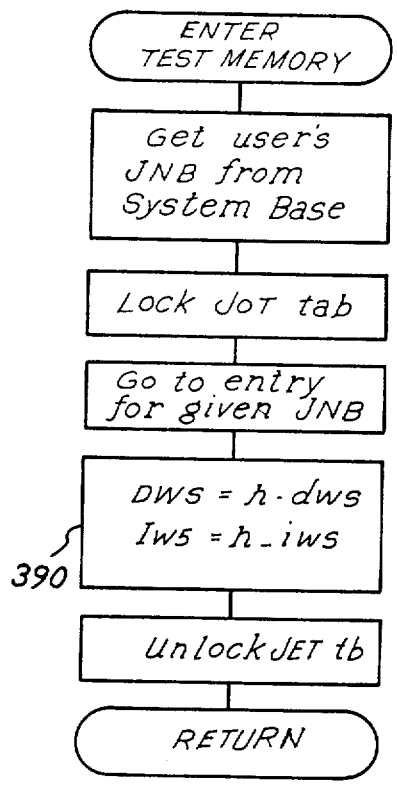
FIG. 16 shows the sequence of steps employed to give the user the ability to test the present status of memory allocation.

A facility is also provided in the present arrangement to allow the user to test the present status of memory allocation as shown in the flowchart in FIG. 16. By retrieving the J-number from system base and locking the Job Occurrence Table, the present values of DWS and IWS for that job may be returned to the calling process as parameters (called h dws and h iws, respectively) as shown at 390.

THE RELATIONSHIP BETWEEN MEMORY SPACE RESERVATION AND VIRTUAL MEMORY MANAGEMENT

The system here described for managing and allocating resources to job steps is organized to work cooperatively with virtual memory management procedures, a preferred form of which will be briefly summarized here and are described in detail in the above identified U.S. patent application Ser. No. 529,254.

Virtual memory management procedures are responsible for the actual allocation of physical address space in main memory and in the mass storage device (normally a magnetic drum or disc storage unit) which forms the "backing store." All of the procedure and data segments for an active job step are loaded into a virtual memory formed by the combination of the swappable user memory zone (region 206 shown in FIG. 8) of main memory and backing store space reserved for use as virtual memory secondary storage. The physical address space available to the programmer for the execution of his job step (process group) may be thought of as a set of segments whose storage locations are described by digital words, called descriptors, found in the set of directories called "segment tables" assigned to the process group. At any given time, a segment identified by a logical address in a program may or may not be present in main memory. If it is present, the segment is said to be loaded. If it is not, it is said to be unloaded. In either case, the segment is said to be loaded into virtual memory since it resides either in main memory or in the mass storage backing store device.

A status field in the descriptor for each segment indicates whether or not the segment is actually in main memory. Other portions of the status field in the segment descriptor indicate whether or not that segment has been written into, previously used, and so on, and these bits are used by virtual memory management procedures to improve the performance of the overall memory system.

When a user's procedure attempts to access a segment which is not loaded, a fact determined from the status field of that segment's descriptor, an exception condition occurs which automatically calls the memory management system into operation. This management system allocates space in main memory for the needed segment, unloading another segment to mass storage if necessary. It then causes the desired segment to be loaded from mass storage and returns control to the original procedure which can now complete its access.

When processing of user procedures is too frequently interrupted because needed segments are missing from main memory, a radical loss of performance can occur. In this condition (called "thrashing"), so much time is spent on memory management that little useful work is accomplished.

Thrashing occurs either because the demands for space placed upon main memory too greatly exceed its physical capacity, or because the management system itself is inefficient. Avoiding the imposition of too great a burden on main memory capacity is one of the objects of the arrangement here described for making an early, rough reservation of main memory address space to job steps during resource allocation. This is accordingly a close connection between the methods employed to allocate resources and the methods employed to manage virtual memory address space.

Both of these techniques make effective use of the "working set" concept. It has been found that user's procedures, once they have become active, may be effectively executed provided that a certain minimum number of segments in the job's address space are available in main memory most of the time. When the number of ordinarily available segments falls below this minimum "working set," memory management overhead (due to excessive swapping) rapidly reaches unacceptable proportions. This concept of a procedure's "working set," defined as the smallest set of segments which must be resident in main memory to obtain acceptable performance in the execution of that procedure, plays a central role in the philosophy underlying the architecture of the present job step and memory management system.

As noted above, the user designated number of segments called the "declared working set" (DWS) forms the basis for the reservation of main memory space as each job step attempts to reach an active state. Virtual memory management procedures also use the DWS value as a control parameter in memory management procedures. The memory management system maintains, for each job step loaded into virtual memory, the count of the number of segments associated with that job currently present in main memory. This count, here called the "instantaneous working set" (IWS) found in JOT, is then compared against the declared working set to provide, for each job step, an indication of the step's propensity to cause thrashing.

Moreover, according to a feature of the memory management system, the user may identify job steps of greater priority as "unsociable" steps and the management system then guarantees, for these "unsociable" steps, space in main memory at least equal to the declared working sets for these steps.

According to a further feature of the management system, the relationship between the declared and instantaneous working sets of those steps loaded in virtual memory is employed to select the step (or steps) to be purged from virtual memory in the event thrashing is detected.

Thrashing is detected by measuring the number of segments swapped from mass storage into main memory per unit time. When this "turning rate" is greater than a maximum threshold, a selected job step (process group) is aborted and its segments are removed from virtual memory and held in residual storage. The aborted process group is held in this waiting condition, and no further job steps are loaded into virtual memory, until the turning rate falls below a second, minimum threshold. The minimum and maximum turning rate thresholds, having different values, prevent oscillations about a single value. p Virtual memory management procedures also utilize the declared working set concept in selecting the segments to be swapped out of main memory and returned to backing store to make space available in main memory in the event of a missing segment exception. According to a first rule, if a segment being considered as a candidate for swapping is part of an "unsociable" job step, it cannot be swapped out if that swapping would reduce that job step's instantaneous working set (IWS) below the size of its declared working set (DWS). According to a second rule, if the IWS of the job step being executed has grown larger than DWS, only segments belonging to that job step can be swapped out. Under a third rule, if the IWS for the running job step is less than or equal to its declared working set, then segments belonging to the running step cannot be swapped out, and non-running job step segments will be swapped out instead, provided that they either belong to a sociable job step, or to an unsociable job step whose IWS is greater than its DWS. The resource allocation and virtual memory management procedures thus work together with the unified objective of guaranteeing, to the maximum degree possible, that job steps will be given main memory address space adequate to hold the user-declared number of segments needef for efficient execution.

BACKING STORE ALLOCATON — DETAILS

Figure 17:
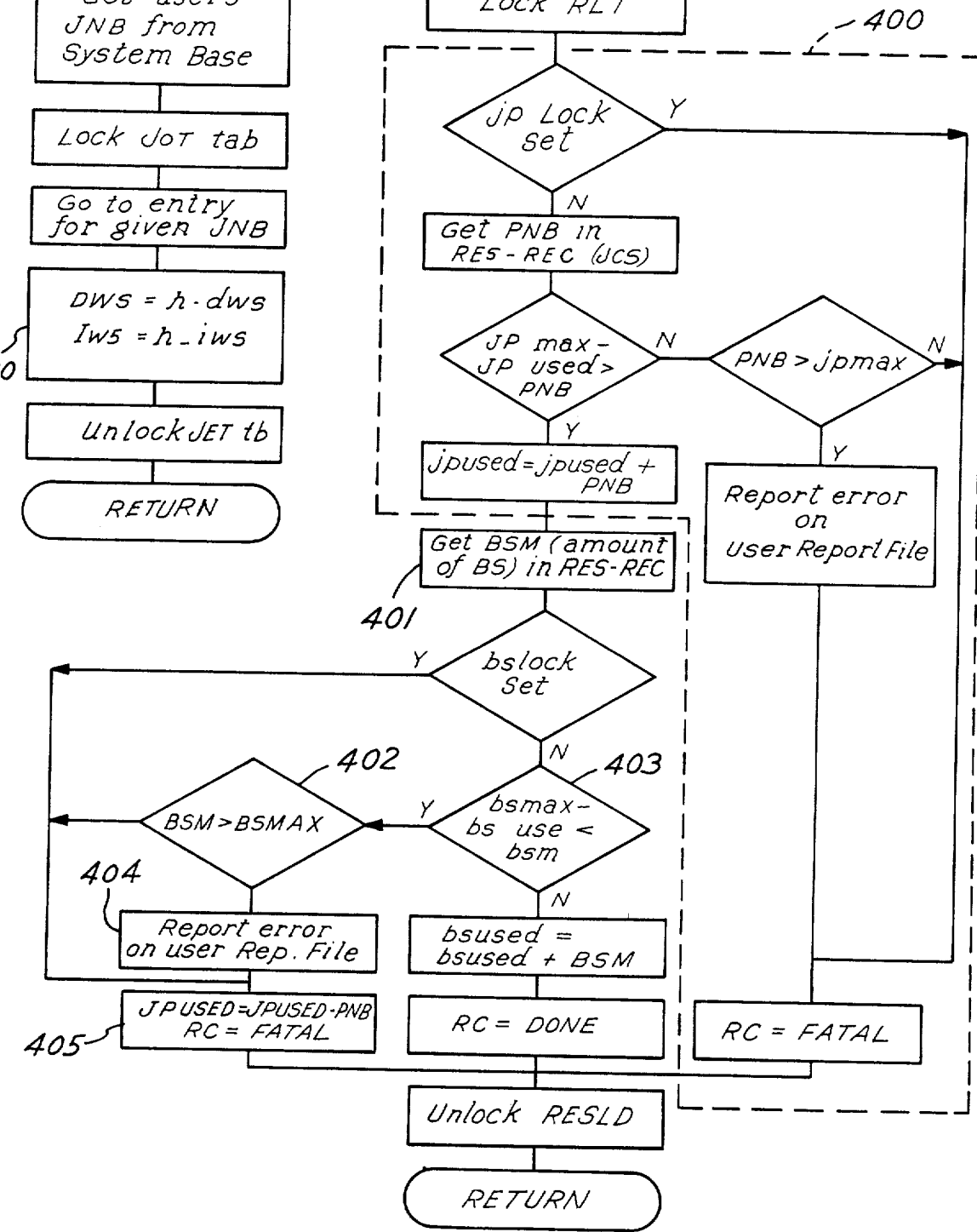
FIG. 17 is a flowchart showing the detailed sequence of events which takes place during the allocation of backing store address space to a job step.

FIG. 17 of the drawings is a flowchart showing the detailed sequence of events which takes place during the allocation of backing store space to a job step. The steps involved in allocating a potential process number are shown within the dotted line 400 and parallel the steps employed for assigning active process numbers as described earlier in conjunction with FIG. 12 of the drawings. The number of potential processes within the step (PNB) is obtained from the Job Control Structure and compared against the counters JPUSED (containing the present number of potential processes present in the system, a quantity initialized at the time of system generation) and JPMAX (the maximum number of potential processes, a quantity also initialized at system generation time and dictated by the size of certain system tables).

If it is possible to allocate potential process numbers to the (job) step, the backing store space requirement value (BSM) is obtained from the resource records within the Job Control Structure as indicated at 401 and, at 403, BSM is tested against the difference between BSUSED (the amount of backing store already reserved) and BSMAX (the maximum size of backing store available to users. If sufficient additional space exists, BSUSED is incremented by the value BSM and a successful return code is sent to the calling process. If insufficient space is available, the requested space size BSM is tested against BSMAX. If the requested size is greater than the maximum size available to users, the request is not credible and this fact is reported to the user as indicated at 404.

Because potential process number allocation and backing store allocation exists on the same resource level (resource level 3), the number of potential processes currently allocated (JPUSED) must be returned to its original value by being decremented by the value PNB as indicated at 405 in FIG. 17. If BSM is not greater than BSMAX, JPUSED is therefore decremented by PNB (to return it to its original value) and a return code indicating an unsuccessful allocation attempt is sent to the calling process.

BACKING STORE DE-ALLOCATION — DETAILS

Figure 18:
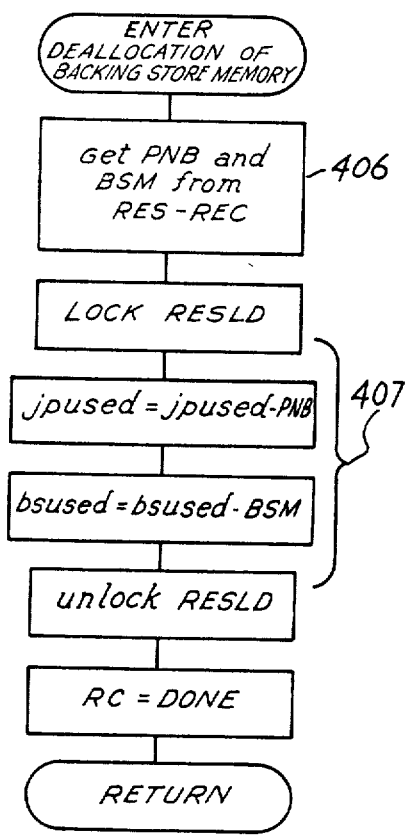
FIG. 18 shows the manner in which backing store address space is de-allocated at the time of process group termination.

The manner in which backing store space is de-allocated at process group termination is shown by FIG. 18 of the drawings. PNB and BSM are first retrieved from the resource records of the Job Control Structure as shown at 406. RESLD is locked, and the quantities JPUSED and BSUSED are decremented by the values PNB and BSM, respectively, as indicated at 407.

Backing store address space is allocated and released at process group initialization and termination only. There is no dynamic allocation or release.

FILE ASSIGNMENT — Details

As noted earlier files may be either "assigned" to (job) steps or "consigned" to jobs.

Figure 19:
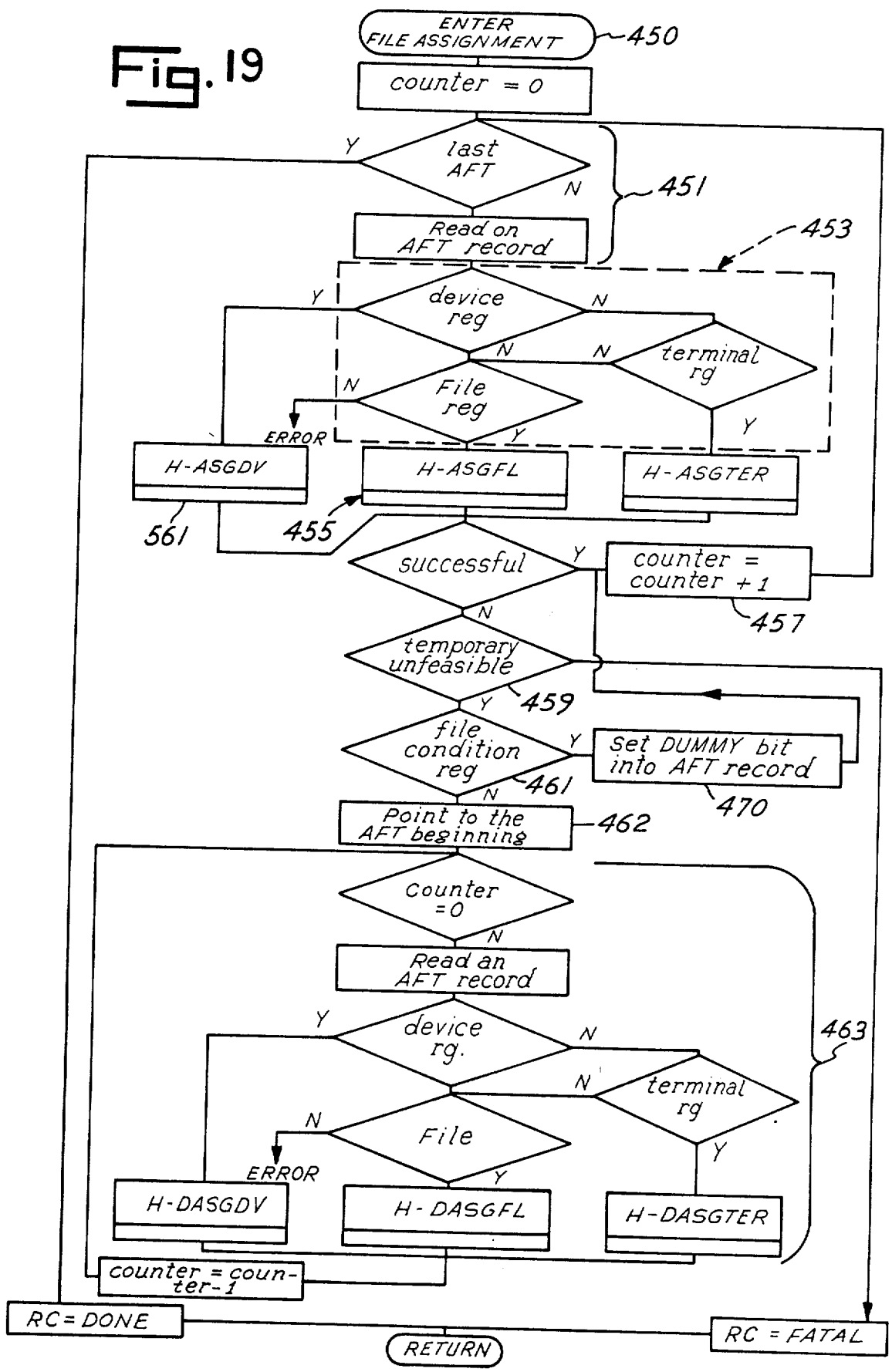
FIG. 19 is a flowchart indicating the sequence of steps executed during file assignment.

The sequence of steps executed during file assignment are shown in the flowchart of FIG. 19. The sequence is entered at 450 and a storage location, here called COUNTER, is initialized at "0." A data structure called the Assign File Table (AFT) is then read, entry by entry, as indicated at 451.

AFT is located in a subfile (called SCR) of the Job Control Structure which contains an entry for each internal file name and index (*ifn*, index) to which will be assigned either devices, devices with a file, or devices with volumes. Each AFT table entry is then tested, as shown generally within the dotted rectangle 453, to determine whether that entry corresponds to a request for the allocation of a device, file, or terminal.

The Assign File Table (AFT) is created from the job control language (JCL) statements written at the time the job step is launched as well as from additional source language information . [These data structures, called CL and SL respectively, will be discussed in more detail later in connection with FIGS. 21-29 of the drawings.]

If it is determined at 453 in FIG. 19 that it is a file that is being requested, the ASSIGN FILE procedure 455 (shown in more detail in FIG. 20) is entered. It is the function of the ASSIGN FILE procedure to indicate whether or not it is possible to assign an external file name to the step's internal file name and index. If the ASSIGN FILE procedure issues a successful return code, COUNTER is incremented by 1 as indicated at 457 and the procedure continues with the next entry on the Assign File Table. If the attempt to assign an external file name to a (*ifn*, index) is unsuccessful, a return code is checked to determine whether or not the unfeasibility of file assignment is temporary, as indicated at 459. If it is, a test is then made at 461 to determine if the file request is "conditional;" that is, whether the requesting step can proceed without the file being assigned. If it can, a flag, called "DUMMY," is set in the Assign File Table record for that file as indicated at 470.

If the unsuccessful file assignment attempt is not "conditional," a return is made to the beginning of the AFT at 462 and then the procedure shown at 463 is employed to de-allocate all files previously assigned in accordance with the "all or nothing" assignment strategy employed to avoid allocation deadlocks.

Figure 20:
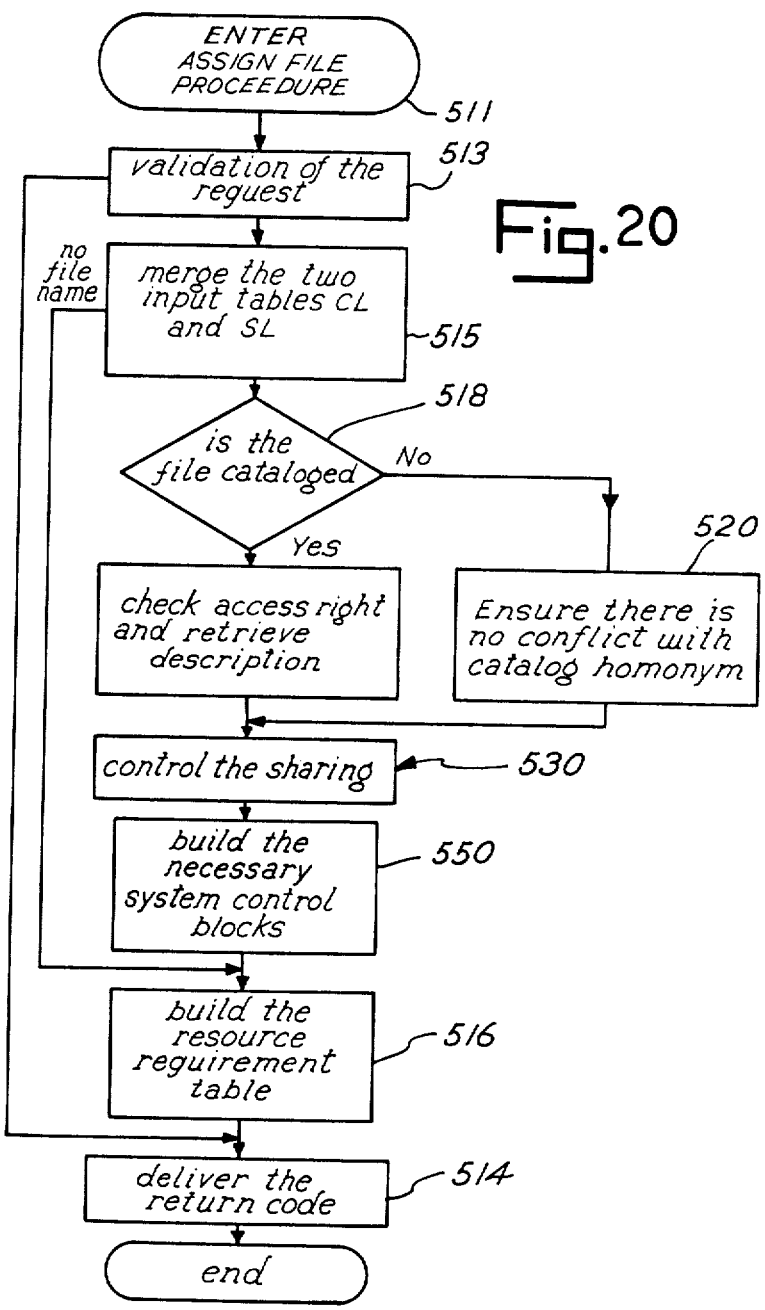
FIG. 20 provides a more detailed showing the the ASSIGN FILE procedures indicated generally at 455 in FIG. 19.

The ASSIGN FILE procedure indicated generally at 455 in FIG. 19 is shown in more detail in FIG. 20 of the drawings. It is the function of the ASSIGN FILE procedure to indicate whether or not a request for a file can be satisfied.

When the ASSIGN FILE procedure (shown in the flowchart of FIG. 20) is called, the following set of required input parameters is provided:

(1) a data structure called STEPINF, which contains information about the process group (step) on behalf of which the assignment is being requested;

(2) a storage field called STATUS, which will contain the return code information needed to advise the calling process of the success (or lack of it) of the ASSIGN FILE attempt;

(3) a pointer called RESOURCE to an information structure called RESOUT;

(4) CLFICB (the Control Language File Identification Control Block), which includes a pointer to an information structure called CL; and (5) SLFICB (Source Language File Identification Control Block), which includes a pointer to an information structure called SL.

When a user requests the assignment of a file, he specifies the environment he accepts, the rights he wants to own on the file (e.g., the sharing to be allowed), and the processing mode he wishes. It is then necessary to determine if that request can be satisfied and to determine if the request is compatible with the information which defines the file as declared (perhaps by another user who created the file).

The precise form of the information structures provided by the user is specified in FIGS. 21 through 29 of the drawings. In those FIGURES, the information structures are defined using data declarations expressed in standard PL/1 language.

For example, FIG. 21 defines the form of the information structure STEPINF. The first line, which reads, "DCL 1 STEPINF" indicates that the structure has been given the keyword name "STEPINF" and is composed of five parts, each part being described in the five indented lines. The first of these reads "3 ACCOUNT CHAR (25), /* account number */" and means that the first portion of the data structure STEPINF has been given the name "ACCOUNT" and is a field which is 25 characters long. The words "account number" which appear between the symbols /* and */ is a "comment" not used in processing but useful to explain the intended use of the field. In this case, the field ACCOUNT within the STEPINF structure indicates the account for which the job step is working and will be used, as described later, in the course of the allocation and sharing of files.

The second line of STEPINF is the 8 bit long field called JNB which will provide, to the ASSIGN FILE procedure, the J-number of the process group on behalf of which file assignment is being requested. The remainder of the STEPINF structure provides the Step Occurrence Number (SON) for the process group, and pointers to the user communication areas (UCA's) of the executable job control file (JCFYUCA) and the system report (SYSREPUCA).

Figure 23:
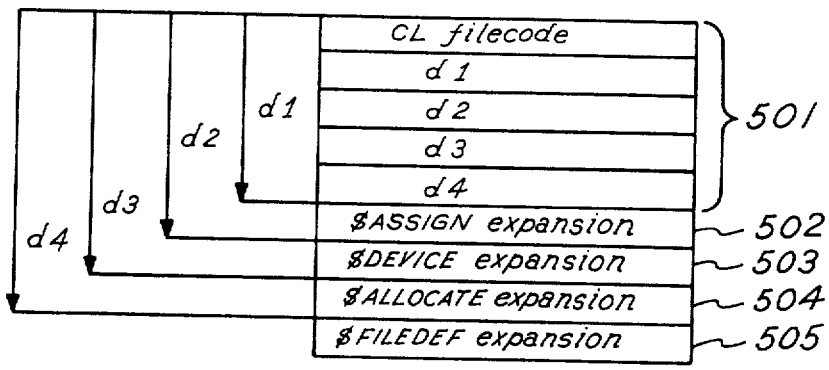

FIG. 22 shows the data structure called RESOUT pointed to by the parameter RESOURCE supplied as a parameter when the ASSIGN FILE procedure is called. As seen in FIG. 22, the data structure RESOUT is subdivided into seven parts, the last one of which (called "VOLID") is subdivided into three subfields. As noted earlier, the ASSIGN FILE procedure is also provided with an input parameter which is a pointer (called CLFIB) which provides the location of a data structure called CL. The general organization of CL is shown in FIG. 23 of the drawings. As there shown, CL begins with a header, indicated at 501, which contains within it four displacements, d1-d4, each of which indicates the address space displacement by which each of the substructures (502-505 in FIG. 23) are offset from the beginning of CL. These displacement values speed list scanning procedures by allowing an immediate jump to the address of a substructure by merely adding the displacement value found in the CL header 501 to the original pointer value.

The detailed format of the CL information structure is shown in FIGS. 24 to 28 of the drawings, each of which comprise data declaration statements in PL/1 language defining the substructures shown at 501 to 505 in FIG. 23.

The information structure SL is derived from source language file descriptions given at the time of file declaration and differs from the format of CL only in that two flag bits have been added to the SL header which are not present in the CL header.

The first of these, called DEFAULT, is set to 1 in the event SL was built by the compiler operating in a DEFAULT mode when file definition information was not supplied in the source program. The last bit, called DEFNAME, when set to 1, indicates that, if the file name appears in the parameters of a future request to assign the file, that name must be prefixed by the step occurrence number of the requesting process. Selected ones of the entries within the data structures described in FIGS. 22 through 29 will be discussed in more detail below in conjunction with file assignment. Further details on the use of PL/1 declarations to create information structures appear in the text *Programming Language/One*, by F. Bates and M. L. Douglas, Prentice-Hall, Inc. (1968).

As shown in FIG. 20, the ASSIGN FILE procedure is entered at 511 and first validates the request for a file assignment at 513. If the request is invalid, a return code to that effect is sent to the calling process as indicated at 514.

Information concerning the file, the assignment of which is being requested, comes from three different sources. First, if the file has previously been created and is already known to the system, information concerning it is contained in system catalogs. Secondly, information concerning the file is contained in the user's source program as expanded during static linking. For example, the reference within a source program to a block of data is converted, during static linking, into a provisional file description contained in structure SL. Finally, external JCL statements (declared at the time the operator instructs the system to launch a job step) are expanded into the information structure CL which must be compatible with, and will in part override, the SL structure.

During the course of merging the two input tables CL and SL as indicated at 515 in FIG. 20, it is first determined whether the internal file name specified in CL exists in SL (that is, exists within the load module). If not, a check is made to determine if the JCL assign request specifies a symbolic device reference now already known within the (job) step and, if so, the appropriate resource requirement table is built as indicated at 516.

During the merger of the tables CL and SL, after it has been determined that the two different declarations are not contradictory, a search is commenced on the KNown Objects Table (KNOT) as indicated at 518 to determine if the file, assignment of which is requested, has been previously cataloged. If the requested file has not been cataloged, tests are made at 520 to ensure that no ambiguity exists between the description of the requested file and the description given for any cataloged file. If the file has been cataloged, the access rights to the file (as given in the catalog) are checked against the access rights of the "account" to which the job step is charged.

One of the main purposes of the catalog is to help enforce the privacy of files. For each file described in the catalog which is not a "public file" (i.e., available to any user), a list is maintained for all of the accounts having access to that file, together with the specific access rights granted to each account. The access rights to a file are:

(1) DEFINE — the right to establish the characteristics of the file and the list of authorized accounts, and the right to delete the file from the catalog;

(2) LIST — the right to list the characteristics of the file (except the access rights);

(3) READ — the right to read information from the catalog which describes the file;

(4) WRITE — the right to append new descriptive information through the pre-existing catalog description;

(5) UPDATE — the right to change pre-existing information in the catalog; and (6) RECOVER — the right to access the file when it is marked as damaged.

As has been seen, access rights control the sharing of files between different accounts. Clearly, if a user desires, the use of a file he creates may be limited to those working under his account number by making it impossible for users working under other account numbers to access the catalog description. In the event that it is determined that the access rights contained in a request are unavailable, the assignment of the cataloged file to the requesting job step is not permitted and the request is treated as if the cataloged file did not exist.

While this method of controlling access to files on the account level is a highly desirable feature, additional protection is needed to maintain the integrity of the file system. For example, the catalog itself is a public file, as it can be accessed on behalf of any account, but obviously such a system file should be handled only through system procedures; that is, a user procedure should not be allowed to maliciously or inadvertently destroy the catalog. For that reason, a ring number may be attached to each granted permission. A preferred arrangement for accomplishing ring protection is described in detail in the co-pending patent application entitled "Arrangement for Allocating Requested Space in Main Memory of a Computer," Ser. No. 529,254, filed Dec. 2, 1974.

Another level of protection for systems files is provided through the definition of file subtypes. The subtype (cataloged for each file) describes the type of data contained in the file [e.g., PL/1 source programming, executable job control language (JCFX), compilation unit, load module, data, etc.]. The file subtype description allows system procedures to verify that the file being processed contains the type of data expected and provides a basis upon which to automatically limit the ring numbers attached to permissions. For example, an account may not modify a load module through a user procedure (ring 2 or 3), even though, according to the access light permissions listed for the load module, that right has been apparently given. The subfile type designation for a given file cannot be changed by the user and this type of protection operates in a manner invisible to the user.

The ability to share files among plural user projects while protecting these files against malicious or inadvertent destruction is promoted by the segmented addressing architecture of the computing system which has been described. Processes are able to access only those files which are represented internally as segments within their own address space [see FIG. 6 of the drawings]. Taken together with the protection afforded by the (1) cataloged account access lists, (2) the cataloged subfile types, (3) the ring attributes of processes, and (4) the shareability attributes (to be discussed in more detail) designated for each file, segmentation assures the integrity, privacy and security of the user's files.

Sharing of files is controlled at the time of file assignment as indicated generally at 530 in FIG. 20. The information upon which sharing control decisions are made is created at the time of file creation by the user who declares catalogable file descriptions which include the definition of the shareability level of the file. At the time of attempted file assignment, the user requesting the assignment of a file to his job defines the manner in which he wishes to use the file (or allows the system to implicitly define the shareability level and processing mode upon the user's default). The shareability level stated in the user's source language program appears in the data structure SL depicted in FIG. 29 which may be overridden by a different statement contained within the job control language structure CL as indicated at 533 in FIG. 25 of the drawings.

As shown in FIG. 25, the shareability level data substructure (named SHR) comprises five single bit fields, respectively, named XP, XS, SRO, SXW, and SNX. When the bit XP = 1, the requested file is to be used exclusively by a single process within the (job) step requesting assignment. When the XS bit is set to 1, the user requests that the file be used only by the requesting process group (during the life of that process group). From the standpoint of the assign function, the XP and XS sublevels are identical (since assignment is always performed exclusively to a process group). Therefore, XP and XS are synonymous from the standpoint of the procedures employed to determine whether or not a file can be assigned to a job step.

The third shareability level within the substructure SHR is named SRO and means, when set equal to "1," that the requested file may be read only (by any requesting job step) during the life of the presently requesting job step. The bit SXW, when equal to "1," means that the requested file may be read by any user but may be written into only by the requesting job step during its life as an active process group. Finally, the last bit named SNX, when set equal to "1," means that the requested file is to available (as far as the requesting job step is concerned) for sharing by any user, all of whom are allowed to either read or write into the file.

At the time a file is created, its creator designates its shareability level in a manner precisely like that shown at 540 in FIG. 25 for the control language file request definition of the shareability level. At the time of a requested assignment of a cataloged file, the cataloged shareability level and the requested level of sharing are both considered and the most stringent of the two becomes the current sharing level. The shareability levels can be ordered from the more restrictive to the less restricted as follows: XP, XS, SRO, SXW, and SNX. For protection purposes, the file creator may statically define the upper shareability level he accepts for his file and catalog it. Similarly, the requestor specifies the shareability level in either the source language structure SL (which may be overridden by a different control language shareability level statement contained in the data structure CL at the time the two input tables CL and SL are merged as indicated at 515 in FIG. 20.) The chart, which appears as FIG. 30 of the drawings, shows the possible cases which can exist at the time the cataloged sharing level and requested sharing levels are taken in account. The current sharing level thus produced is assigned to the file so that, during the time the requesting process group is active, the most restrictive level will be applied to the file.

This most restrictive level is the one which serves as the input to the assignment matrix shown in FIG. 31 of the drawings. In that table, R and W are the numbers of process groups reading and writing, respectively. The result of the assign function appears in each box: "N" stands for NO (the assignment is refused); "Y" stands for YES (the assignment is granted and the current status remains unchanged), and, in all other cases, the current status is modified by the new assignment and the new sharing status is then indicated.

The access methods, to be described, offer a tool to detect concurrent accesses and are called generally "sharing control." However, a user may decide to process a file without using this facility and it is the assign procedure's role to insure that that decision will not disturb the general agreement of the other processes as depicted in FIG. 32 of the drawings. In FIG. 32, "Y" stands for YES (the assignment is granted) and "N" stands for NO (the assignment is denied).

Finally, the assign procedure checks the compatibility between the current sharing type and the requested one. As seen in FIG. 25 of the drawings, the information structure CL (like the information structure SL) contains a 10 bit long field named PROCMODE which defines the processing mode requested by the user. The PROCMODE field may be subdivided into five subfields of two bits each for each of the five possible modes requested.

If the first bit in each pair is set equal to "1", the "sharing type" requested is "cooperating." If this first bit is set to "0," the type of sharing requested is "independent." The sharing type defines, for a given processing mode, the form of inter-processes synchronism. "Cooperating" processes share the same current record address while "independent" processes have their own current record address. For a given processing mode, several processes may be cooperating while others may be independent.

The second bit of each pair in PROCMODE, when set to "1," indicates the corresponding processing mode is desired. The manner in which compatibility between the current sharing type and the requested one is determined is indicated in the matrix which appears as FIG. 33 of the drawings. As there shown, the five possible processing mode types are: R (standing for "read"); W (standing for "write"); U (standing for "update"); A (standing for "append"); and I/O (standing for "input/output"). As in FIGS. 31 and 32, Y and N, respectively, stand for YES (assignment granted) and NO (assignment denied).

The different requests of sharing levels made by a stream of process groups are traced so that the maximum level allowed will be restored when any process group de-assigns the file. For example, if a file is first assigned to a first process group which desires only to read the file and imposes no restrictions on its use by others, the file's status is initially (SNX, R = 1, W = 0). If, at a later time, a second process group requests permission to read the file and additionally imposes the restriction that only a single process group be able to write into the file, the file's status becomes (SXW, R = 2, W = 0). If a third process group then requests the assignment of the file, itself desiring only to read the file, but imposes the additional restriction that no one be permitted to write in the file although it may continue to be shared for the purposes of reading, the new file status becomes (SRO, R = 3, W = 0). If the second process group de-assigns the file before the third does, the sharing level remains unchanged. But if the third process group de-assigns the file before the second, the status is restored to that following the assignment to the second process group. Sharing levels thus can be considered to be managed on a stack basis. The shareability level and processing mode structures in the catalog (which exist in a format identical to that shown at 540 and 541, respectively, in FIG. 25) are thus updated periodically so that the catalog retains the current shareability level and processing mode.

As seen in the flowchart of FIG. 20, following process sharing control procedures, the necessary system control blocks are built as indicated at 550. In the case the requesting step belongs to a job which has the consign option (and if the consign file has not already been consigned) the ASSIGN FILE procedure flags the file description as being consigned. The FICB (File identification Control Block) — a table which identifies an active file and insures the control of sharing of the file between several users is created (from the merged SL and CL structures) or updated if already present in the system catalogs. Once created or updated, the list of volumes needed for processing is derived from the FICB and built into the Process Group Device Resource Table (PGDRT). Information concerning the needed volumes is found in the FICB, a data structure which has a format bearing a one to one correspondence to the data structures CL and SL as shown in FIGS. 23 through 29 of the drawings.

The information in the FICB is then written into the Process Group File Directory as a PGFICB (Process Group File Identification Control Block), a table which defines the manner in which a file is to be processed by a given process group and the actions to be taken at the time of job step termination.

Other system structures which are created or updated at 550 (shown in FIG. 20) include the Process Group File Code Directory (PGFCD), a directory which contains all of the file codes used by a process group and thus enables the retrieval of the associated PGFICB and the File Description In Catalog (FDIC) which gives the file identification and definition and allows the file to be retrieved on secondary storage just by supplying its name. Once these process group file structures are created during the file assignment procedures, they are retained in Job Control Structure (JCS) file for future use. The creation of File Definition Block (FDB) which contains all of the parameters needed to process an active file by every user which processes it and the File Extent Control Block (FECB), a control block giving the location on secondary storage of each active file, is deferred until OPEN time.

Although file definition processing need not be discussed here in more detail (since such details are unrelated to the principles of those resource allocation and sharing procedures here disclosed), the timing of file definition processing is dependent upon the overall strategy of resource allocation and sharing.

First, it may be noted that file assignment could take place at the load module level at the time of static linking. When a source program refers to data in an external file by means of a symbolic reference (SYMREF), and that symbolic reference is successfully related to a symbolic definition (SYMDEF) contained in the catalog of referencable items in external files, it is then known that the external file will be required by that step. Thus, reference to the cataloged information descriptive of that external file could be made at the time of static linking. The difficulty with such an approach is that the status of that external file might change considerably before the requesting load module is converted into an active process group. For example, as previously discussed, other process groups may change the sharability level of the file before that process group can be launched. For this reason, file assignment is delayed until the file allocation phase of process group initiation. In this way, premature building of file control structures is avoided. Once these structures are built, however, they may be retained. For example, if it is impossible to allocate all the files needed for a given step, the previously allocated files are de-allocated, but the file control structures built during allocation are retained. At the time re-assignment is requested, it will thus merely be necessary to update selected portions of the previously built file control structures.

Once file control structures are built in a successfully allocated file, the resource requirements table is built and a return code is sent to that process which called the ASSIGN FILE procedure; namely, the file allocation procedure shown in FIG. 19 of the drawings. If, as shown in FIG. 19, the tests at 453 indicate that the entry read on the Assign File Table record at 451 indicates a device requirement, the procedure (named ASGDV, assign device) is entered at 561. The ASGDV function creates the necessary control blocks for a further processing, updates the Internal Device Requirement Table (IDR) as well as the Internal File Name Directory (IFNDR) and the PGFCD. When the request is a symbolic device reference not already known within the step control information structures, a Symbolic Device Reference Record is created in the Process Group File Control Directory. The input values for the assign device procedure are obtained from the data structure (named DEVICE) shown in FIG. 26 of the drawings. The distinction between the assignment and allocation of devices should be borne in mind. The "allocation" of devices, which will be described in more detail, is requested by device class name and, at allocation time, only a number of devices of the class is allocated. The "assignment" of specific devices occurs when the user assigns a file which implies the assignment of the specific devices necessary to use the file.

DEVICE ALLOCATION — Details

The device allocation procedure is reached at resource level 5 if file allocation, at resource level 4 was successful.

The device allocation procedure calls upon two tables: the Process Group Device Requirement Table (PGDRT) and the Process Group Device Status Table (PGDST). PGDRT and PGDST are essentially the same table, PGDST being an updated version of PGDRT. PGDRT is created at the time a step is initiated from the device requirements specified in the merged SL and CL data structures [see FIGS. 25 and 26]. PGDRT is updated (and then known as PGDST) during the allocation or de-allocation of devices.

The first time an attempt is made to satisfy the device requirements of a queued step, the PGDRT subfile is opened and scanned. If the device requirements cannot be satisfied, the step is queued at resource level 5. In order to avoid the necessity of reopening the PGDRT subfile each time an attempt is made to satisfy the requirements of the queued step, a summary of the device requirements as specified in PGDRT is stored in the queue cell with other information concerning the queued step. This summary, called a "demand vector" may then be checked when device allocation is again attempted and the PGDRT opened and scanned when the demand vector indicates that the request can be satisfied.

Two vectors are used: (1) a "demand vector" contains a summary of the device requirements as stored in the PGDRT; and (2) a "free device vector" which contains a summary of device availabilities. Both vectors consist of a list of numbers, each number being presented in a 4 bit long field and representing a number of devices of a certain type; that is, the number of free devices in the case of a free demand vector or the number of requested devices in the case of a demand vector. For example, the first 4 bit field may indicate the number of magnetic tape transports required, the second the number of disc files required, the third the number of printers required, the fourth the number of card punches required, and so on. A final 4 bit long field may indicate the total number of devices not otherwise classified which are needed by a requesting process. The types of devices represented in the vector fields are defined at the time of system generation and recorded in a Device Vector Description Table (DVDS) according to the types of devices which actually exist in the particular system configuration.

When the initial allocation attempt fails, the step is queued at level 5 and its demand vector is stored in the queue. At the next allocation attempt, a free device vector is retrieved and compared with the step's demand vector. If the result is negative, the step is queued again. If the vector comparison indicates that device allocation can be successful, PGDRT is updated (and then known as the PGDST). PGDST is then closed and a successful return code sent to the calling process.

MEDIA MOUNTING

At this point, the existence of assigned devices, files, and volumes is known in the system tables. When media volumes are mounted on the appropriate devices and the file labels read, the system structures are updated to indicate that such media are loaded and available on the peripheral device. Thus, following device allocation at resource level 5, a check may be made to determine if the appropriate media volumes have indeed been mounted before process group initiation can continue. If it is determined that a volume required by the step has not been mounted, instructions to the operator can be issued on the system console advising of the need for the volume(s) and the step queued until all required volumes are mounted. When this has been donw, resource allocation continues at level 7.

VOLUME SPACE ALLOCATION — DETAILS

The "resource" allocated at level 7 is space on a disc volume requested in order to extend or create a file. Disc volume space is statically allocated at process group initiation time in order to obtain space specified by the user in the merged CL and SL structure. The space requirements are specified in the format shown in FIG. 27 of the drawings. The requested files are flagged in the Assign File Table (AFT) at file assignment time. If the allocation cannot be performed because of a lack of disc space, the step is aborted (if the specified volume is not a resident one) or enqueued (if the volume is resident) until space is released.

Volume space de-allocation is performed either upon dynamic request or at process group termination time. When space is released, the space allocation queue is notified in order to allow an attempt to satisfy the needs of other waiting customers.

CONTROL MEMORY ALLOCATION — DETAILS

The segments located in control memory (i.e., the address space 205 as shown in FIG. 8 of the drawings) are not swappable and are hence relocated to the backing store only in the event of process group blocking ("roll-out"). In order to manage the use of control memory, it is partitioned into "working sets." There are two kinds of working sets: those private to process groups and a system wide working set. The process group working set includes the process group control segment, stack segments, a segment containing the channel programs for the process group, and segments containing the buffers (storage areas used during I/O transfers).

Two counters are used during the course of control memory allocation. The first of these, called CMDWS, contains the total number of control memory segments reserved for a process group and CMIWS, which contains the present number of contrl memory segments allocated to the process group. Both of these counters are located in the Job Occurrence Table (JOT). Three further counters located in the Resource Load Table are also employed. These are: CMUSED, containing the present amount of control memory reserved for all the declared working sets in control memory, a value initialized at system generation time to reflect the number of segments making up the permanent system process groups; CMMAX, the maximum size of control memory, a value initialized at system generation time and altered if the position of the boundary between user memory and control memory is moved; and CMLIM, the maximum size of control which is available for users (excluding the permanent process groups), a value also initialized at system generation time.

The specific procedures used to allocate and de-allocate control memory space will be apparent from FIGS. 34 and 35 of the drawings. These procedures closely parallel those used during the allocation of user memory (as previously discussed in conjunction with FIGS. 12 and 13 of the drawings).

PROCESS GROUP LOADING ABILITY — DETAILS

For reasons discussed in more detail in the patent application identified under related applications, Ser. No. 529,254 the physical address space which makes up the control memory area of main memory is actually mapped by virtual memory management procedures. Due to an effect called "fragmentation," the vacant address space within control memory may not be completely utilizable. For this reason, even though the information obtained from the Job Occurrence Table indicates that adequate space is available in control memory to contain the control structures of the requesting job step, it may be impossible for the virtual memory management procedures to actually load this information. If this difficulty occurs, the requesting process is enqueued to wait for the release of control memory space. Once control memory structures have been loaded by virtual memory management procedures, the first process of the group may begin its execution.

RESOURCE ALLOCATION QUEUES — DETAILS

Figure 36:
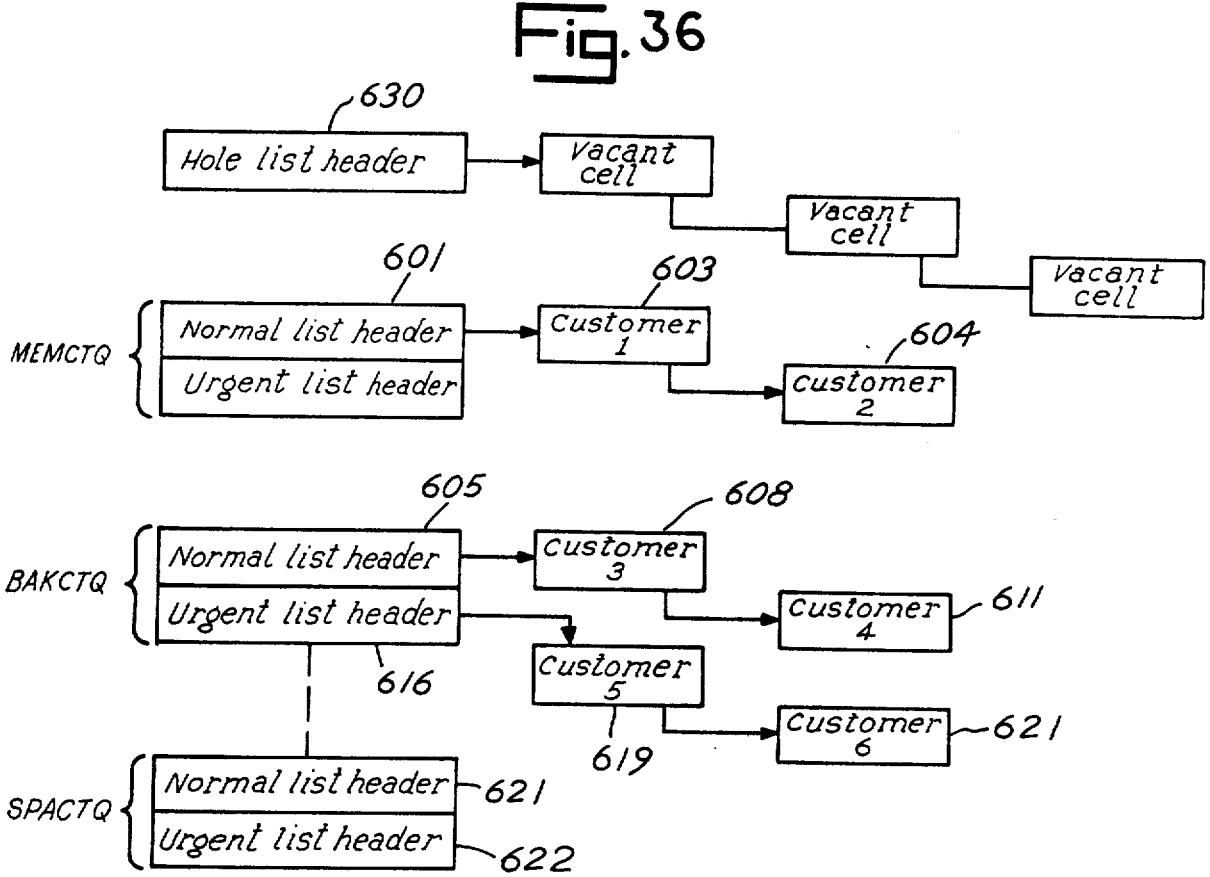
FIG. 36 illustrates the basic structure of the queues provided at the various allocation levels.

As noted earlier, there are two queues provided for the allocation levels discussed earlier. One of these queues is for normal customers and the other for urgent customers. As shown in FIG. 36 of the drawings, the queues are implemented as list structures, each list consisting of a number of linked cells, each cell containing information concerning a single customer. As shown in the example of FIG. 36, six customers are indicated as competing for system resources in order to be placed in an active state. The user memory allocation queue MMCTQ includes a normal list header indicated at 601 which includes a pointer to a cell 603 which contains information concerning customer number 1. The queue cell 603 in turn contains a pointer to cell 604 which contains information concerning customer number 2. The backing store allocation queue BAKCTQ includes a header 695 which includes a pointer to cell 608 containing information about customer number 3, as well as a pointer to cell 611 containing information about customer number 4. BAKCTQ further includes an urgent list header 616 which includes a pointer to cell 619 containing information about customer number 5. Cell 619 in turn points to cell 621 which includes information about customer number 6. The space allocation queue SPACTQ includes normal and urgent list headers indicated at 621 and 622, respectively, which ae vacant.

In order to simplify the management of the cells, a hole list header 630 is included which points to the first of a chain of vacant cells. In this way, it is unnecessary to institute a search for a vacant cell since one can be located through the hole list header. When a vacant cell is filled, the hole list header is updated with the pointer to the second vacant cell which then becomes the first. As customers release cells, they are added to the vacant cell list structure.

Figure 37:
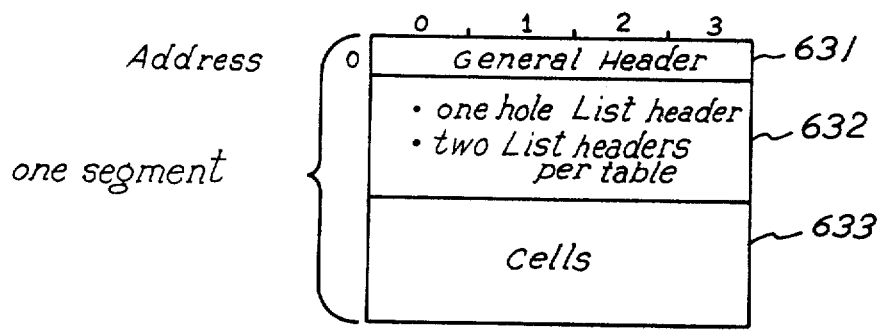
FIG. 37 illustrates the format of the queue segment containing the linked cells making up the allocation queues.

The general organization of the structure making up the allocation queues is indicated in FIG. 37. The structure is a segment prefixed by a segment header as indicated at 631, followed by the list headers at 632 which include a single hole list header and a pair of list headers for every allocation level. The cells themselves are located in region 633 of the allocation queue segment.

PROTECTION OF SHARED INFORMATION THROUGH CLASSIFICATION OF SEGMENT TABLES

Figure 38:
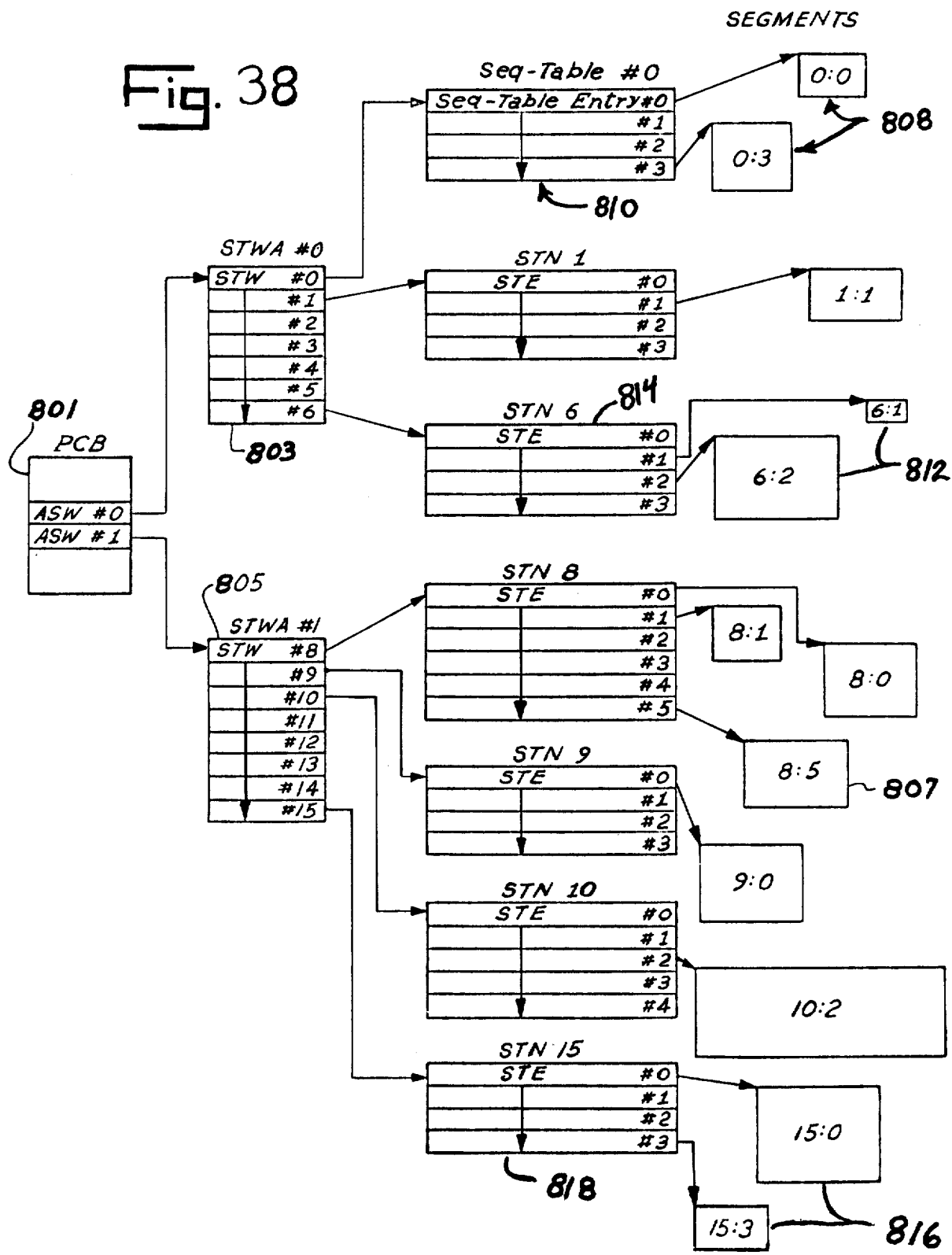
FIG. 38 shows the mapping of address space in virtual memory for a typical process.

The indirect, segmented addressing mechanism discussed earlier in conjunction with FIG. 6 of the drawings provides a vehicle allowing the user to add an additional level of protection against unauthorized use of shared information. FIG. 38 of the drawings shows in more detail the mapping of the address space of a typical process in virtual memory. Process Control Block 801 includes the pointers ASW#0 and ASW#1 which indicate a base address of two segment table word arrays 803 and 805. These two arrays point to as many as 14 segment tables which are made available to a process. In the example shown in FIG. 38, only seven of the 14 possible tables are actually used by the process and entries 2-5 in array 803 and entries 11-14 in array 804 are empty.

In accordance with a principle feature of the present arrangement, these tables each exist in one of three possible classes. One set of table numbers will be reserved for system segments and a copy of these will be used (that is, be in the address space of) all processes. These "system-global segment tables" are stored in a predetermined zone of the backing store at the time of system initialization.

Another set of table numbers may be reserved for those segment tables which may be shared by different processes within the same process group. These tables, called the process group local segment tables are then distinguished from the remaining tables which are placed in the third class and called process-local segment tables.

It will be remembered that it is desirable to make widely used system functions *distributed* functions; that is, to place them within the address space of all of the processes. This method is particularly well suited to the segmented, indirect addressing mechanism which has been described in that it implies merely a small additional overhead to the procedure call mechanism, and communications between user and system procedures are made much easier. Procedures which are not forecasted to be frequently used need not, and often should not, be in the address space of all processes; accordingly, such procedures will be located in segments which have copies attached only to those processes that require them.

Segments do not overlap and a given segment is described by a single segment descriptor. In consequence, the sharability level of a segment is extended to its segment descriptor. Since descriptors are gathered in a segment table and the type of all segments attached to a specific table are identical, segment tables themselves have a type which is the same as that of the segments they describe. Moreover, since there is only one segment descriptor describing a segment, all processes sharing a segment have the same access rights to it.

In the example shown in FIG. 38, if the segments shown generally at 808 (which are pointed to by Segment Table #0 indicated generally at 810) are "type 0" system global segments, both the segments 808 and the table 810 are in the address space of every process loaded in virtual memory. If the segments indicated generally at 812 are not system global segments but are to be shared by those processes in the same process group, they may be made "type 2" segments with the result that the segments 812 and the table 814 will exist in the address space of every process in that process group, but not in the address space of any process in a different process group. Finally, if the segments indicated generally at 816 are to be used only by a single selected process, they are made "type 3" segments, with the result that the segments 816 and the table 818 will exist only in the address space of that particular process. If it is desired to use all or part of the information stored in segments 816 in a different process (perhaps in a different process group), that information must be repeated in a different segment or segments pointed to by a different segment table.

As will be described in more detail below, the user is given the ability to indicate not only the sharability level of the files he creates, but also to designate the sharability level of the file control structures used by file and data management procedures.

FILE CONTROL STRUCTURES — GENERALLY

The term "file control structures," as used in this specification, refers to those parameters and groups of parameters maintained by and for the use of the computing system which describe the definition, attributes, and status of a file. These control structures may be sub-divided into two logical groups which are here called (1) File Management Control Structures and (2) Standard Access Control Structures.

The "File Management Control Structures" are those used, in general, during job and process group initiation (in contrast with those used during program execution). The File Management structures are used to store information about the file, its space allocation on secondary storage, its relationship to volumes and devices, and its relationship to its users.

The "Standard Access Control Structures", while they may exist in some skeletal form before the file is opened, are only used from the time the related file is opened until it is closed. Each of these control structures is separated into discrete, manageable substructures for the following reasons (among others):

First, in order to support the concurrent sharing of a file by more than one user, each user requires substructures which define his unique relationship to the file, while general file definition substructures may be shared by all authorized users of the file. The File Control Block is thus defined to provide information relating to an individual user of the file, while the File Definition Block provides information defining the shared file. Thus the level of sharability of the file defines the level of sharability of the File Definition Block. Similarly, the "user of the file" can be defined as the process (or process group) which "owns" the File Control Block.

Secondly, at the time system resources (including files) are allocated to job steps, execution time file users are ignored because the granularity dealt with is the step. The fact that only one process of a process group will actually use a file is irrelevant at this time. Therefore, at the time of job initiation, it is the step that is the "user," requiring dual control structures. The File Identification Control Block is therefore created to contain a definition of the file which is pertinent to all steps and, when a user requests a file, the Process Group File Identification Control Block is created to describe the requesting step's intended use of the file.

In addition, in order to prevent indiscriminate modification of the control structures by unauthorized users, they are protected at different levels of privilege by the ring mechanism according to the degree of protection required. Thus some substructures may be modified only by ring 0 procedures when the system itself depends on their accuracy, while others may be modified by both ring 0 annd ring 1 procedures. Selected control structures, notably the User Communication Area (UGA), may be modified in the user's ring to increase performance.

The final major factor bearing upon the definition and division of control substructures is the source of the information stored. Some file control substructures result from a source language file declaration, while others are defined by parameters supplied via job control language (JCL).

REFERENCE TO A FILE

A user declares a file in the source language of his program and associates that file declaration with a name which is referred to as the internal file name (or *ifn*). Succeeding references to the file (access commands) in his program refer to the same internal file name. The internal file name is then associated with a set of file control structures (e.g., File Control Block) so that each of the access commands references the appropriate file control structures.

When the file is assigned, usually via a JCL ASSIGN statement, the internal file name is associated with the real, or external, file name. Each execution time reference to the internal file name then becomes a reference to the external file.

The user, if he so desires, may qualify this procedure by use of a file index. If a user desires to successively open different files while using the same control structure (and access commands) for each, he may associated a file index with the internal file name when the file is opened. When the files are assigned, all are associated with the same internal file name (and therefore the same file control structure), but with different file indexes. Thus the value of the file index supplied when the file is opened determines which of the external files is to be processed.

Figure 40:
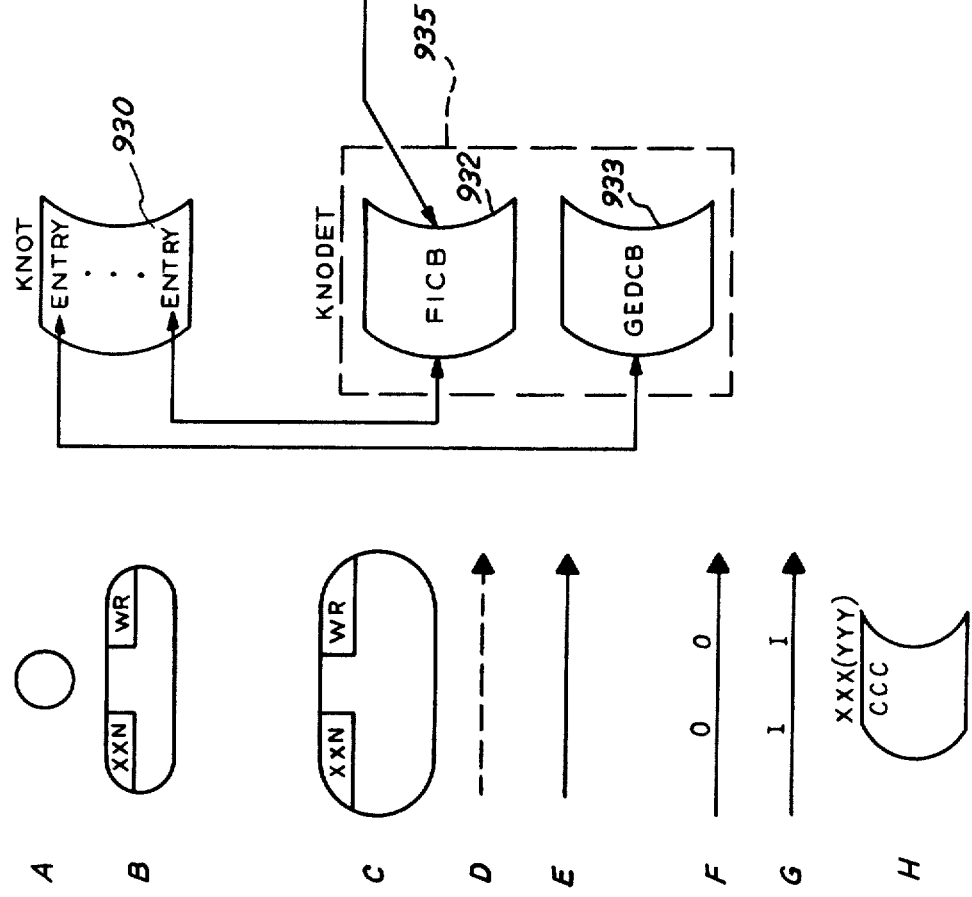
FIG. 40 depicts the individual symbols employed in FIGS. 41-44 of the drawings to illustrate the creation, development and use of file control structures associated with a typical user procedure.

The manner in which the file control structures are created, developed and employed will be discussed below in connection with FIGS. 41 through 45 of the drawings. In these drawings, a circle is employed to depict a data structure, as seen in FIG. 40 at A. Global blocks and segments are respectively depicted by the symbols appearing at B and C in FIG. 40 where: N = segment type (i.e., 0, 1, 2, 3) and XX = ZE for zero length expandable segments, C for conventional segment numbers, SP for segments drawn from the segment pool, and, for normal segments, the space occupied by XX is left blank, (e.g., XXN = 3 is a normal process local segment). WR indicates the value of the segment write ring (e.g., W1 means that the write ring = 1). Dashed line arrows as seen at D in FIG. 40 will be employed to depict pointers in the form of symbolic reference and symbolic definition (SYMRER-SYMDEF) pairs. The solid line arrow shown at E is used to depict pointers in execution format [e.g., a segmented address in the form (STN, STE, SRA); a relative address (SRA); a relative track, record file address (TTR); and relative record file address (RRR)]. Arrows overwritten with O's indicate the output of a function as indicated at F in FIG. 40 while arrows overwritten with I's indicate the input of a function as shown at G. Files and subfiles are indicated in the drawing by means of a symbol which appears at H in FIG. 40 in which XXX indicates the position of the file name, YYY indicates the position of the subfile name (if any), and CCC indicates the position of the names of data structures contained in the file.

Figure 41:
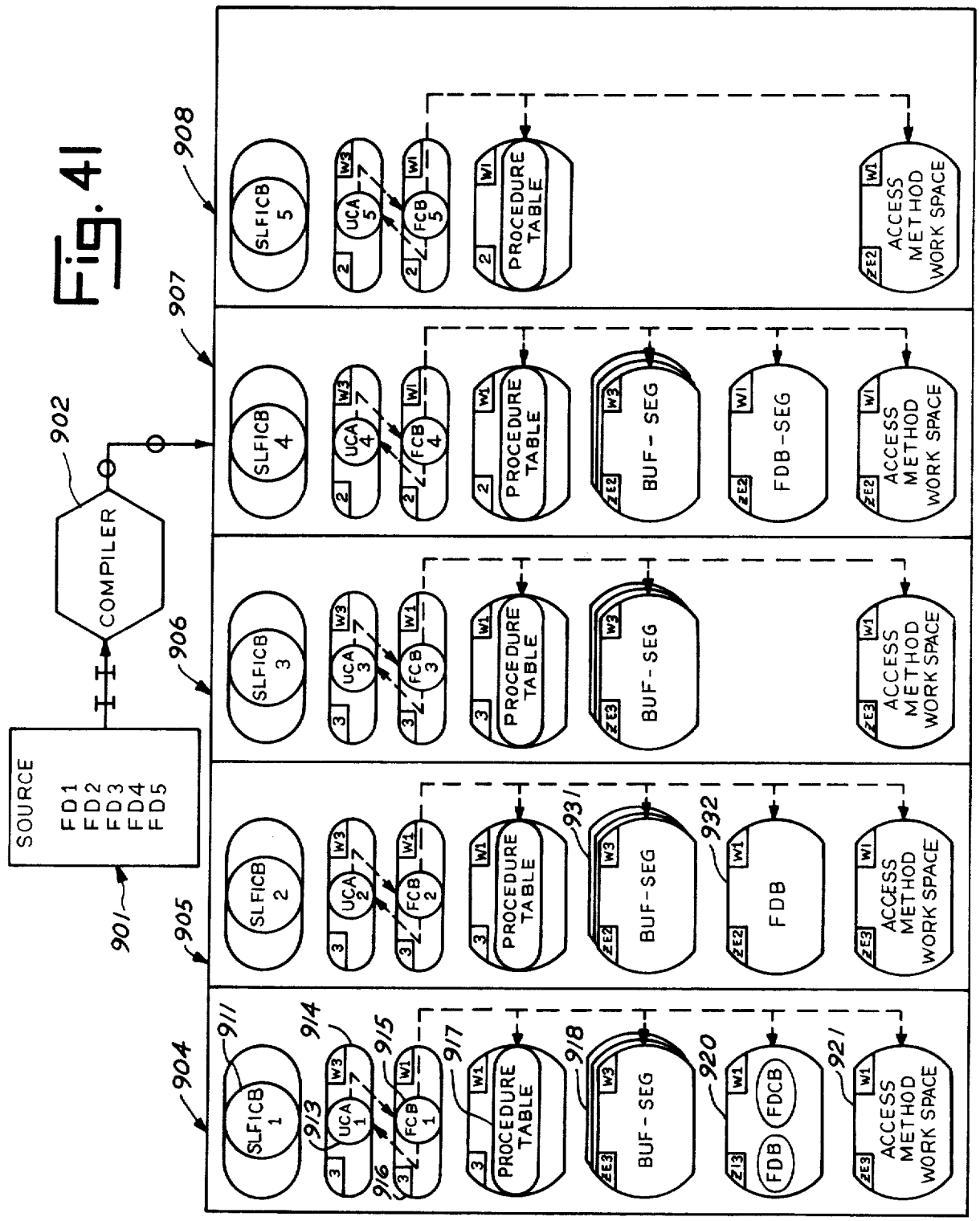
FIG. 41 shows the format of typical file control structures as they exist following compilation.

FIG. 41 of the drawings depicts the format of five sets of data structures and skeletal segments created during compilation for five typical file declarations. The compilation unit depicted in FIG. 41 is based upon the five source language file declarations FD1-FD5 indicated generally at 901 which are expanded by the compiler 902 to form the five information structures indicated generally at 904 - 908 of FIG. 41. The information structure 904 which resulted from the source language declaration FD1 includes the Source Language File Identification Control Block SLFICB-1 shown at 911. The SLFICB 911 contains entires which are initialized to those parameter values supplied in the user's declaration and is thus the object versin of the user's source file declaration FD1. Each SLFICB is placed in an internal segment and identified by a standard name so that it may later be recognized and retrieved during static linking.

The skeletal User Communication Area UCA-1 shown at 913 in FIG. 41 is placed in a global block 914 to be contained in a segment whose attributes permit both reading and writing in the user's ring and whose segment type is the same as that of the segment holding the related File Control Block (FCB). In the example of FIG. 41, the FD1 source declaration specified that the File Control Block is not to be shared but is instead to be placed in a process local (type 3) segment (as indicated at 915). As a result, the segment built to contain UCA-1 is also to be a type 3 segment.

The compiler also constructed the skeletal File Control Block FCB-1 (at 915) which consists of a number of substructures, the existence of any one of which is dependent upon the nature of the source file declaration. Thus, the detailed content of any particular FCB created is dependent upon such user supplied parameters as file organization, access level, access mode, and so on. The FCB 915 is placed within a global block 916 within the compilation unit and, from this global block, a segment will ultimately be built having attributes which permit reading in the user's ring but writing only in rings 0 and 1 whose segment type will be dependent upon the level of sharability indicated by the user for the FCB.

The compiler also produces a procedure table 917 which describes the access method procedures which are potentially required. Such procedures are dependent upon such user supplied parameters as file organization, access level, access modes, and so on. [One widely used set of access methods are described in more detail in Chapter 10 of *Data Structure and Management* by Ivan Flores, Prentice Hall (1970).] Each procedure table is located within a segment assigned that same sharability as that FCB which points to it. Procedures tables may be read by the user but are assigned a ring value which permits writing only in rings 0 and 1.

As shown at 918 in FIG. 41, a 0 length internal segment is created by the compiler for each declared buffer if the user-supplied value of buffer sharing indicates that the buffers are not to be shared at the system level. When the buffers are to be shared at the system level, a type 0 segment will be allocated later from a segment pool for each buffer. The attributes of the segment must indicate that this is a buffer segment and permit reading and writing in the user's ring. The segment type is dependent upon the user-supplied value of buffer sharing [that is, either (1) shared at the same level of sharing assigned to the file or (2) restricted to the level of sharing assigned to the FCB].

As indicated at 920 in FIG. 41, a 0 length internal segment is created by the compiler for each File Definition Block (FDB) and each File Processing Control Block (FPCB). The attributes of these segments must permit reading in the user's ring and writing only in rings 0 and 1. Their segment type is dependent upon the user-supplied level of sharability of the *file* (as opposed to the FCB). Finally, as indicated at 921 in FIG. 41, one or more 0 length internal segments are created for work space which may be needed in connection with access method processing.

In will be noted that the global blocks 914 and 915 (which are inchoate segments) as well as the segments 917 - 921 are all type 3 segments, due to the act that the user specified, in the example source declaration FD1, that both the file and the FCB were to be placed in process local segments. The information structure 905 substantially duplicates that at 904, except that, because the user indicated that the file was to be shared by all of the processes in the related process group, the buffer segments 931 and the segment containing the FDB 932 were made type 2 segments.

The information structure 906 was created from the source declaration FD3 which specified that the file was to be handled as a type 0 system global segment, the FCB was to be placed in a type 3 process local segment, and that the buffers were not to be shared (that is, were to be restricted to the level of sharing specified for the FCB). Therefore, all of the blocks and segments in the structure 906 are assigned type 3, but because the declared file is to be shared at system level, no segment containing the FDB is created at all by the compiler. Instead, a type 0 segment from the segment pool will be created later to hold the FDB (at the time the file is opened).

The information structure 907 results from the file declaration FD4 in which the level of both file and FCB sharability are declared to be at the process group level.

The information structure 908 was created from the source file declaration FD5 which set file sharability at the system level, FCB sharability at the process group level, and made the declared files' buffers sharable.

Figure 42:
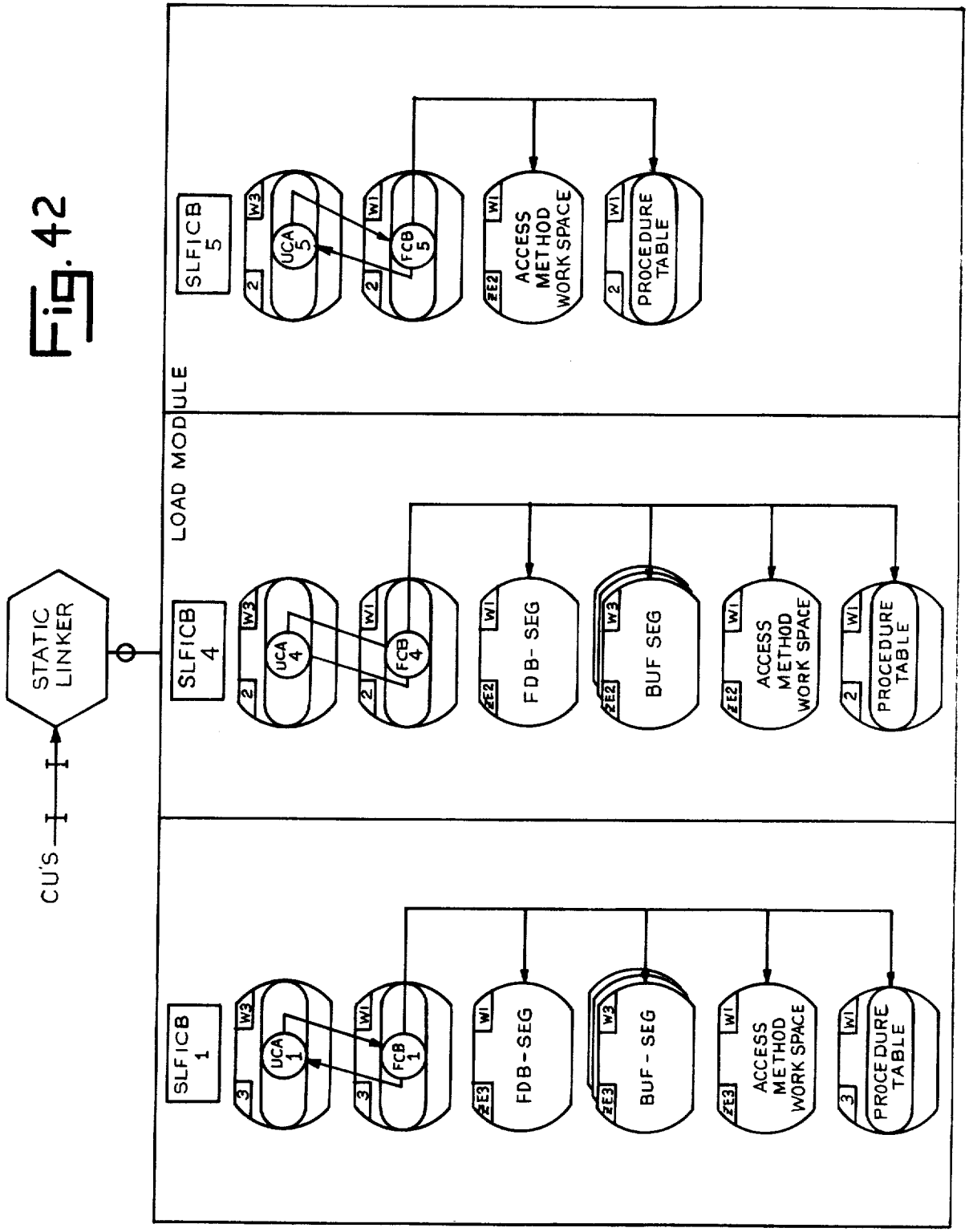
FIG. 42 shows the format of typical file control structures following static linking.

FIG. 42 of the drawings shows the nature of the structures 904, 907 and 908 (depicted earlier in FIG. 41) after static linking. These three cases are sufficient to describe the changes in the control structures during linking. The static linker handles the control structures shown in FIG. 41 (with the exception of each SLFICB) just as it would any other block of data. The structures are loaded into segments with the given attributes, access method procedures are linked, and the symbolic references and symbolic definitions are resolved (resulting in the initiation of the pointers and entry variables in the control structures, thus replacing the dotted lines of FIG. 41 with the solid lines of FIG. 42).

The one exception to this normal mode of processing by the linker are the SLFICB's. When the linker discovers that an internal segment is a SLFICB, the contained data is stored in a special location in the load module and is not assigned to a segment. However, a predetermined load module control record points to the SLFICB so that it may be easily retrieved at process group initiation (to be discussed).

PROCESS GROUP LEVEL CONTROL STRUCTURES

A file is assigned to a (job) step by reserving the name of the file in the Known Objects Table (KNOT) which contains the names of the cataloged files. Each entry in KNOT points to a more detailed description contained in another file called the Known Objects Description Table (KNODET). When consigning a file, KNOT is searched to determine if the file is already consigned (or assigned) and, if not, an entry is created in KNOT and a File Identification Control Block (FICB) is created in KNODET [see FIG. 20 at 518, 520]. The FICB describes the file and its allocation (consignment or assignment) to all users of the file. When a file is de-allocated, the FICB is updated deleting this user and, if the number of users is zero, the FICB and its associated KNOT entry are deleted altogether.

Figure 43:
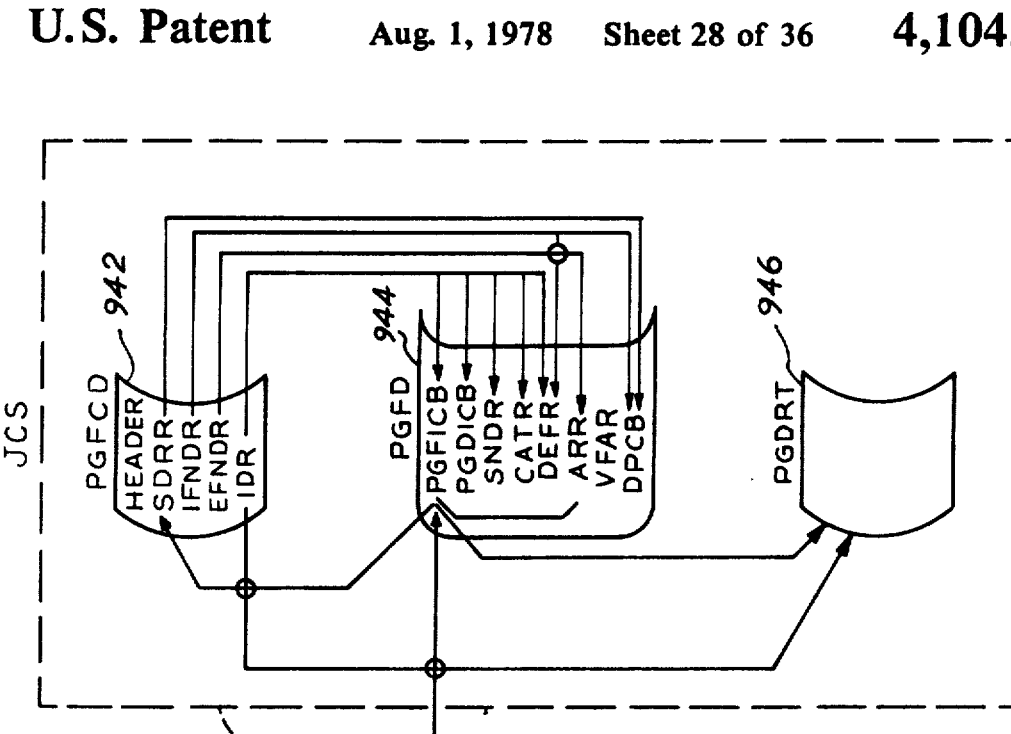
FIG. 43 shows the relationship between KNOT, KNODET, and JCS control structures.

The relationship between KNOT, KNODET and certain information structures within the Job Control Structure (JCS) is shown in FIG. 43 of the drawings. As described earlier, these structures are employed during job (step) initiation to accomplish, among other things, file assignment. They are also used to construct the *excecution-time* file control structures (e.g., the UCA/FCB and FDC). Although a detailed exposition of the contents of the structures employed during job initiation is not essential for an understanding of the file assignment, sharing and protection mechanisms being described here, a summary description of the manner in which these structures are orignated, developed and used will be presented below.

The KNOT file, shown in FIG. 43 at 930, contains entries, each of which point to either a File Identification Control Block (e.g., FICB 932) or a Global Extent Definition Control Block (e.g., GEDCB 933) contained in KNODET 935.

In order to manage files, three principle subfiles within the Job Control Structure (JCS) 940 are employed. These are the Process Group File Code Definition (PGFCD) shown at 942; the Process Group File Definition (PGFD) shown at 944; and the Process Group Device Requirements Table (PGDRT) shown at 946. PGFCD 942 is a directory containing the following information: (1) the PGFCD Header which describes the number and type of the entires in PGFCD; (2) the Internal File Name Definition Record (IFNDR) which contains the file assignment parameters declared in the source language file declaration (FD); (3) the External File Name Definition Record (EFNDR) which contains the external file name and control information used during space allocation; (4) the Index Definition Record (IDR) which contains (or points to) all the information related to an internal file name — file index combination (*ifn,* index); and (5) the Symbolic Device Request Record (SDRR) which describes each user's reference to a symbolic device.

PGFD 944 is a subfile which contains the actual descriptions and declarations referred to by the step and includes: (1) the Process Group File Identification Control Block (PGFICB) which describes the (job) step's use of a file and points to the corresponding FICB in KNODET; (2) the Process Group Device Identification Control Block (PGDICB) which describes the step's use of a device; (3) the Define Record (DEFR) which contains the merged definition of the file from source language, job control language, and the catalog; (4) the Allocation Request Record (ARR) which describes the user's request for space allocation; (5) the Volume For Allocation Record (VFAR) which describes the volume to be used for the space allocation; (6) the Catalog Parameters Record (CATR) which contains the parameters which are applicable to the user's request for cataloging: (7) the Subfile Name Definition Record (SNDR) which contains the subfile name declared in an assign statement for a queued file; and (8) the Device Pool Control Block (DPCB) which describes the pool of devices associated with a file.

PGDRT 946 is a subfile which is built to describe the device and volume requirements of the step.

BUILDING FILE CONTROL STRUCTURES DURING PROCESS GROUP INITIATION

At the time a process group is being initiated, and before any other file management functions are performed, the three JCS subfiles discussed above are opened and locked, and header records are created in PGFCD and PGDRT. The SLFICB's are then retrieved from the user's load module and a source language version of DEFR is created in PGFD from the file attributes appearing in each SLFICB. Also, at this time, an IFNDR in the PGFCD is created which contains parameters necessary during file assignment and further contains a pointer to the corresponding DEFR in PGFD. If automatic file assignment and allocation is specified by the user (as indicated in the SLFICB), and ARR and as many VFAR's as there are declared volumes are created, together with an EFNDR which points to the ARR. If a file has been dynamically defined, or defined via a JCL statement, the attributes declared in the definition are merged into the source language declaration contained in the DEFR. An IDR is created for the specified file [identified by (ifn, index)] and, if necessary, the IFNDR is updated. If volumes have been declared, they are entered into a volume list in the PGDRT and, if cataloging was specified, a GATR is created.

At the time of file assignment, the ASSIGN FILE function (discussed earlier in conjunction with FIGS. 19 and 20), assigns an external file name to an (ifn, index). If the has not already been consigned or assigned, an entry is made in KNOT and a FICB is created. If the file is already cataloged, the user's rights are checked and the cataloged file attributes are merged into the DEFR. A PGFICB is created which describes this step3 s use of the file and, if not already present, an IDR is created. The IFNDR is then updated with the file assignment parameters, a list of the required volumes is built in the PGDRT and, if a symbolic device has been specified, a SDRR is created.

In the event of a dynamic or job control language request for the allocation of space to a job step, an ARR and as many VFAR's are created as are necessary in the PGFD and an EFNDR is created in the PGFCD which points to the ARR. If the allocation is requested on a global extent, and if the specified global extent name is present, the CEDCB in the KNODET is updated; otherwise, a KNOT entry and a GEDCB are created.

In response to a JCL statement (if any) requesting the assignment of a specific device to the step, a PGDICB is then created and the IDR and ISNDR are updated. If the request specifies a device symbolically, a SDRR is also created in PGFCD.

When all of the files have been assigned, the volume list in the PGDRT is consolidated and a DPCB is created in PGRD to describe a device pool for every IFNDR which has been referenced by more than one assign statement. A DPCB is also created for each SDRR and, finally, the PDGRT is updated to reflect the information in the DPCG's.

Once the devices have been allocated and the volumes mounted, the allocation is performed for an external file name. This is accomplished by searching the PGFCD for the EFNDR which matches the input external file name and allocating the space according to the parameters in the ARR and VFAR's. When the allocation has been completed, the EFNDR, ARR and VFAR's are deleted. If the allocation request specifies a global extent, the GECB in the KNODET is updated.

When a file is de-assigned, the file is specified by giving the address or name (ifn, index) of the IDR associated with that file. The sharing section of the FICB is updated (as described earlier in connection with FIGS. 30 - 33) and, if the number of users is reduced to zero by the de-assignment, the FICB and its associated KNOT entry are deleted. Similarly, if the number of users of the volumes and devices associated with the file is reduced to zero by the file de-assignment, these volumes and devices are returned to the system and a PGDRT is updated. Finally, the IDR and the PGFICB are deleted.

Devices are de-assigned by specifying the address or name (ifn, index) of the IDR associated with the device to the de-assigned. As in the case of file de-assignment, the PGDICB and IDR are deleted and, the SDRR, if present, is deleted and the device returned to the system.

PROCESS AND PROCESS GROUP LOADING

Figure 44:
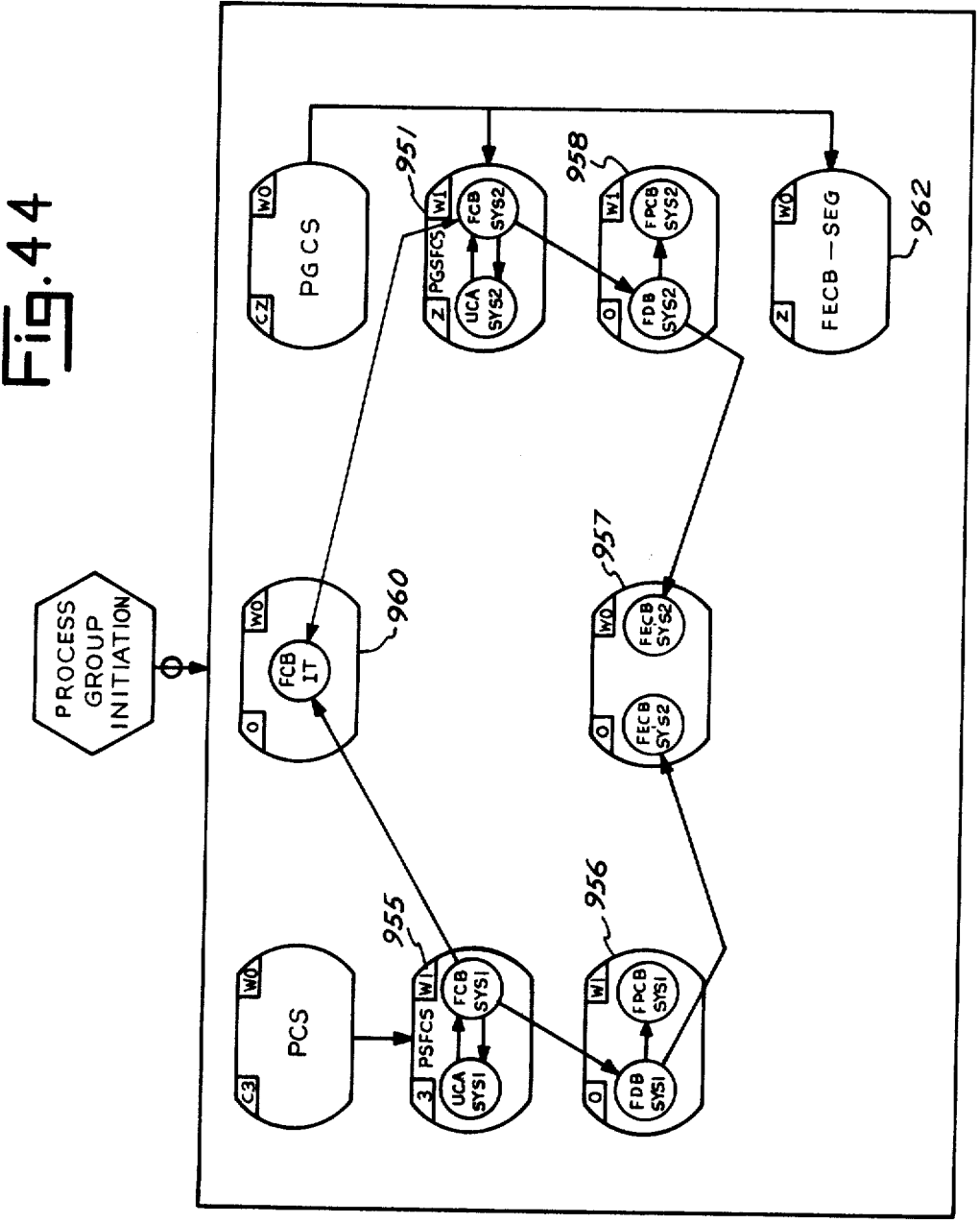
FIG. 44 shows the format of typical file control structures following process group initiation.

FIG. 44 depicts the file control structures added when the main process of a process group is loaded. The user structures created by the linker and depicted in the example of FIG. 42 are unchanged.

As has been explained previously, each user of a file has his own FCB and UCA which describe his relationship to the file. This same concept also applies to system files. The user of some system files is the system itself, for others each process group is a user, and for still others each process is a user. Those system files for which the whole system is the user by definition require only one description of status and currency and, therefore, have only one FCB/UCA which is at the system level and is potentially referenced by all processes in the system. An FCB/UCA must exist for each process group for those system files for which each process group is a user, and similarly, an FCB/UCA exists for each process for those system files for which each process is a user.

The FCB's/UCA's for process group level system files are stored in the Process Group System File Control Segment (e.g., PGSFCS 951 in FIG. 44) while the FCB's/UCA's for process level system files are stored in the Process System File Control Segment (e.g., PSFCS 955 in FIG. 44). The shared control structures (FDB, FPCB, FECB, . . . ) for these files reside in type 0 segments (e.g., segments 956, 957 and 958 in FIG. 44) which are allocated at system initialization. In addition to these, another type 0 segment (seen at 960 in FIG. 44) contains the File Control Block Index Table (FCBIT) which is used to validate the FCB's for each access. Each opened FCB in the system references the FCBIT.

The FCB's /UCA's for system files for which the user is the system are created in type 0 segments and opened at system initilization. The Process Group System File Control Segment (PGSFCS) is loaded with the FCB's/UCA's for the system files for which the process group is the user when the main process of a process group is loaded. The PGSFCS is a type 2 segment pointed to from the Process Group Control Segment (PGCS). At process group initiation this segment is loaded, the files are opened, a zero length, type 2 segment (segment 962 in FIG. 44) is expanded to provide space for all the File Extent Control Blocks (FECB's) for those files which are not shared at the system level. This segment is also pointed to from the PGCS.

The Process System File Control Segment (e.g., PSFCS 955) is loaded with FCB's/UCA's for the system files for which the process is the user when the process is initiated. The PSFCS is a type 3 segment pointed to from the Process Control Segment (PCS).

FILE OPEN

At the time file is opened the execution-time control structures must be created or completed. The UCA and FCB as created at program compilation contain the internal file name associated with the file declaration. The PGFCD is then searched for the IDR with the correct (*ifn,* index) and, from the IDP, the DEFR in the PGED is retrieved. The DEFR contains the merged source language, JCL, and cataloged file attributes. The file label is then read from the volume and all of the file attributes merged to complete the UCA/FCB control structures.

The FCB (e.g., FCB 971 shown in FIG. 45) contains those parameters which are unique to the user of the file. It is created in skeletal form at compilation time, allocated to a segment which is protected from modification by the user (i.e., may be modified by only ring 0 and 1 procedures), possesses a type which depends on the user-supplied value of the level of FCB sharability, and is completed when the file is opened.

Thus each user has an FCB which defines his access rights, currency, and status to the file. Each of the FCB's in turn points to those file control structures which are shared by all users of the file (e.g., FDB, FPCB).

The UCA (e.g., UCA 972 seen in FIG. 45) is very much akin to the FCB in that it also contains parameters which are unique to the user of the file. Though it may logically be considered a section of the FCB, the UCA has physically been separated from the FCB due to protection considerations. While the control structures in general must be protected from indiscriminate modification by the user, there is a need, for the sake of performance, to modify a few selected parameters when executing in the user's ring.

The UCA satisfies this requirement for two classes of parameters. It contains currency parameters (one set per subfile for the queued method) which must be modified when performing elementary functions such as blocking/deblocking. Thus a procedure call (in order to execute in a more privileged ring) can be avoided for these functions. In addition, the UCA contains space for parameters passed to the access methods. Each access macro (e.g., GET, PUT, etc.) expands into code which loads the input parameters to the macro into the parameters space in the UCA. A mask field is also set to identify the passed parameters so that during execution the parameters may be retrieved from the UCA by the called access method function.

The UCA is created by the compiler (or a corresponding FD macroprocessor) in response to a source file declaration. It is allocated in a segment modifiable in the user's ring and whose type depends on the user-supplied level of sharability.

The FICB, retrieved via IDR to PDGICB to FICB, contains the address of the FDB if the file is already open for another user. If the file is not already open, the FDB and FPCB are created.

One FDB (e.g., FDB 973 seen in FIG. 45) exists for each open file and is shared by all users of the file. The FDB contains general file attributes which are invariant with respect to the file's users. It is created when a previously unopened file is opened and is deleted when the last user closes the file. If the file is sharable at the system level, the FDB is created in a type 0 segment, which is modifiable only in rings 0 and 1, the segment being obtained from the system segment pool at OPEN time. Otherwise, a zero length segment (reserved by the compiler) of type 2 or 3 (depending on the level of sharability) is used.

The FPCB (e.g., FPCB 974 in FIG. 45) is directly related to the FDB, but contains file level control parameters rather than file definition parameters. The FPCB is created and deleted along with the FDB and resides in the same segment.

The FECB (e.g., FECB 975) describes the active extents and device characteristics of a direct access storage file and, for sequential access storage files, describes just the device characteristics. The FECB is created when a previously unopened file is opened and deleted when the last user closes the file. FECB's for system shared files are allocated to a type 0 segment which is modifiable only by ring 0 procedures. FECB's for other files are allocated to a type 2 segment which is modifiable only by ring 0 procedures. Thus there exists one system segment and one segment per process group for FECB's. The process group segment is pointed to by the Process Group Control Segment (PGCS). Since an FECB may change size during file processing, a segment definition is maintained at the beginning of the segment in order to manage the space.

Figure 45A:
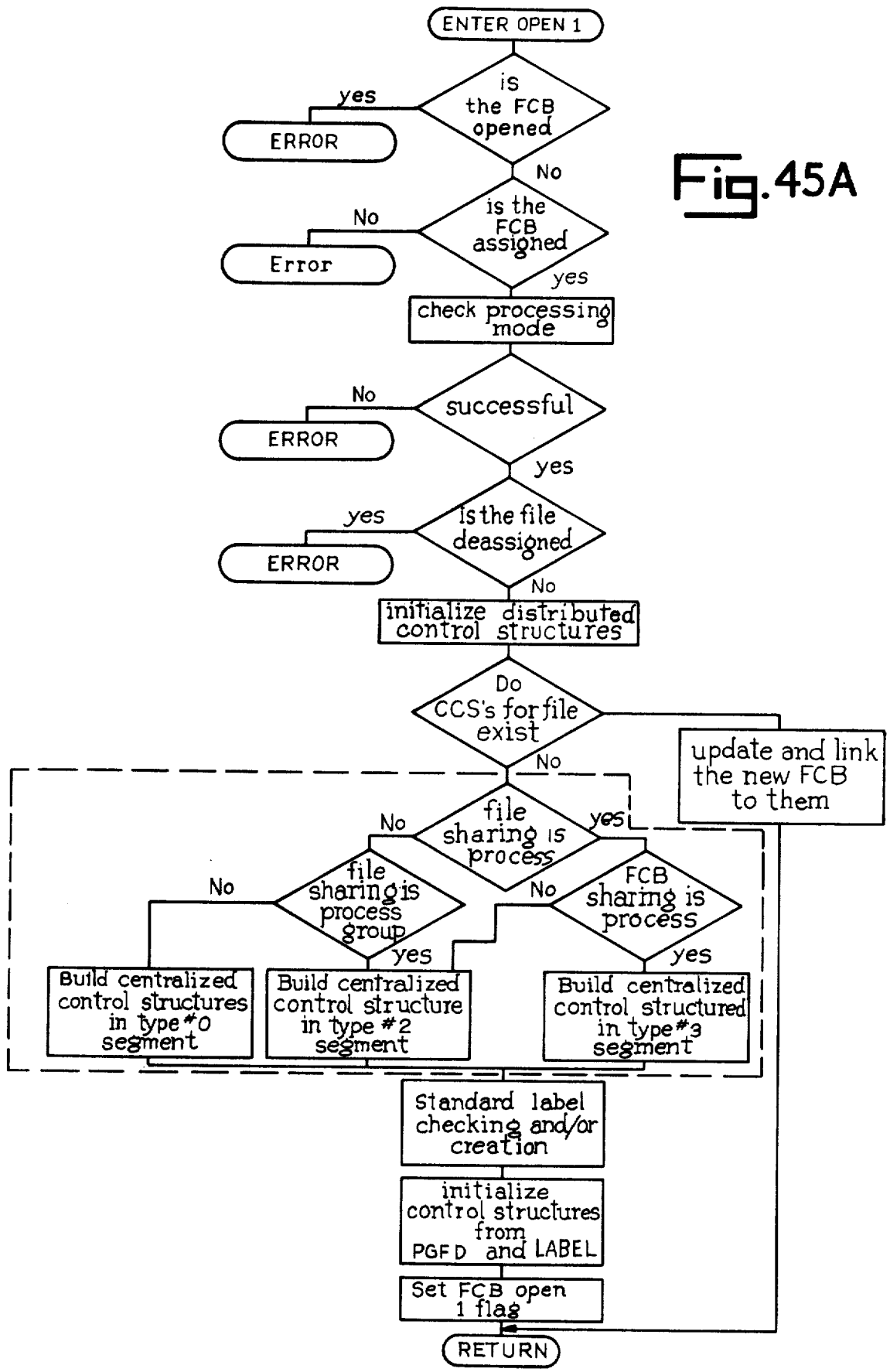
FIG. 45A is a flowchart which illustrates the sequence of steps executed at the time a file OPEN macroinstruction is executed.

The sequence of steps relevant to file sharing which take place at the time the file OPEN macroinstruction is executed is shown in FIG. 45A of the drawings. Only that part of the complete OPEN function here called "OPEN1" is shown. The OPEN1 procedure accomplishes a series of checks between the file definition information previously specified at different levels (source language, JCL, and the parameters expressed in the OPEN macroinstruction), builds (or updates) file control structures, and performs standard label processing. A further portion of the file OPEN function called "OPEN2" (not shown) selects and opens those access method procedures appropriate to the file being manipulated.

The OPEN1 procedure is entered at 980 as shown in FIG. 45A and a check is made at 981 to insure that the FCB has not previously been opened. If it has, an error signal is sent (in the form of a return code to the calling procedure); if not, a check is made at 982 to insure that the user's FCB has in fact been assigned to an external file and its associated control structures. Thereafter, a routine is executed at 983 to insure that the current and requested processing modes are compatibles [see FIG. 33 for details]. After insuring that the file has not been deassigned (at 984) the distributed control structures are initialized as indicated generally at 985. As previously noted, a control structure is said to be "distributed" if it is pointed to by Type 0 system segment table and is thus present within the address space of all user processes.

Next, at 986, a check is made to determine whether or not tge "centralized control structure" (CCS) for the file exist. A control structure is "centralized" if it is used to manipulate files shared by several process groups; it is "decentralized" if file sharing may occur only inside a process group. Centralized control structures therefore relate to the interaction between process groups in the course of using a system function whereas decentralized control structures are used to perform functions in a process group local environment with no interactin between process groups occurring.

The distributed file control structures include, for example, KNOT entries, the FICB's in KNODET, and the type 0 segments shown in FIG. 44.

Structures which may be "centralized" include FDB, FPCB, and FECB. It will be remembered that, as discussed in connection with FIG. 41, when a programmer writes a file declaration (FD) which states that a file is to be shared at the system level, no "centralized" segment containing the FDB is created at all by the compiler. Instead, creation of the FDB is delayed until the time the file is opened when a type O segment from the segment pool is used to hold the FDB. On the other hand, if the file is to be shared only at the process group or process local level, skeletal decentralized FDB segments are created by the compiler. Hence, at OPEN time, a check is made at 986 to determine if an FDB has already been created (by the compiler or by an OPEN macro in a different process which is sharing the file) and, if it has, the existing FDB is merely updated as shown at 988.

If any of the needed centralized control structures (including FDB) do not exist, tests are made at 990 to determine first, if the level of sharing of the file is process local; if it is not, a test is then made to determine if the sharing level is process group; if not, the centralized control structures are built in a type O segment. If the sharing level for the file is process group (or the sharing level of the file is process local but the sharing level for the FCB is not process local), then the centralized control structures relating to the file are built into type 2 segments. If the level of sharing for both the file and the FCB is process local, the centralized control structures are built into a type 3 segment.

Thereafter, the information appearing on the label is checked against the control structures. At the user's option a label may be created if one did not previously exist. Finally, the initialization of the file control structures is completed from information in PGFD and the label, and a flag in FCB called "FCB OPEN1 FLAG" is set to indicate the completion of the OPEN1 procedure.

FILE CONTROL BLOCK INDEX TABLE (FCBIT)

The FCBIT (seen at 977 in FIG. 45) is a permanent control structure allocated in a type 0 segment which is modifiable only in ring 0 and is used for FCB validation. The FCBIT prevents a user from constructing a FCB of his own and accessing a file without first opening it. When a user opens a file, an entry in the FCBIT is initialized to point to the user's FCB. The index of this entry in the FCBIT is stored in the FCB so that the address of the FCB referenced at access time can be compared with the address of the FCB which was opened.

ACCESS METHODS — GENERALLY

Mention has heretofore been made of "access methods." The file control structures (e.g., FCB/UCA and FDB) whose controlled sharing has been discussed are the structures which contain (or point to) the information used by access methods to manage files and to execute I/O macroinstructions and high level language statements in source programs. In addition, as noted earlier in connection with FIG. 32 of the drawings, access methods provide a means, called "sharing control," for controlling concurrent accesses to files.

Computing systems often include a set of "access methods," each of which supports a standardized file organization (e.g., sequential, direct, indexed-sequential, etc.). Such access method functions are visible to the user in the form of macroinstructions, which may be included in an assembly language program, and which form the means by which higher level language I/O statements (e.g., statements in COBOL, PL/1, RPG, FORTRAN, etc.) may be implemented. One of the principle objectives of a standard access method is to permit the system to make use of pre-existing files constructed in certain widely used file formats, such as those previously created and used in connection with an IBM OS/360 system, and to provide support which simplifies the design of high level language compilers.

As used here, the term "file organization" refers to a specific scheme for organizing the records of a file plus any ancillary data such as directories and indexes on one or more physical media. The term "access-method" as used here refers to the totality of functions available for the accessing of a particular file organization. Thus, there is one and only one access method for each file organization. The provision of macroinstructions for calling standard access method procedures capable of manipulating standardized file organizations frees the programmer from the burden of designing the details of his own I/O routines — routines which can be extraordinarily complicated. Because access method procedures are large, limiting such procedures to a particular file organization means that only those access method procedures actually needed are brought into memory. Such access method procedures are not contained in the program, and are not loaded in memory until needed. When present, they utilize the file control structures created from the information supplied in source language file declarations, from information specified in job control language at assign time, from information specified in file label and in system catalogs, and from information specified as parameters in the OPEN statement.

The format of the information structure FCB is illustrated in FIGS. 46A, B, and C of the drawings. Only those portions of the FCB which are relevant to file sharing and protection are shown.

In FCB, as shown in FIG. 46A, following the four character long field called FCB TYPE, there appears a section called FCB HEADER which contains pointers to the FCB, to the access method section of the FCB, to the buffer pool control table of the FCB, and to a structure called SUBFPCB. FCB HEADER also identifies the internal file name and file index (ifn, index) of the file associated with the FCB and a substructure called FCB STATUS which includes locking flags for associated control structures and a one bit flag called FCB COOPERATIVE which, when set to 1, indicates that the share type is independent. Finally, the FCB HEADER indicates the number of buffers per file requested by the user at compilation time.

Next, the FCB includes a section called FCB COMMON PROCEDURES which contains pointers to the entry points of various access method prcedures [e.g., OPEN, CLOSE, GET, and PUT as shown in the example of FIG. 46B]. This section of the FCB also includes a five bit field called FCB PROCESSING MODE which indicates the actions to be taken by the user owning the FCB with respect to the file. [FCB PROCESSING MODE and FCB COOPERATIVE are comparable to and contain information derived from the source language and JCL directive expansions: See PROC-MODE at 541 in FIG. 25.] Finally, the FCB COMMON PROCEDURES section includes a 15 bit long fixed binary field called FCBIT INDEX which identifies the entry in FCBIT which contains the address of the FCB and its identity (J, P).

The FCB next contains, in FIG. 46C, a section called FCB STANDARD ACCESS containing fields which specify the sharing level of the FCB, the sharing level of the file (FDB), whether sharing control is to be performed (and, if so, at what level) and a selection of other information structures whose functions will be discussed below.

As indicated in FIG. 46B, the FCB includes, within its STANDARD ACCESS section, a three bit field called FCB REFERENCE MODE which indicates one of three provided for referencing records: the move mode, the locate mode, and the substitute mode.

In the move mode, data records are moved between a user working area and a buffer. In the locate mode, only addresses are exchanged between the user and the system, and the records are referenced and created directly in the buffer. The substitute mode is provided in order to reduce the number of move operations which would otherwise be needed when a file is updated in place, or when a file is read and another file is created out of the data. In the substitute mode, the buffer is divided into equal size segments, each of which may be exchanged with a user working area.

SHARING CONTROL

As noted earlier in connection with FIG. 32 of the drawings, the access methods offer an additional tool for controlling concurrent accesses generally called "sharing control." FIG. 32 of the drawings, as has already been discussed, represents the manner in which the system insures, at file assignment time, that a user's decision to process a file with (or without) sharing control will not disturb the agreement of other processes. The specific manner in which access method procedures effect "sharing control" may now be discussed.

First, as shown in FIG. 46C, the FCB includes FCB SHARING CONTROL indicating whether or not a given procedure will employ sharing control with respect to a particular file and, if sharing control is to be used, whether it will be applied at the file or record level. Record level sharing, where an individual record within a file may be individually locked and unlocked employs techniques similar to those used in connection with file sharing (to be discussed below).

The basic concept of sharing control is that the user is given the ability, when he wishes to exclusively access a file, to first lock the file, then access it, and then unlock it. During the period that the file is locked, it is guaranteed that no other user will be able to access it. Commonly, locking is accomplished by setting a predetermined locking flag bit at a predetermined location and resetting the flag bit to unlock the file or structure. When a process attempts to access the protected structure, this flag bit is first checked and, if the flag to set to 1, access is denied. This basic locking technique is used, for example, to protect the RESLD table as described earlier in connection with FIG. 14.

The sharing control technique used by the access methods within the present system is more complex and sophisticated than this basic concept of protection through locking in several ways:

First, when the user locks a file, he is given a choice of locking it "for input" and locking it "for output." When a file is locked for input, other users are allowed to access the file during the period it is locked but only as long as that access is confined to reading the file. On the other hand, when a file is locked for output, other users may access it under no circumstances.

The second variation from the basic sharing control locking concept is that, in the present system, the locking and unlocking of the file may take place "manually" or "automatically". To "manually" lock a file, the user writes locking and unlocking instructions. Automatic locking is provided (when the access mode is sequential) to automatically lock a file whenever a record in that file is read, and each subsequent update, delete, or read operation will automatically unlock the file. Manual and automatic locking may be intermixed; that is, an automatic lock may be unlocked by a manual unlock (however, a manual lock cannot be unlocked by an automatic unlock).

The user need not specify in his FD (File Declaration) macro whether manual or automatic locking is to be used. This results from the fact that automatic locking automatically takes effect whenever (1) access to the file is shared and controlled (as explained below), (2) the access mode is sequential and (3) a manual lock is not performed prior to accessing the file. The definition of the current sharing control to be applied to a file is found in FCB at FCB LOCK INF.

The third aspect of sharing control in the present arrangement results from the fact that multiple processes may behave as a single user and, in this sense, share a file. This can occur, for example, when one process spawns another process. Both processes are than able to execute access macros which reference the same file control structures. This sharing of a file declaration by a parent process and its spawned child will not be detected by access method procedures, and it is accordingly the responsibility of the user to add the needed locking and unlocking instructions to his procedures.

Fourth, as noted earlier in connection with FIG. 33 of the drawings, users of sequential and queued file organizations may designate that the type of sharing to be employed is either cooperative or independent [as indicated by field FCB COOPERATIVE FLAG in the STATUS section of the FCB in FIG. 46A]. Cooperative sharing is identical to normal (independent) sharing except that cooperating users share only one current record address. Thus, even though several users are simultaneously reading records from a file, each using his own file control structures resulting from his own file declaration and thus has his own access rights and other parameters, they may share the same buffer address, space providing that all of the cooperating users access the file in the move mode. That is, records are always moved by system procedures between the buffer and a user working area. Under cooperative sharing, sequential type files may be accessed by several user FCB's [in this case, a "user" and the FCB it owns are equivalent so that the FCB itself can be considered a user]. It is necessary, however, to protect the "currency" (that is, the object of interest: a file, subfile, or other information structure) relating to the file and its current use. In this case, the currency to be protected is made available to access system procedures via the pointer FCB SUBFPCB PTR which locates a section of the FPCB (see 956 in FIG. 44) used to maintain centralized information when a sequential file is being shared. The SUBFPCB contains, among other things, information concerning the status of the shared buffers and files on secondary storage, as well as pointers to those semaphores on which processes are enqueued to await the unlocking of the information necessary to execute requested access method procedures.

As pointed out earlier, in the automatic locking mode, whenever a record is read, the file is automatically locked and is then unlocked by a subsequent update, delete or read operation. In the case of a subsequent read operation, the file is automatically relocked immediately after it is unlocked. This locking and unlocking operation allows other enqueued users the opportunity to access the file. Therefore, in effect, an unlocking read operation places the reading user back in the enqueued line of waiting users in accordance with that user's priority. This provision gives a user of higher priority an early opportunity to gain access to a file by taking precedence over the current user.

PROTECTION OF SHARED FILES - AN OVERVIEW

The arrangement which has been disclosed encourages the sharing of files while simultaneously providing a facility which the user can employ to protect his files. The protection of shared files involves different, cooperating concepts and, to place the overall system in proper perspective, it is useful to here review what these concepts are and how they cooperate to both permit the sharing of files and to simultaneously protect these same shared files against unauthorized access. Thses cooperating protection techniques may be summarized briefly as follows:

(1) The *segmented addressing mechanism* [described in detail in the copending related application Ser. No. 470,430 identified under "Related Applications" at the beginning of the specification] makes it impossible for a user to address information in virtual memory which is outside the address space specified in the address directory hierarchy pointed to by the process control block "owned" by that process;

(2) The *ring mechanism* described in detail in the above-identified copending related application [identified under "Related Applications" Ser. No. 528,953], by assigning levels of privilege to all segments in virtual memory, prevents less privileged processes from directly accessing the access to more privileged procedures and data by less privileged procedures;

(3) The ability is given to the user to individually indicate the sharability of a file (FDB), the file control structures defining the use of the file (FCB/UCA), and the buffer segments into which the file will be read. This is made possible by treating buffers as segments, by placing file control structures in segments, and controlling the degree to which these segments exist in the address space of different processes by means of user-declared directives;

(4) Access method procedures are provided whereby the file is manually or automatically locked against reading, writing or both prior to access, and thereafter unlocked;

(5) Cooperative sharing is provided whereby users share the same current record address in a manner controlled by a semaphore gate (thus making it necessary to read file records only once even though several users are concurrently using the file);

(6) At file assignment time, if the user has sought access to an existing cataloged (external) file, the cataloged access rights to the file are checked against the access rights of the account to which the job step is charged;

(7) By defining file subtypes [e.g., a FORTRAN source programming, job control language directives, a compilation unit, a load module, etc.] system procedures are able to verify that the file being accessed contains the type of data expected. For example, a user procedure may not modify a load module even though, according to the access right permissions listed for the load module, that right has been apparently given to the account to which the user procedure is assigned;

(8) Also at assign time, the sharability level requested by the user [e.g., SRO, SXW, and SNX] is compared with the sharability level stated at assign time in JCL, and the most restrictive of these requests is compared with the current sharing level maintained for the file.

(9) The current and requested processing modes and sharing types are checked for compatibility (also at ASSIGN time).

(10) Finally, at assign time, the requested mode of sharing control is compared with the current sharing control (or if no sharing control is being currently exercised on the file, its current assignment status) to avoid incompatibilities.

CONCLUSION

In the preceding description, a detailed explanation of a preferred arrangement both for sharing and protecting files within a computing system has been presented. The disclosure of this arrangement has necessarily included a description of principle components of a specific computing system of the class in which the principles of the present invention may be employed to particular advantage. It should be understood, however, that the principles of the present invention could be applied in a variety of dissimilar computing systems, with a resulting wide variation in the instrumentalities employed, without departing from the true spirit and scope of the invention.

What is claimed is:

1. Apparatus for selectively permitting access to a related file of information by a candidate job step in a queue of job steps stored in preparation to be processed by a computing system, the related file including information related to the processing of said candidate job step by the computing system and information related also to the processing of an active job step currently being processed by the computing system, said apparatus comprising:

(a) first means for storing a request file control manifestation associated with said candidate job step, said request manifestation including data identifying said related file of information, data identifying a set of requested rules which are to govern the sharing of said related file of information as said candidate job step is processed by the computing system, and data identifying a requested use to be made of said related file of information by said candidate job step;

(b) second means for storing a current-status file control manifestation, said current-status manifestation including data identifying said related file, data identifying a set of current rules governing the sharing of said related file of information, and data identifying a current use being made of said related file of information by said active job step currently being processed by the computing system;

(c) third means coupled to said first and second means for comprising said request control manifestation with said current-status control manifestation;

(d) fourth select control means coupled to said first and second means, for making a first determination whether the requested use as identified by the data of said request structure manifestation violates one of the current rules as identified by the data of said current-status manifestation, and for selectively permitting access to said related file of information by said candidate job step in accordance with said first determination;

(e) fifth select control means coupled to said first and second means, for making a second determination whether the current use as identified by the data of said current manifestation violates of the requested rules as identified by the data of said request manifestation, and for selectively permitting access to said related file of information by said candidate job step in accordance with said second determination; and (f) sixth means coupled to said first and second means, for entering in said first means, when access to said related file by said candidate job step is granted in accordance with at least one of said first and second determinations of said fourth and fifth means, the requested rules as identified by said request manifestation as said current rules, and for entering in said second means said requested use as indicated by said request manifestation as said current use as identified by said current-status manifestation, thereby to determine the use by said candidate job step of said related file of information.

2. Apparatus as claimed in claim 1, wherein said sixth means is coupled to said first and second means for comparing said requested rules as identified by said request manifestation with said current rules as identified by said current-status manifestation to determine which is more restrictive, and for selectively entering in said second means a portion of said requested rules as identified by said request manifestation to the extent that said requested rules are more restrictive than said current rules.

3. Apparatus as claimed in claim 1, wherein said first means stores said set of requested rules of said request manifestation selected from a class comprising:
(a) a first set of rules preventing access to said selected file by more than one job step;
(b) a second set of rules preventing all active job steps from altering said selected file but permitting any active job step to read information from said related file;
(c) a third set of rules preventing more than one job step from altering said related file but permitting any active job step to read information from said related file; and
(d) a fourth set of rules permitting all active job steps to both read and alter said related file.

4. Apparatus as claimed in claim 1, wherein said first means stores the requested use identified in said request manifestation selected from a class comprising:
(a) writing the related file;
(b) reading the related file;
(c) updating existing data in the related file;
(d) appending data to the related file; and
(e) both reading from and writing into the related file.

5. Apparatus as claimed in claim 3, wherein said first means stores said requested use specified in said request manifestation selected from a class comprising:
(a) writing the related file;
(b) reading the related file;
(c) updating existing data in the related file;
(d) appending data to the related file; and
(e) both reading from and writing into the related file.

6. Apparatus as claimed in claim 1, comprising sharing control means, said request manifestation including data indicating whether said candidate job step may use said sharing control means, said current-status manifestation including data indicating whether said active job step is currently using said sharing control means, said sharing control means responsive to a locking instruction related to a first process to be carried out by the computing system for denying access to a file of information by a second, different process to be carried out by the computing system, and means responsive to the current use identified by said current-status manifestation and to said requested use of said request manifestation, for determining whether the requested and current uses of said sharing control mechanism are compatible, and if not, for denying access to said related file by said candidate job step.

7. Apparatus as claimed in claim 4, comprising sharing control means, said request manifestation including data indicating whether said candidate job step may use said sharing control means, said current-status manifestation including data indicating whether said active job step is currently using said sharing control means, said sharing control means responsive to a locking instruction related to a first process to be carried out by the computing system for denying access to a file of information by a second, different process to be carried out by the computing system, and means responsive to the current use identified by said current-status manifestation and to said requested use of said request manifestation, for determining whether the requested and current use of said sharing control mechanism are compatible, and if not, for denying access to said related file by said candidate job step.

8. Apparatus as claimed in claim 1, further comprising:
(a) means for converting source program file declarations describing said related file and its intended use, into a source language file control manifestation;
(b) means for converting job control language directives describing said related file and its requested use by said candidate job step into a job control language file, control manifestation; and
(c) means for merging said source language manifestation and said job control language manifestation to form said request manifestation.

9. Apparatus as claimed in claim 3, further comprising:
(a) first means for converting source program file declarations describing said related file and its intended use into a source language file control manifestation;
(b) second means for converting job control language directives describing said related file and its requested use by said candidate job step into a job control language file, control manifestation; and
(c) means coupled to said first and second converting means for assembling said source language manifestation and said job control language manifestation to provide said request manifestation.

10. Apparatus as set forth in claim 1, wherein the computing system includes a central processing unit, a random-access main memory and a peripheral secondary storage device for storing said related file of information, and wherein there is included three distinct directory manifestations comprising a global directory manifestation comprised of tables including entries specifying the main memory locations of blocks of information addressable by each of the active job steps, a process group directory manifestation associated with each of said active job steps comprised of directory tables including entries specifying the main memory locations of blocks of information addressable by those processes making up the active job step, and a process local directory manifestation associated with each of said processes and including directory tables having entries specifying the address locations of said main memory for storing blocks of information, the address locations addressable by only a single one of the processes of said active job step, said apparatus further comprising:

(a) an indirect addressing means for locating information in said main memory by reference to said directory manifestations, and (b) means coupled to said first means for controlling the sharing of information from said related file by reading information from said related file into a buffer location of said main memory addressable by a selected one of said three directory structures as specified by said request control manifestation.

* * * * *

UNITED STATES PATENT AND TRADEMARK OFFICE
CERTIFICATE OF CORRECTION

PATENT NO. : 4,104,718
DATED : August 1, 1978
INVENTOR(S) : Alain Poublan, et al It is certified that error appears in the above-identified patent and that said Letters Patent are hereby corrected as shown below:

Claim 1, column 66, line 60, delete "comprising" and substitute --comparing--.

Claim 1, column 67, line 6, after "violates", insert --one--.

Claim 7, column 68, line 28, delete "use" and substitute --uses--.

Claim 10, column 68, line 68 - column 69, line 1, delete "directorytables" and insert --directory tables--.

Signed and Sealed this

Twelfth Day of June 1979

[SEAL]

Attest:

RUTH C. MASON
Attesting Officer

DONALD W. BANNER
Commissioner of Patents and Trademarks